US012659461B2

(12) United States Patent
Wang

(10) Patent No.: US 12,659,461 B2
(45) Date of Patent: Jun. 16, 2026

(54) VIDEO CODING METHOD AND APPARATUS

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/911,370

(22) Filed: Oct. 10, 2024

(65) Prior Publication Data

US 2025/0039361 A1      Jan. 30, 2025

Related U.S. Application Data

(63) Continuation of application No. PCT/CN2022/086450, filed on Apr. 12, 2022.

(51) Int. Cl.
H04N 19/00          (2014.01)
H04N 19/105        (2014.01)
(Continued)

(52) U.S. Cl.
CPC ......... H04N 19/105 (2014.11); H04N 19/159 (2014.11); H04N 19/176 (2014.11)

(58) Field of Classification Search
CPC .................................................... H04N 19/00
See application file for complete search history.

(56) References Cited

U.S. PATENT DOCUMENTS

2013/0251036 A1     9/2013   Lee et al.
2014/0092979 A1*    4/2014   Sato ..................... H04N 19/174
                                                              375/240.16
(Continued)

FOREIGN PATENT DOCUMENTS

CN          1863315          11/2006
CN          111741297        10/2020
(Continued)

OTHER PUBLICATIONS

Chujoh et al., "Description of video coding technology proposal by Toshiba," Joint Collaborative Team on Video Coding (JCT-VC) of ITU-T SG16 WP3 and ISO/IEC JTC1/SC29/WG11, Document: JCTVC-A117r1, Apr. 2010.
(Continued)

*Primary Examiner* — Maryam A Nasri
(74) *Attorney, Agent, or Firm* — Hodgson Russ LLP

(57)          ABSTRACT

A video coding method and apparatus are provided in the disclosure. In the disclosure, a weight derivation mode and K prediction modes are used as a combination, so that a weight derivation mode and K prediction modes used by a current block are indicated in the form of a combination in a bitstream. In this case, at a decoding end, a first index is obtained by decoding the bitstream, the first index indicates a first combination consisting of one weight derivation mode and K prediction modes, a first weight derivation mode and K first prediction modes included in the first combination are determined according to the first index, and a current block is predicted according to the first weight derivation mode and the K first prediction modes to obtain a prediction value of the current block.

16 Claims, 13 Drawing Sheets

(51) Int. Cl.
    *H04N 19/159*     (2014.01)
    *H04N 19/176*     (2014.01)

(56)            References Cited

U.S. PATENT DOCUMENTS

| | | | |
|---|---|---|---|
| 2019/0335181 A1 | 10/2019 | Abe et al. | |
| 2020/0120339 A1 | 4/2020 | Chiang et al. | |
| 2020/0413073 A1 | 12/2020 | Lee et al. | |
| 2021/0092392 A1 | 3/2021 | Reuze et al. | |
| 2022/0060701 A1 | 2/2022 | Bordes et al. | |
| 2022/0224915 A1 | 7/2022 | Wang et al. | |
| 2022/0329824 A1 | 10/2022 | Liao et al. | |
| 2023/0300326 A1* | 9/2023 | Wang .................. | H04N 19/107 |
| 2023/0319265 A1* | 10/2023 | Wang .................... | H04N 19/70 |
| | | | 375/240.12 |

FOREIGN PATENT DOCUMENTS

| | | |
|---|---|---|
| CN | 113228679 | 8/2021 |
| CN | 113497942 | 10/2021 |
| CN | 113709462 | 11/2021 |
| CN | 113794881 | 12/2021 |
| EP | 3217663 | 9/2017 |
| JP | 2020532226 | 11/2020 |
| WO | 2021001514 | 1/2021 |
| WO | 2021115657 | 6/2021 |

OTHER PUBLICATIONS

JPO, Office Action for JP Application No. 2024-560819, Sep. 5, 2025.

WIPO, International Search Report and Written Opinion for International Application No. PCT/CN2022/086450, Dec. 7, 2022.

WIPO, International Search Report and Written Opinion for International Application No. PCT/CN2022/097978, Dec. 14, 2022.

JPO, Office Action for JP Application No. 2024-560528, Dec. 12, 2025.

EPO, Extended European Search Report for EP Application No. 22936837.8, Dec. 19, 2025.

USPTO, Non-Final Office Action for U.S. Appl. No. 18/915,214, Oct. 2, 2025.

EPO, Extended European Search Report for EP Application No. 22937071.3, Feb. 12, 2026.

* cited by examiner

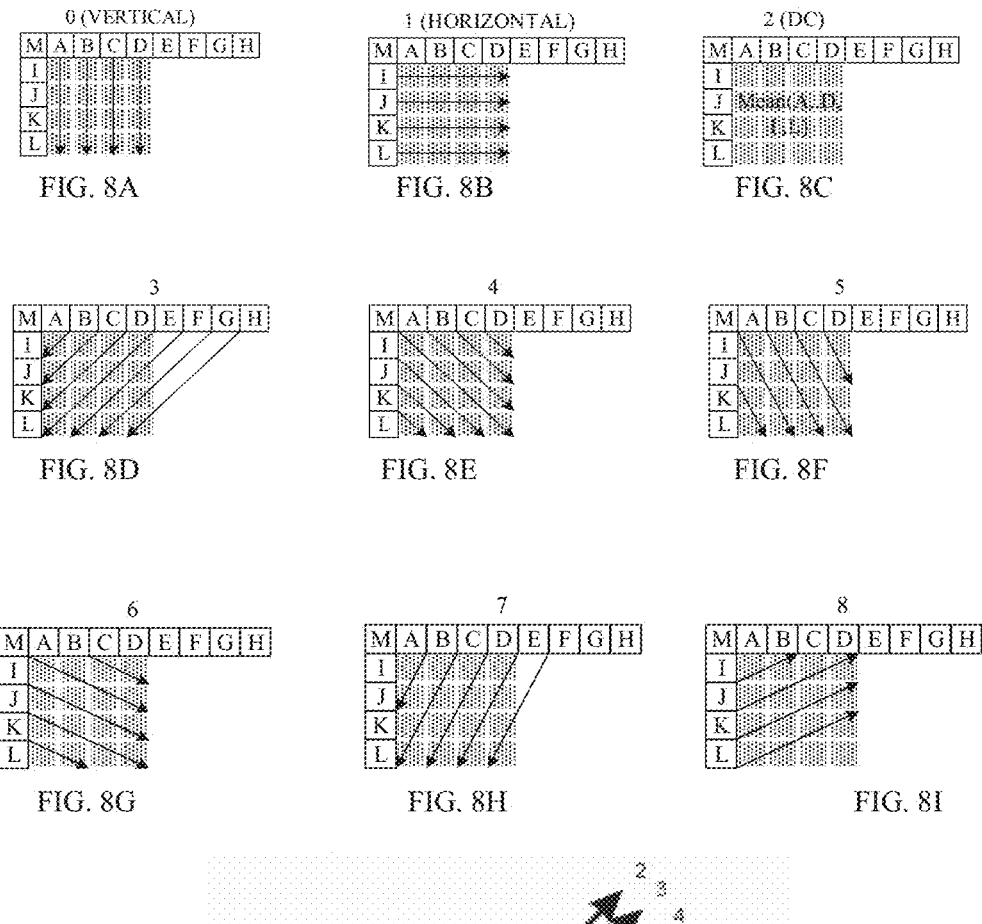
FIG. 8A    FIG. 8B    FIG. 8C
FIG. 8D    FIG. 8E    FIG. 8F
FIG. 8G    FIG. 8H    FIG. 8I
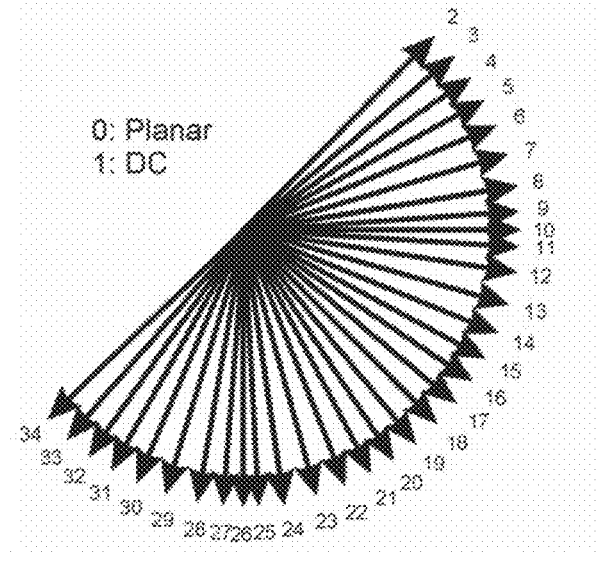
0: Planar
1: DC
FIG. 9

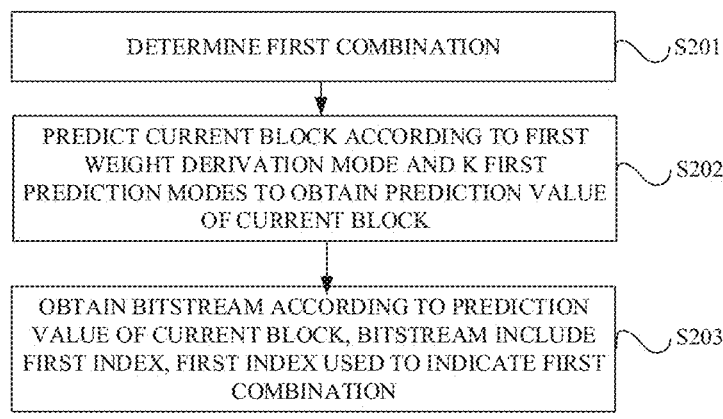

DETERMINE FIRST COMBINATION — S201

PREDICT CURRENT BLOCK ACCORDING TO FIRST WEIGHT DERIVATION MODE AND K FIRST PREDICTION MODES TO OBTAIN PREDICTION VALUE OF CURRENT BLOCK — S202

OBTAIN BITSTREAM ACCORDING TO PREDICTION VALUE OF CURRENT BLOCK, BITSTREAM INCLUDE FIRST INDEX, FIRST INDEX USED TO INDICATE FIRST COMBINATION — S203

FIG. 19

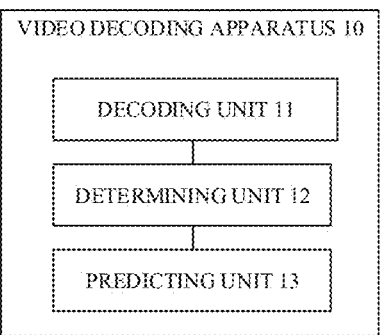

VIDEO DECODING APPARATUS 10

DECODING UNIT 11

DETERMINING UNIT 12

PREDICTING UNIT 13

FIG. 20

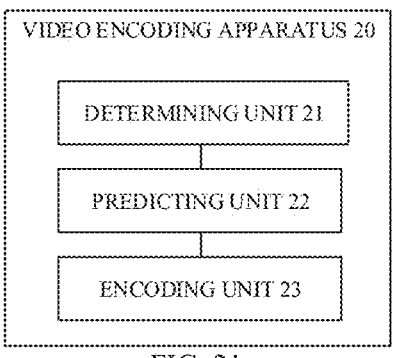

VIDEO ENCODING APPARATUS 20

DETERMINING UNIT 21

PREDICTING UNIT 22

ENCODING UNIT 23

FIG. 21

VIDEO CODING SYSTEM 40

VIDEO ENCODER 41    VIDEO DECODER 42

VIDEO CODING METHOD AND APPARATUS

CROSS-REFERENCE TO RELATED APPLICATION(S)

This application is a continuation of International Application No. PCT/CN2022/086450, filed Apr. 12, 2022, the entire disclosure of which is incorporated herein by reference.

TECHNICAL FIELD

This disclosure relates to the field of video coding technology, and more particularly, to a video coding method and apparatus.

BACKGROUND

Digital video technology may be applied to various video apparatuses, such as digital televisions, smart phones, computers, electronic readers, or video players, etc. With development of video technology, the data amount in video data is large. In order to facilitate transmission of video data, the video apparatus implements video compression technology, so that video data can be transmitted or stored more efficiently.

There is temporal redundancy or spatial redundancy in a video, and redundancy in the video can be eliminated or reduced through prediction, thereby improving compression efficiency. Currently, in order to improve the prediction effect, multiple prediction modes can be used to predict the current block. However, when multiple prediction modes are used to predict the current block, more information needs to be transmitted in the bitstream, thereby increasing the encoding cost.

SUMMARY

In a first aspect, a video decoding method is provided in the disclosure. The method is applied to a decoder. The method includes the following. A bitstream is decoded to obtain a first index, where the first index indicates a first combination consisting of a weight derivation mode and K prediction modes, and the K is a positive integer greater than 1. The first weight derivation mode and the K first prediction modes included in the first combination are determined according to the first index. A current block is predicted according to the first weight derivation mode and the K first prediction modes to obtain a prediction value of the current block.

In a second aspect, a video encoding method is provided in embodiments of the disclosure. The method includes the following. A first combination is determined. The first combination includes a first weight derivation mode and K first prediction modes. A current block is predicted according to the first weight derivation mode and the K first prediction modes to obtain a prediction value of the current block. A bitstream is obtained according to the prediction value of the current block. The bitstream includes a first index and the first index indicates the first combination.

In a third aspect, a video decoding apparatus is provided in the disclosure. The apparatus comprises a memory configured to store computer programs; and a processor configured to invoke and execute the computer programs stored in the memory to perform the method described above in the first aspect or various implementations of the first aspect.

In a fourth aspect, a video encoding apparatus is provided in the disclosure. The apparatus comprises a memory configured to store computer programs; and a processor configured to invoke and execute the computer programs stored in the memory to perform the method described above in the second aspect or various implementations of the second aspect.

BRIEF DESCRIPTION OF THE DRAWINGS

FIG. 8A to FIG. 8I each are a schematic diagram illustrating intra prediction.

FIG. 9 is a schematic diagram illustrating intra prediction modes.

FIG. 19 is a schematic flowchart of a video encoding method provided in an embodiment of the disclosure.

FIG. 20 is a schematic block diagram of a video decoding apparatus provided in an embodiment of the disclosure.

FIG. 21 is a schematic block diagram of a video encoding apparatus provided in an embodiment of the disclosure.

DETAILED DESCRIPTION

The disclosure can be applied to the field of picture coding, video coding, hardware video coding, dedicated circuit video coding, real-time video coding, etc. For example, the solution in the disclosure may be incorporated into audio video coding standards (AVS), such as H.264/audio video coding (AVC) standard, H.265/high efficiency video coding (HEVC) standard, and H.266/versatile video coding (VVC) standard. Alternatively, the solution in the disclosure may be incorporated into other proprietary or industry standards, including ITU-TH.261, ISO/IECMPEG-1Visual, ITU-TH.262 or ISO/IECMPEG-2Visual, ITU-TH.263, ISO/IECMPEG-4Visual, ITU-TH.264 (also known as ISO/IECMPEG-4AVC), including scalable video coding (SVC) and multi-view video coding (MVC) extensions. It should be understood that the techniques in the disclosure are not limited to any particular coding standard or technology.

Figure 1:
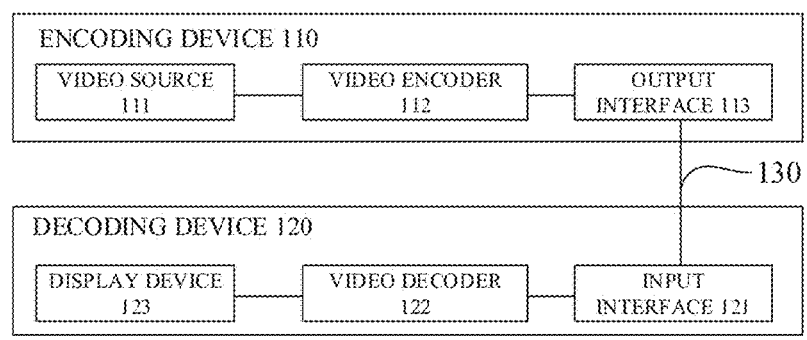
FIG. 1 is a schematic block diagram of a video coding system according to embodiments of the disclosure.

For ease of understanding, a video coding system in embodiments of the disclosure is firstly introduced with reference to FIG. 1.

FIG. 1 is a schematic block diagram of a video coding system 100 according to embodiments of the disclosure. It should be noted that FIG. 1 is only an example, and the video coding system in embodiments of the disclosure includes but is not limited to that illustrated in FIG. 1. As illustrated in FIG. 1, the video coding system 100 includes an encoding device 110 and a decoding device 120. The encoding device is configured to encode (which can be understood as compress) video data to generate a bitstream, and transmit the bitstream to the decoding device. The decoding device decodes the bitstream generated by the encoding device to obtain decoded video data.

The encoding device 110 in the embodiments of the disclosure can be understood as a device having a video encoding function, and the decoding device 120 can be understood as a device having a video decoding function, that is, the encoding device 110 and the decoding device 120 in the embodiments of the disclosure include a wider range of devices, including smartphones, desktop computers, mobile computing devices, notebook (such as laptop) computers, tablet computers, set-top boxes, televisions, cameras, display devices, digital media players, video game consoles, vehicle-mounted computers, and the like.

In some embodiments, the encoding device 110 may transmit encoded video data (such as bitstream) to the decoding device 120 via a channel 130. The channel 130 may include one or more media and/or apparatuses capable of transmitting the encoded video data from the encoding device 110 to the decoding device 120.

In an example, the channel 130 includes one or more communication media that enable the encoding device 110 to transmit the encoded video data directly to the decoding device 120 in real-time. In this example, the encoding device 110 may modulate the encoded video data according to a communication standard and transmit the modulated video data to the decoding device 120. The communication medium includes a wireless communication medium, such as a radio frequency spectrum. Optionally, the communication medium may also include a wired communication medium, such as one or more physical transmission lines.

In another example, the channel 130 includes a storage medium that can store video data encoded by the encoding device 110. The storage medium includes a variety of local access data storage media, such as optical discs, digital versatile discs (DVDs), flash memory, and the like. In this example, the decoding device 120 may obtain the encoded video data from the storage medium.

In another example, the channel 130 may include a storage server that may store video data encoded by the encoding device 110. In this example, the decoding device 120 may download the stored encoded video data from the storage server. Optionally, the storage server may store the encoded video data and may transmit the encoded video data to the decoding device 120. For example, the storage server may be a web server (e.g., for a website), a file transfer protocol (FTP) server, and the like.

In some embodiments, the encoding device 110 includes a video encoder 112 and an output interface 113. The output interface 113 may include a modulator/demodulator (modem) and/or a transmitter.

In some embodiments, the encoding device 110 may include a video source 111 in addition to the video encoder 112 and the output interface 113.

The video source 111 may include at least one of a video capture apparatus (for example, a video camera), a video archive, a video input interface, or a computer graphics system, where the video input interface is configured to receive video data from a video content provider, and the computer graphics system is configured to generate video data.

The video encoder 112 encodes the video data from the video source 111 to generate a bitstream. The video data may include one or more pictures or a sequence of pictures. The bitstream contains encoding information of a picture or a sequence of pictures. The encoding information may include encoded picture data and associated data. The associated data may include a sequence parameter set (SPS), a picture parameter set (PPS), and other syntax structures. The SPS may contain parameters applied to one or more sequences. The PPS may contain parameters applied to one or more pictures. The syntax structure refers to a set of zero or multiple syntax elements arranged in a specified order in the bitstream.

The video encoder 112 directly transmits the encoded video data to the decoding device 120 via the output interface 113. The encoded video data may also be stored on a storage medium or a storage server for subsequent reading by the decoding device 120.

In some embodiments, the decoding device 120 includes an input interface 121 and a video decoder 122.

In some embodiments, the decoding device 120 may include a display device 123 in addition to the input interface 121 and the video decoder 122.

The input interface 121 includes a receiver and/or a modem. The input interface 121 may receive encoded video data through the channel 130.

The video decoder 122 is configured to decode the encoded video data to obtain decoded video data, and transmit the decoded video data to the display device 123.

The display device 123 displays the decoded video data. The display device 123 may be integrated together with the decoding device 120 or external to the decoding device 120. The display device 123 may include various display devices, such as a liquid crystal display (LCD), a plasma display, an organic light emitting diode (OLED) display, or other types of display devices.

In addition, FIG. 1 is only an example, and the technical solutions of the embodiments of the disclosure are not limited to FIG. 1. For example, the technology of the disclosure may also be applied to one-sided video encoding or one-sided video decoding.

In the following, a video encoding framework in embodiments of the disclosure will be introduced.

Figure 2:
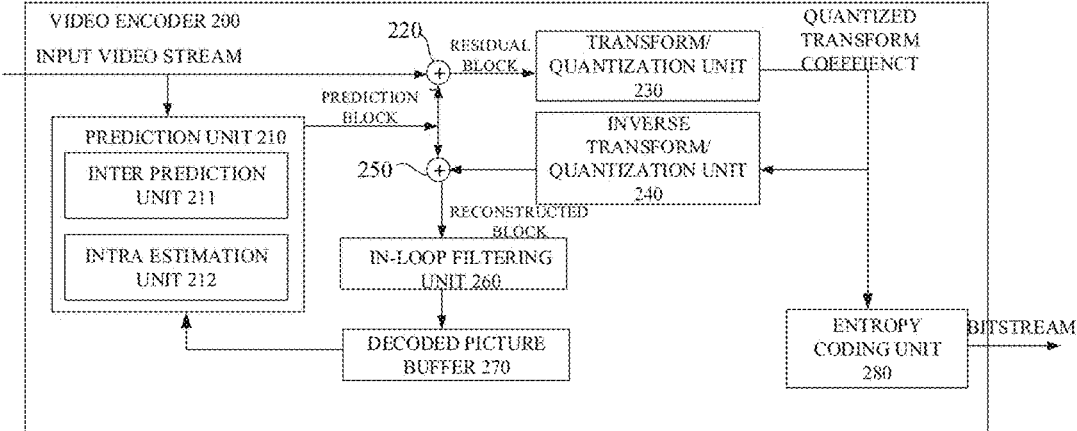
FIG. 2 is a schematic block diagram of a video encoder according to embodiments of the disclosure.

FIG. 2 is a schematic block diagram of a video encoder 200 according to embodiments of the disclosure. It should be understood that the video encoder 200 may be configured to perform lossy compression or lossless compression on a picture. The lossless compression may be visually lossless compression or mathematically lossless compression.

The video encoder 200 may be applied to picture data in luma-chroma (YCbCr, YUV) format. For example, a YUV ratio can be 4:2:0, 4:2:2, or 4:4:4, where Y represents luminance (Luma), Cb (U) represents blue chrominance, and Cr (V) represents red chrominance. U and V represent chrominance (Chroma) for describing colour and saturation. For example, in terms of color format, 4:2:0 represents that every 4 pixels have 4 luma components and 2 chroma components (YYYYCbCr), 4:2:2 represents that every 4 pixels have 4 luma components and 4 chroma component (YYYYCbCrCbCr), and 4:4:4 represents full pixel display (YYYYCbCrCbCrCbCrCbCr).

For example, the video encoder 200 reads video data, and for each picture in the video data, partitions the picture into several coding tree units (CTU). In some examples, the CTU may be called "tree block", "largest coding unit" (LCU), or "coding tree block" (CTB). Each CTU may be associated with a pixel block of the same size as the CTU within the picture. Each pixel may correspond to one luminance (luma) sample and two chrominance (chroma) samples. Thus, each CTU may be associated with one luma sample block and two chroma sample blocks. The CTU may have a size of 128×128, 64×64, 32×32, and so on. The CTU may be further partitioned into several coding units (CUs) for coding. The CU may be a rectangular block or a square block. The CU may be further partitioned into a predicting unit (PU) and a transform unit (TU), so that coding, prediction, and transformation are separated, which is more conducive to flexibility in processing. In an example, the CTU is partitioned into CUs in a quadtree manner, and the CU is partitioned into TUs and PUs in a quadtree manner.

The video encoder and video decoder can support various PU sizes. Assuming that a size of a specific CU is 2N×2N, the video encoder and video decoder may support PUs of 2N×2N or N×N for intra prediction, and support symmetric PUs of 2N×2N, 2N×N, N×2N, N×N, or similar size for inter prediction; and the video encoder and video decoder may also support asymmetric PUs of 2N×nU, 2N×nD, nL×2N, or nR×2N for inter prediction.

In some embodiments, as illustrated in FIG. 2, the video encoder 200 may include a predicting unit 210, a residual unit 220, a transform/quantization unit 230, an inverse transform/quantization unit 240, a reconstruction unit 250, an in-loop filtering unit 260, a decoded picture buffer 270, and an entropy coding unit 280. It should be noted that the video encoder 200 may include more, fewer, or different functional components.

Optionally, in the disclosure, a current block may be referred to as a current CU or a current PU. A prediction block may be referred to as a prediction picture block or a picture prediction block. A reconstructed picture block may be referred to as a reconstructed block or a picture reconstructed block.

In some embodiments, the predicting unit 210 includes an inter predicting unit 211 and an intra estimation unit 212. Since there is a strong correlation between neighbouring samples in a video picture, intra prediction is used in the video coding technology to eliminate spatial redundancy between neighbouring samples. Since there is a strong similarity between neighbouring pictures in video, inter prediction is used in the video coding technology to eliminate temporal redundancy between neighbouring pictures, thereby improving encoding efficiency.

The inter predicting unit 211 may be used for inter prediction. The inter prediction may include motion estimation and motion compensation. In inter prediction, reference can be made to picture information of different pictures. In inter prediction, motion information is used to find a reference block from a reference picture, and a prediction block is generated according to the reference block to eliminate temporal redundancy. A frame for which inter prediction is used may be a P frame and/or a B frame, where P frame refers to a forward prediction frame, and B frame refers to bidirectional prediction frame. In inter prediction, the motion information is used to find a reference block from a reference picture, and a prediction block is generated according to the reference block. The motion information includes a reference picture list containing the reference picture, a reference picture index, and a motion vector. The motion vector can be an integer-sample motion vector or a fractional-sample motion vector. If the motion vector is the fractional-sample motion vector, interpolation filtering on the reference picture is required to generate a required fractional-sample block. Here, an integer-sample block or fractional-sample block found in the reference picture according to the motion vector is called a reference block. In some technologies, the reference block may be called a prediction block, and in some technologies, the prediction block will be generated based on the reference block. Generating the prediction block based on the reference block may also be understood as taking the reference block as a prediction block and then processing to generate a new prediction block based on the prediction block.

The intra estimation unit 212 predicts sample information of the current picture block only with reference to information of the same picture, so as to eliminate spatial redundancy. A frame used for intra prediction may be an I frame.

There are multiple prediction modes for intra prediction. Taking the international digital video coding standard H series as an example, there are 8 angular prediction modes and 1 non-angular prediction mode in H.264/AVC standard, which are extended to 33 angular prediction modes and 2 non-angular prediction modes in H.265/HEVC. The intra prediction mode used in HEVC includes a planar mode, direct current (DC), and 33 angular modes, and there are 35 prediction modes in total. The intra prediction mode used in VVC includes planar, DC, and 65 angular modes, and there are 67 prediction modes in total.

It should be noted that with increase of the number of angular modes, intra prediction will be more accurate, which will be more in line with demand for development of high-definition and ultra-high-definition digital video.

The residual unit 220 may generate a residual block of the CU based on a sample block of the CU and a prediction block of a PU of the CU. For example, the residual unit 220 may generate the residual block of the CU such that each sample in the residual block has a value equal to a difference between a sample in the sample block of the CU and a corresponding sample in the prediction block of the PU of the CU.

The transform/quantization unit 230 may quantize a transform coefficient. The transform/quantization unit 230 may quantize a transform coefficient associated with a TU of a CU based on a quantization parameter (QP) value associated with the CU. The video encoder 200 may adjust the degree of quantization applied to a transform coefficient associated with the CU by adjusting the QP value associated with the CU.

The inverse transform/quantization unit 240 may perform inverse quantization and inverse transform respectively on the quantized transform coefficient, to reconstruct a residual block from the quantized transform coefficient.

The reconstruction unit 250 may add samples in the reconstructed residual block to corresponding samples in one or more prediction blocks generated by the predicting unit 210, to generate a reconstructed picture block associated with the TU. By reconstructing sample blocks of each TU of the CU in this way, the video encoder 200 can reconstruct the sample block of the CU.

The in-loop filtering unit 260 is configured to process an inverse-transformed and inverse-quantized sample, compensate distorted information, and provide a better reference for subsequent sample encoding. For example, the in-loop filtering unit 260 may perform deblocking filtering operations to reduce blocking artifacts of the sample block associated with the CU.

In some embodiments, the in-loop filtering unit 260 includes a deblocking filtering unit and a sample adaptive offset/adaptive loop filtering (SAO/ALF) unit, where the deblocking filtering unit is configured for deblocking, and the SAO/ALF unit is configured to remove a ringing effect.

The decoded picture buffer 270 may store reconstructed sample blocks. The inter predicting unit 211 may use reference pictures including reconstructed sample blocks to perform inter prediction on PUs of other pictures. In addition, the intra estimation unit 212 may use the reconstructed sample blocks in the decoded picture buffer 270 to perform intra prediction on other PUs in the same picture as the CU.

The entropy coding unit 280 may receive the quantized transform coefficient from the transform/quantization unit 230. The entropy coding unit 280 may perform one or more entropy coding operations on the quantized transform coefficient to generate entropy coded data.

Figure 3:
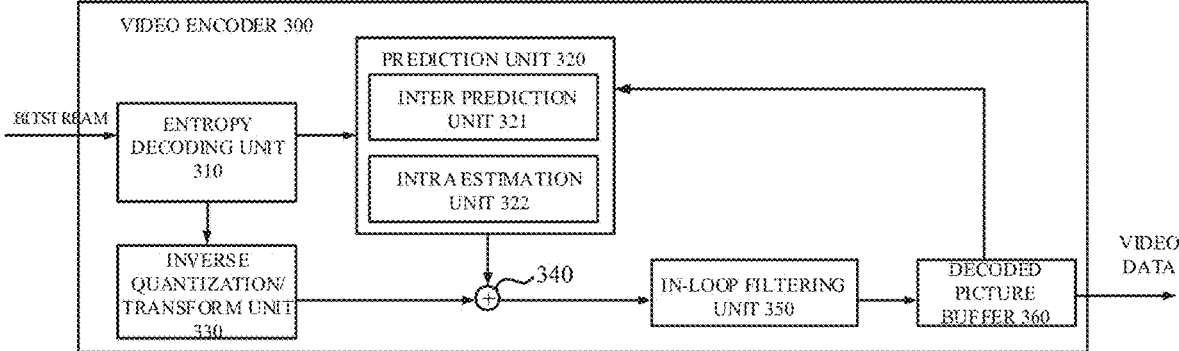
FIG. 3 is a schematic block diagram of a video decoder according to embodiments of the disclosure.

FIG. 3 is a schematic block diagram of a video decoder according to embodiments of the disclosure.

As illustrated in FIG. 3, the video decoder 300 includes an entropy decoding unit 310, a predicting unit 320, an inverse quantization/transform unit 330, a reconstruction unit 340, an in-loop filtering unit 350, and a decoded picture buffer 360. It should be noted that the video decoder 300 may include more, fewer, or different functional components.

The video decoder 300 may receive a bitstream. The entropy decoding unit 310 may parse the bitstream to extract syntax elements from the bitstream. As part of parsing the bitstream, the entropy decoding unit 310 may parse entropy-coded syntax elements in the bitstream. The predicting unit 320, the inverse quantization/transform unit 330, the reconstruction unit 340, and the in-loop filtering unit 350 may decode video data according to the syntax elements extracted from the bitstream, that is, generate decoded video data.

In some embodiments, the predicting unit 320 includes an intra estimation unit 322 and an inter predicting unit 321.

The intra estimation unit 322 may perform intra prediction to generate a prediction block of a PU. The intra estimation unit 322 may use an intra-prediction mode to generate a prediction block of the PU based on a sample block of spatially neighbouring PUs. The intra estimation unit 322 may also determine an intra prediction mode for the PU from one or more syntax elements parsed from the bitstream.

The inter predicting unit 321 can generate a first reference picture list (list 0) and a second reference picture list (list 1) according to the syntax elements parsed from the bitstream. In addition, the entropy decoding unit 310 may parse motion information of the PU if the PU is encoded using inter prediction. The inter predicting unit 321 may determine one or more reference blocks of the PU according to the motion information of the PU. The inter predicting unit 321 may generate a prediction block of the PU based on one or more reference blocks of the PU.

The inverse quantization/transform unit 330 may perform inverse quantization on (that is, dequantize) a transform coefficient associated with a TU. The inverse quantization/transform unit 330 may use a QP value associated with a TU of the CU to determine the degree of quantization.

After inverse quantization of the transform coefficient, the inverse quantization/transform unit 330 may perform one or more inverse transformations on the inverse-quantized transform coefficient in order to generate a residual block associated with the TU.

The reconstruction unit 340 uses the residual block associated with the TU of the CU and the prediction block of the PU of the CU to reconstruct a sample block of the CU. For example, the reconstruction unit 340 may add samples in the residual block to corresponding samples in the prediction block to reconstruct the sample block of the CU to obtain the reconstructed picture block.

The in-loop filtering unit 350 may perform deblocking filtering to reduce blocking artifacts of the sample block associated with the CU.

The video decoder 300 may store the reconstructed picture of the CU in the decoded picture buffer 360. The video decoder 300 may use the reconstructed picture in the decoded picture buffer 360 as a reference picture for subsequent prediction, or transmit the reconstructed picture to a display device for display.

A basic process of video coding is as follows. At an encoding end, a picture is partitioned into blocks, and for a current block, the predicting unit 210 performs intra prediction or inter prediction to generate a prediction block of the current block. The residual unit 220 may calculate a residual block based on the prediction block and an original block of the current block, that is, a difference between the prediction block and the original block of the current block, where the residual block may also be referred to as residual information. The residual block can be transformed and quantized by the transform/quantization unit 230 to remove information that is not sensitive to human eyes, so as to eliminate visual redundancy. Optionally, the residual block before being transformed and quantized by the transform/quantization unit 230 may be called a time-domain residual block, and the time-domain residual block after being transformed and quantized by the transform/quantization unit 230 may be called a frequency residual block or a frequency-domain residual block. The entropy coding unit 280 receives the quantized transformation coefficient output by the transform/quantization unit 230, and may perform entropy coding on the quantized transformation coefficient to output a bitstream. For example, the entropy coding unit 280 can eliminate character redundancy according to a target context model and probability information of a binary bitstream.

At a decoding end, the entropy decoding unit 310 may parse the bitstream to obtain prediction information, a quantization coefficient matrix, etc. of the current block, and the predicting unit 320 performs intra prediction or inter prediction on the current block based on the prediction information to generate a prediction block of the current block. The inverse quantization/transform unit 330 uses the quantization coefficient matrix obtained from the bitstream to perform inverse quantization and inverse transformation on the quantization coefficient matrix to obtain a residual block. The reconstruction unit 340 adds the prediction block and the residual block to obtain a reconstructed block. The reconstructed blocks form a reconstructed picture. The in-loop filtering unit 350 performs in-loop filtering on the reconstructed picture on a picture basis or on a block basis to obtain a decoded picture. Similar operations are also required at the encoding end for obtaining the decoded picture. The decoded picture may also be referred to as a reconstructed picture, and the reconstructed picture may be a reference picture of a subsequent picture for inter prediction.

It should be noted that block partition information as well as mode information or parameter information for prediction, transformation, quantization, entropy coding, and in-loop filtering, etc. determined at the encoding end is carried in the bitstream when necessary. At the decoding end, the bitstream parsed and existing information is analyzed to determine the block partition information as well as the mode information or the parameter information for prediction, transformation, quantization, entropy coding, in-loop filtering, etc. that is the same as such information at the encoding end, so as to ensure the decoded picture obtained at the encoding end is the same as the decoded picture obtained at the decoding end.

The above is the basic process of video coding under a block-based hybrid coding framework. With development of technology, some modules or steps of the framework or process may be optimized. The disclosure is applicable to the basic process of the video coder under the block-based hybrid coding framework, but is not limited to the framework and process.

In some embodiments, the current block may be a current CU or a current PU, etc. Due to requirements of parallel processing, a picture may be partitioned into slices, etc. Slices in the same picture may be processed in parallel, that is, there is no data dependency between the slices. The term "frame" is a common expression. It can be generally understood that a frame is a picture. In the disclosure, the frame may also be replaced with a picture or a slice, etc.

In the video coding standard VVC currently under development, there is an inter prediction mode called geometric partitioning mode (GPM). In the video coding standard AVS currently under development, there is an inter prediction mode called angular weighted prediction (AWP) mode. Although these two modes have different names and implementation details, they share common principles.

It should be noted that in traditional unidirectional prediction, only one reference block with the same size as the current block is searched for, while in traditional bidirectional prediction, two reference blocks with the same size as the current block are used, where a sample value of each sample in a prediction block is an average of samples at corresponding positions in the two reference blocks, that is, all samples in each reference block account for 50%. Bidirectional weighted prediction allows proportions of the two reference blocks to be different, such as 75% for all samples in a $1^{st}$ reference block and 25% for all samples in a $2^{nd}$ reference block, but proportions of all samples in the same reference block are the same. Other optimization methods, such as decoder-side motion vector refinement (DMVR) technology, bi-directional optical flow (BIO), etc., may cause some changes in reference samples or prediction samples. Independent of the principle mentioned above, BIO can also be abbreviated as BDOF. In addition, in GPM or AWP, two reference blocks with the same size as the current block are also used. However, in some sample positions, 100% of sample values at corresponding positions in the $1^{st}$ reference block are used; in some sample positions, 100% of sample values at corresponding positions in the $2^{nd}$ reference block are used; and in a boundary area which is also called a transition area, sample values at corresponding positions in these two reference blocks are used according to a certain proportion (weight). The weights of the boundary area also transition gradually. The allocation of these weights is determined according to the mode of GPM or AWP. The weight of each sample position is determined according to the mode of GPM or AWP. In some cases, such as when the block size is very small, it may not be guaranteed that in some modes of GPM or AWP, some sample position will use the sample value at a position corresponding to the $1^{st}$ reference block one hundred percent, and some sample position will use the sample value at a position corresponding to the $2^{nd}$ reference block one hundred percent. Alternatively, it may be considered that in GPM or AWP, two reference blocks with different sizes from the current block are used, that is, a required part of each reference block is taken as a reference block, in other words, a part with non-zero weights is taken as the reference block, and a part with zero weights is removed. This is an issue of implementation and is not the focus of this disclosure.

Figures 4, 5:
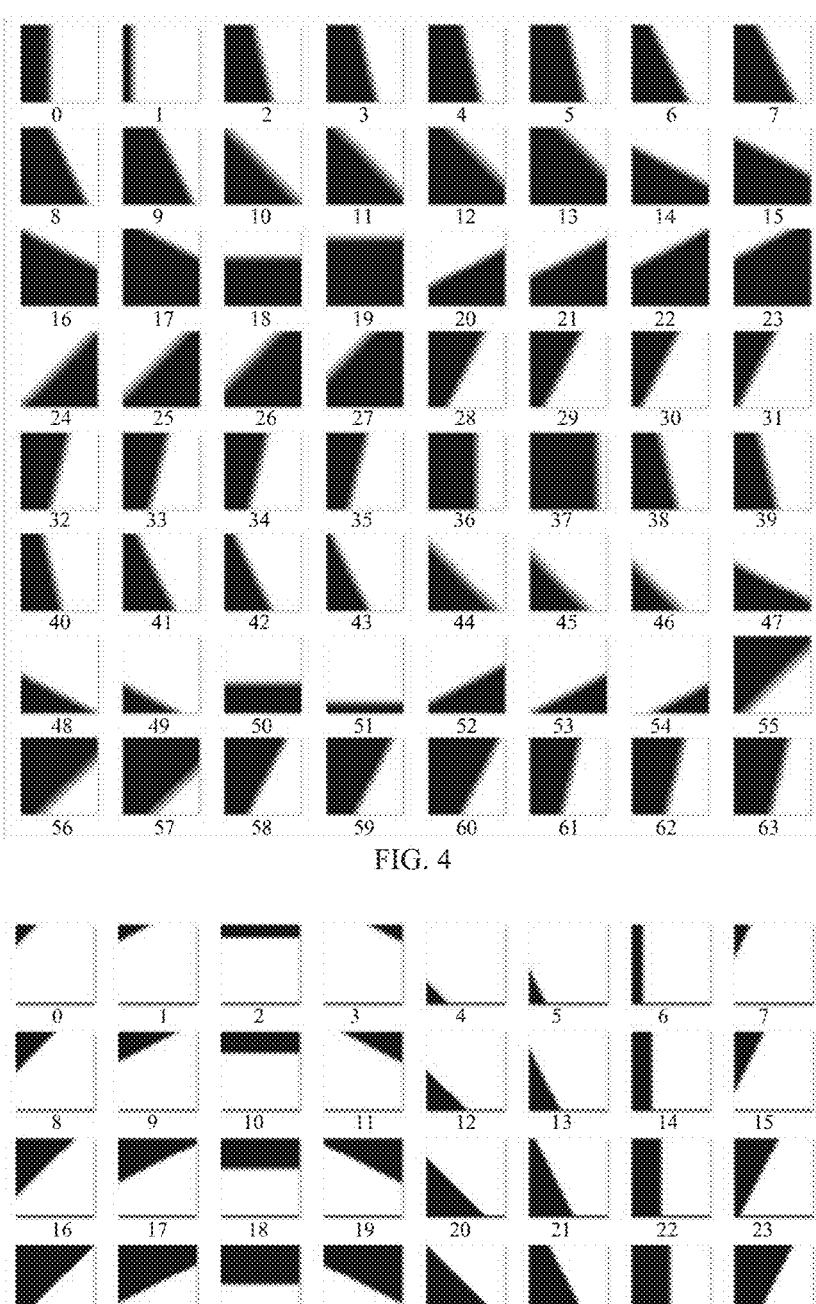
FIG. 4 is a schematic diagram illustrating weight allocation.
FIG. 5 is a schematic diagram illustrating weight allocation.

Exemplarily, FIG. 4 is a schematic diagram illustrating weight allocation. FIG. 4 is a schematic diagram illustrating weight allocation for multiple partitioning modes of GPM on a 64×64 current block provided in embodiments of the disclosure, where GPM has 64 partition modes. FIG. 5 is a schematic diagram illustrating weight allocation. FIG. 5 illustrates a schematic diagram of weight allocation for multiple partitioning modes of AWP on a 64×64 current block provided in embodiments of the disclosure, where AWP has 56 partitioning modes. In each of FIG. 4 and FIG. 5, for each partitioning mode, a black area represents a weight of 0% for corresponding positions in the $1^{st}$ reference block, while a white area represents a weight of 100% for corresponding positions in the $1^{st}$ reference block, a grey area represents a weight greater than 0% and less than 100%, represented by a colour depth, for corresponding positions in the $1^{st}$ reference block, and a weight for a corresponding position in the $2^{nd}$ reference block is 100% minus a weight for a corresponding position in the $1^{st}$ reference block.

GPM and AWP differ in method for weight derivation. For GPM, an angle and an offset are determined according to each mode, and then a weight matrix for each mode is calculated. For AWP, a one-dimensional weight line is firstly defined, and then a method similar to intra angular prediction is used to fill an entire matrix with the one-dimensional weight line.

It should be noted that in earlier coding technologies, only rectangular partitioning was available, no matter whether it is for CU partitioning, PU partitioning, or TU partitioning. However, with GPM or AWP, the effect of non-rectangular partitioning for prediction is achieved without partitioning. In GPM and AWP, a weight mask is used for two reference blocks, namely the weight map as described above. From the mask, weights of the two reference blocks for generating the prediction block are determined. It may be simply understood as that some positions in the prediction block come from the $1^{st}$ reference block and some positions come from the $2^{nd}$ reference block, and a blending area is obtained by weighting corresponding positions in the two reference blocks, which allows a smoother transition. In GPM and AWP, the current block is not partitioned into two CUs or PUs according to a partition line. Therefore, after prediction, the current block is processed as a whole during transformation, quantization, inverse transformation, and inverse quantization of residuals.

In GPM, a weight matrix is used to simulate geometric shape partitioning, or more precisely, simulate partitioning of prediction. To implement GPM, in addition to the weight matrix, two prediction values are also needed, each determined by one unidirectional motion information. These two unidirectional motion information come from a motion information candidate list, such as a merge motion information candidate list (mergeCandList). In GPM, two indices are used in a bitstream to determine the two unidirectional motion information from mergeCandList.

In inter prediction, motion information is used to represent "motion". Basic motion information includes reference frame (or called reference picture) information and motion vector (MV) information. In common bidirectional prediction, a current block is predicted by using two reference blocks. The two reference blocks may be a forward reference block and a backward reference block. Optionally, the two reference blocks are allowed to be both forward or both backward. Forward means that a moment corresponding to the reference picture is before a current picture, and backward means that the moment corresponding to the reference picture is after the current picture. In other words, forward means that a position of the reference picture in a video is before the current picture, and backward means that the position of the reference picture in the video is after the current picture. In other words, forward means that a picture order count (POC) of the reference picture is less than a POC of the current picture, and backward means that the POC of the reference picture is greater than the POC of the current picture. In order to use bidirectional prediction, it is necessary to find two reference blocks, and accordingly, two groups of reference picture information and motion vector information are needed. Each of the two groups may be understood as one unidirectional motion information, and one bidirectional motion information may be obtained by combining the two groups. During implementation, the unidirectional motion information and the bidirectional motion information may use the same data structure, but the two groups of reference picture information and motion vector information in the bidirectional motion information are both valid, while one of the two groups of reference picture information and motion vector information in the unidirectional motion information is invalid.

In some embodiments, two reference picture lists are supported, and are denoted as RPL0, RPL1, where RPL is an abbreviation for reference picture list. In some embodiments, P slice can only use RPL0, and B slice can use RPL0 and RPL1. For a slice, each reference picture list has several reference pictures, and a coder finds a certain reference picture according to a reference picture index. In some embodiments, the motion information is represented by a reference picture index and a motion vector. For example, for the bidirectional motion information described above, a reference picture index refIdxL0 corresponding to RPL0, a motion vector mvL0 corresponding to RPL0, a reference picture index refIdxL1 corresponding to RPL1, and a motion vector mvL1 corresponding to RPL1 are used. Here, the reference picture index corresponding to RPL0 and the reference picture index corresponding to RPL1 may be understood as the reference picture information described above. In some embodiments, two flag bits are used to indicate whether to use motion information corresponding to RPL0 and whether to use motion information corresponding to RPL1 respectively, and are denoted as predFlagL0 and predFlagL1 respectively, which may also mean that predFlagL0 and predFlagL1 indicate whether the unidirectional motion information is "valid". Although such data structure of the motion information is not explicitly indicated, the motion information is indicated by using a reference picture index, a motion vector, and a flag bit indicating validity corresponding to each RPL. In some standard texts, the term "motion vector" is used rather than "motion information", and it may also be considered that the reference picture index and the flag indicating whether to use corresponding motion information are associated with the motion vector. In the disclosure, "motion information" is still used for the convenience of illustration, but it should be understood that "motion vector" may also be used for illustration.

Motion information used for the current block may be stored, and motion information of previously coded blocks such as neighbouring blocks may be used for subsequent coding blocks of the current picture based on a positional relationship. This utilizes spatial correlation, so this kind of coded motion information is called spatial motion information. Motion information used for each block of the current picture may be stored, and motion information of previously coded picture may be used for subsequent coding pictures based on a reference relationship. This utilizes temporal correlation, so this kind of motion information of coded picture is called temporal motion information. The motion information used for each block in the current picture is usually stored in the following manner: a fixed-size matrix such as a 4×4 matrix is usually taken as a minimum unit, and each minimum unit stores a set of motion information separately. In this way, when coding each block, a minimum unit(s) corresponding to a position of the block may store motion information of the block. As such, when spatial motion information or temporal motion information is used, motion information corresponding to a position may be directly found according to the position. For example, if traditional unidirectional prediction is used for a 16×16 block, all 4×4 minimum units corresponding to the block will store motion information of this unidirectional prediction. If GPM or AWP is used for a block, all minimum units corresponding to the block will store motion information determined according to the mode of GPM or AWP, $1^{st}$ motion information, $2^{nd}$ motion information, and a position of each minimum unit. In one manner, if all 4×4 samples corresponding to a minimum unit come from the $1^{st}$ motion information, the minimum unit stores the $1^{st}$ motion information. If all 4×4 samples corresponding to a minimum unit come from the $2^{nd}$ motion information, the minimum unit stores the $2^{nd}$ motion information. If all 4×4 samples corresponding to a minimum unit come from both the $1^{st}$ motion information and the $2^{nd}$ motion information, in AWP, one of the $1^{st}$ motion information and the $2^{nd}$ motion information will be chosen and stored; and in GPM, two motion information will be combined as bidirectional motion information for storage if the two motion information correspond to different RPLs, and otherwise, only the $2^{nd}$ motion information will be stored.

Figure 6A:
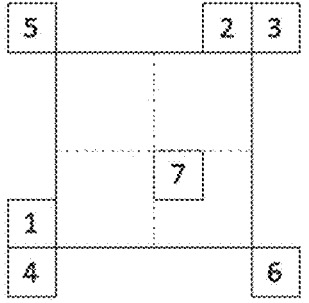
FIG. 6A is a schematic diagram illustrating inter prediction.

Optionally, the aforementioned mergeCandList is generated based on spatial motion information, temporal motion information, history-based motion information, and some other motion information. Exemplarily, for the mergeCandList, positions 1 to 5 in FIG. 6A are used to derive the spatial motion information, and position 6 or 7 in FIG. 6A is used to derive the temporal motion information. For the history-based motion information, motion information of each block is added to a first-in-first-out list when coding the block, and the addition process may require some checks, such as whether the motion information duplicates existing motion information in the list. In this way, reference may be made the motion information in the history-based list when coding the current block.

In some embodiments, the syntax description for GPM is that as illustrated in Table 1.

TABLE 1

| | |
|---|---|
| regular_merge_flag[x0][y0] | ae(v) |
| if( regular_merge_flag[x0][y0] == 1 ) { | |
| if( sps_mmvd_enabled_flag ) | |
| mmvd_merge_flag[x0][y0] | ae(v) |
| if( mmvd_merge_flag[x0][y0] == 1 ) { | |
| if( MaxNumMergeCand > 1 ) | |
| mmvd_cand_flag[x0][y0] | ae(v) |
| mmvd_distance_idx[x0][y0] | ae(v) |
| mmvd_direction_idx[x0][y0] | ae(v) |
| } else if( MaxNumMergeCand > 1 ) | |
| merge_idx[x0][y0] | ae(v) |
| } else { | |
| if( sps_ciip_enabled_flag && sps_gpm_enabled_flag && | |
| sh_slice_type == B && | |
| cu_skip_flag[x0][y0] == 0 && cbWidth >= 8 && | |
| cbHeight >= 8 && | |
| cbWidth < (8*cbHeight) && cbHeight < (8*cbWidth) && | |
| cbWidth < 128 && cbHeight < 128 ) | |
| ciip_flag[x0][y0] | ae(v) |
| if( ciip_flag[x0][y0] && MaxNumMergeCand > 1 ) | |
| merge_idx[x0][y0] | ae(v) |
| if( !ciip_flag[x0][y0] ) { | |
| merge_gpm_partition_idx[x0][y0] | ae(v) |
| merge_gpm_idx0[x0][y0] | ae(v) |
| if( MaxNumGpmMergeCand > 2 ) | |
| merge_gpm_idx1[x0][y0] | ae(v) |
| } | |
| } | |

As illustrated in Table 1, in a merge mode, if regular-merge-flag is not equal to 1, either combined inter-intra prediction (CIIP) or GPM may be used for the current block. If CIIP is not used for the current block, then GPM will be used, as indicated by the syntax "if(!ciip_flag[x0][y0])" in Table 1.

As illustrated in the above Table 1, in GPM, transmission of three information in a bitstream, namely merge_gpm_partition_idx, merge_gpm_idx0, and merge_gpm_idx1, is required, where x0 and y0 are used to determine coordinates (x0, y0) of atop-left luma sample of the current block relative to a top-left luma sample of the picture. merge_gpm_ partition_idx is used to determine a partitioning shape of GPM, which is a "simulated partitioning" as described above. merge_gpm_partition_idx represents a weight matrix derivation mode or an index of the weight matrix derivation mode, or a weight derivation mode or an index of the weight derivation mode in the disclosure. merge_gpm_idx0 represents the $1^{st}$ merge candidate index, and the $1^{st}$ merge candidate index is used to determine the $1^{st}$ motion information or the $1^{st}$ merge candidate according to mergeCandList. merge_gpm_idx1 represents the $2^{nd}$ merge candidate index, and the $2^{nd}$ merge candidate index is used to determine the $2^{nd}$ motion information or the $2^{nd}$ merge candidate according to mergeCandList. merge_gpm_idx1 needs to be decoded only when MaxNumGpmMergeCand is greater than 2, i.e., a length of the candidate list is greater than 2; otherwise, merge_gpm_idx1 may be determined directly.

In some embodiments, a decoding process of GPM includes the following steps.

Information input for the decoding process includes: coordinates (xCb, yCb) of a top-left luma location of the current block relative to a top-left luma location of the picture, a width (cbWidth) of a current luma component, a height (cbHeight) of a current luma component, luma motion vectors mvA and mvB in $\frac{1}{16}$ fractional-sample accuracy, chroma motion vectors mvCA and mvCB, reference picture indices refIdxA and refIdxB, and prediction list flags predListFlagA and predListFlagB.

Exemplarily, the motion information may be represented by a combination of motion vectors, reference picture indices, and prediction list flags. VCC supports two reference picture lists, each of which may have multiple reference pictures. In unidirectional prediction, only one reference block in one reference picture in one reference picture list is used for reference, while in bidirectional prediction, two reference blocks each in one reference picture in one of the two reference picture lists are used for reference. In GPM of VCC, two unidirectional predictions are used. In mvA and mvB, mvCA and mvCB, refIdxA and refIdxB, predList-FlagA and predListFlagB, "A" may be understood as a first prediction mode, and "B" may be understood as a second prediction mode. "X" is used to represent "A" or "B", so that predListFlagX indicates whether a $1^{st}$ reference picture list or a $2^{nd}$ reference picture list is used for X, refIdxX indicates a reference picture index in the reference picture list used for X, mvX indicates a luma motion vector used for X, and mvCX indicates a chroma motion vector used for X. It is repeated again that, the motion information described in the present text may be considered as represented by a combination of motion vectors, reference picture indices, and prediction list flags in VCC.

Information output for the decoding process includes: an (cbWidth)×(cbHeight) array predSamplesL of luma prediction samples; an (cbWidth/SubWidthC)×(cbHeight/SubHeightC) array of chroma prediction samples for the component Cb, if necessary; and an (cbWidth/SubWidthC)×(cbHeight/SubHeightC) array of chroma prediction samples for the component Cr, if necessary.

Exemplarily, the luma component is taken as an example. The processing of the chroma component is similar to that of the luma component.

Let each of predSamplesLAL and predSamplesLBL have a size of (cbWidth)×(cbHeight), which are prediction sample arrays obtained based on two prediction modes. predSamplesL is derived as follows. predSamplesLAL and predSamplesLBL are determined separately according to the luma motion vectors mvA and mvB, chroma motion vectors mvCA and mvCB, reference picture indices refIdxA and refIdxB, and prediction list flags predListFlagA and predListFlagB. In other words, prediction is performed according to motion information of the two prediction modes, and the detailed process thereof is not described herein. Generally, GPM is a merge mode, so that both the two prediction modes of GPM may be considered as merge modes.

According to merge_gpm_partition_idx[xCb][yCb], a partition angle index variable angleIdx and a distance index variable distanceIdx of GPM are determined based on Table 2.

TABLE 2

Correspondence among angleIdx, distanceIdx, and merge_gpm_partition_idx

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |

| merge_gpm_partition_idx | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |

| merge_gpm_partition_idx | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |

| merge_gpm_partition_idx | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

It should be noted that, GPM may be used for each of the three components components (Y, Cb, Cr). Therefore, the process of generating a GPM prediction sample array for a component is encapsulated in a sub-process called "weighted sample prediction process for GPM". This sub-process is invoked for all the three components, with different parameters for each component. Here, the luma component is taken as an example. A prediction array for a current luma block, predSamplesL[xL][yL](where xL=0 . . . cbWidth-1, yL=0 . . . cbHeight-1), is derived from the weighted sample prediction process for GPM. nCbW is set to cbWidth, and nCbH is set to cbHeight. The prediction sample arrays predSamplesLAL and predSamplesLBL generated using the two prediction modes, as well as angleIdx and distanceIdx, are used as inputs.

In some embodiments, the weighted sample prediction and derivation process for GPM includes the following steps.

Inputs to this process are: a width nCbW of the current block, a height nCbH of the current block, two (nCbW)×(nCbH) prediction sample arrays predSamplesLA andpredSamplesLB, a partition angle index variable angleIdx of GPM, a distance index variable distanceIdx of GPM, and a colour component index variable cIdx. Here, a luma component is taken as an example, so that cIdx=0, which indicates the luma component.

Output of this process is the (nCbW)×(nCbH) array pbSamples of prediction sample values of GPM.

Exemplarily, variables nW, nH, shift1, offset1, displacementX, displacementY, partFlip, and shiftHor are derived as follows:

nW=(cIdx==0)?nCbW:nCbW*SubWidthC;

nH=(cIdx==0)?nCbH:nCbH*SubHeightC;

shift1=Max(5, 17—BitDepth), where BitDepth represents a coding bit depth;

offset1=1<<(shift1—1), where "<<" represents shift left;

displacementX=angleIdx;

displacementY=(angleIdx+8) % 32;

partFlip=(angleIdx>=13 && angleIdx<=27)?0:1;

shiftHor=(angleIdx % 16==8 (angleIdx % 16 !=0 && nH>=nW))?0:1.

Variables offsetX and offsetY are derived as follows:
If shiftHor=0:

$$offsetX = (-nW) >> 1$$

$$offsetY = ((-nH) >> 1) +$$
$$(angleIdx < 16 \ ? \ (distanceIdx * nH) >> 3: -((distanceIdx * nH) >> 3))$$

If shiftHor=1:

$$offsetX = ((-nW) >> 1) +$$
$$(angleIdx < 16 \ ? \ (distanceIdx * nW) >> 3: -((distanceIdx * nH) >> 3))$$
$$offsetY = (-nH) >> 1.$$

Variables xL and yL are derived as follows:

$$xL = (cIdx == 0) \ ? \ x:x * SubWidthC;$$

$$yL = (cIdx == 0) \ ? \ y:y * SubHeightC.$$

Variable wValue specifying a weight of a prediction sample at a current position is derived as follows:

wValue is a weight of a predicted sample predSamplesLA [x][y] at (x, y) in a prediction array for the first prediction mode, and (8−wValue) is a weight of a predicted sample predSamplesLB[x][y] at (x, y) in the prediction array for the first prediction mode.

The distance matrix disLut is determined according to Table 3.

TABLE 3

| idx | 0 | 2 | 3 | 4 | 5 | 6 | 8 | 10 | 11 | 12 | 13 | 14 |
|---|---|---|---|---|---|---|---|---|---|---|---|---|
| disLut[idx] | 8 | 8 | 8 | 4 | 4 | 2 | 0 | −2 | −4 | −4 | −8 | −8 |
| idx | 16 | 18 | 19 | 20 | 21 | 22 | 24 | 26 | 27 | 28 | 29 | 30 |
| disLut[idx] | −8 | −8 | −8 | −4 | −4 | −2 | 0 | 2 | 4 | 4 | 8 | 8 |

$$weightIdx = \left(\left((xL + offsetX) << 1\right) + 1\right) * disLut[displacementX] +$$

$$\left(\left((yL + offsetY) << 1\right) + 1\right) * disLut[displacementY];$$

$$weightIdxL = partFlip \ ? \ 32 + weightIdx:32 - weightIdx;$$

$$wValue = \text{Clip3}\left(0, \ 8, \ (weightIdxL + 4) >> 3\right).$$

The prediction sample values pbSamples[x][y] are derived as follows:

$$pbSample[x][y] =$$

$$\text{Clip3}\big(0, \ (1 << BitDepth) - 1, \ (predSamplesLA[x][y] * wValue +$$

$$predSamplesLB[x][y] * (8 - wValue) + \text{offset1}) >> \text{shift1}\big).$$

It should be noted that, for each position in the current block, a weight is derived and then a GPM prediction value pbSamples[x][y] is calculated. In this case, although the weights wValue do not have to be written in matrix form, it may be understood that if each wValue for each position is stored in a matrix, then a weight matrix is formed. The principle of calculating the GPM prediction value by separately calculating the weight for each sample and weighting, and the principle of calculating the GPM prediction sample array by calculating all the weights and then uniformly weighting, are the same. However, the expression of "weight matrix" in various elaborations in the disclosure is for the sake of better understanding, and drawings based on a weight matrix are more intuitive. In fact, elaborations can also be made based the weight of each position. For example, a weight matrix derivation mode may also be referred to as a weight derivation mode.

Figure 6B:
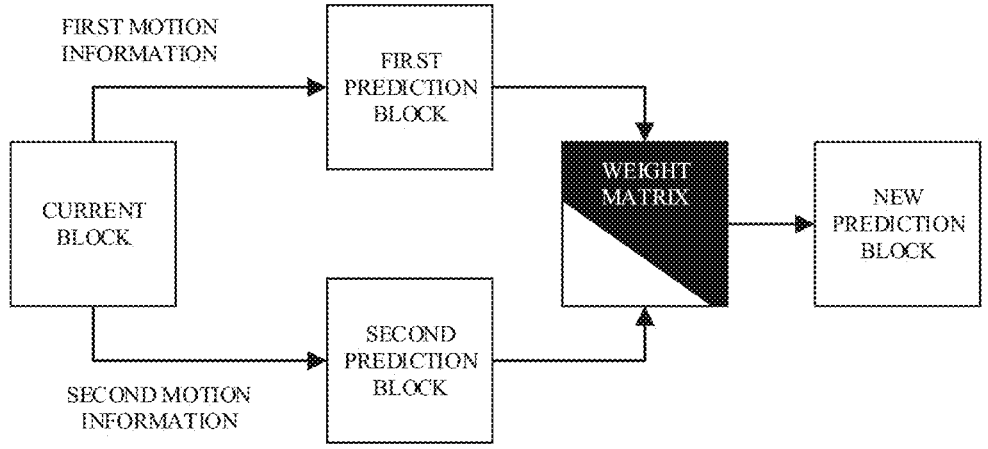
FIG. 6B is a schematic diagram illustrating weighted inter prediction.

In some embodiments, as illustrated in FIG. 6B, a GPM decoding process may be expressed as follows. A bitstream is parsed to determine whether a GPM technology is adopted for the current block. If the GPM technology is adopted for the current block, a weight derivation mode (or a partitioning mode or a weight matrix derivation mode), first motion information, and second motion information are determined. A first prediction block is determined according to the first motion information, a second prediction block is determined according to the second motion information, a weight matrix is determined according to the weight matrix derivation mode, and a prediction block of the current block is determined according to the first prediction block, the second prediction block, and the weight matrix.

Figure 7A:
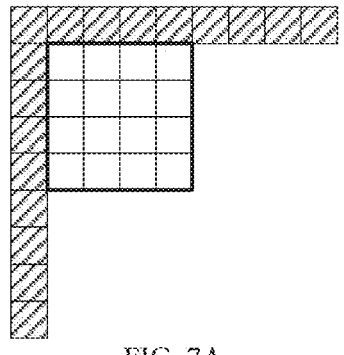
FIG. 7A is a schematic diagram illustrating intra prediction.

In intra prediction, reconstructed samples around the current block that have been coded are used as reference samples to predict the current block. FIG. 7A is a schematic diagram illustrating intra prediction. As illustrated in FIG. 7A, the current block is 4×4 in size, and samples on the left column and the upper row of the current block are used as reference samples of the current block and are used for intra prediction of the current block. These reference samples may all be available, i. e. they have all been coded. Alternatively, some of the reference samples may not be available. For example, if the current block is on the leftmost of a picture, the reference samples on the left of the current block are not available. For another example, when coding the current block, the samples on the bottom left of the current block have not yet been coded, and in this case, reference samples on the bottom left are also not available. For the case where reference samples are not available, available reference samples, some values, or some methods may be used for filling, or no filling may be performed.

Figure 7B:
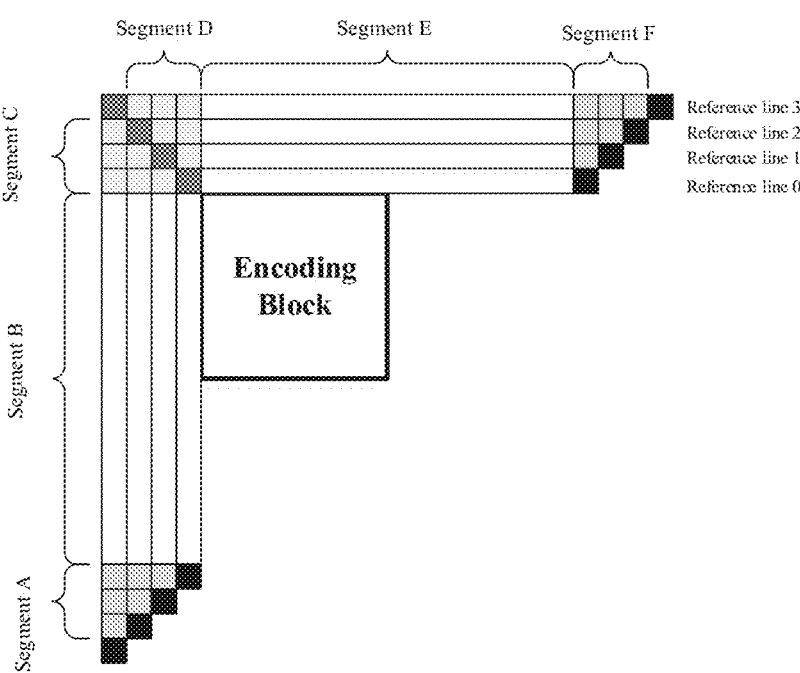
FIG. 7B is a schematic diagram illustrating intra prediction.

FIG. 7B is a schematic diagram illustrating intra prediction. As illustrated in FIG. 7B, with a multiple reference line (MRL) intra prediction method, more reference samples may be used to improve coding efficiency. For example, four reference rows/columns are used as the reference samples of the current block.

Further, there are multiple prediction modes for intra prediction. FIG. 8A-FIG. 8I each are a schematic diagram illustrating intra prediction. As illustrated in FIG. 8A-FIG. 8I, in H.264, there are nine modes for intra prediction of 4×4 blocks. In mode 0 illustrated in FIG. 8A, samples above the current block are copied to the current block vertically as prediction values. In mode 1 illustrated in FIG. 8B, reference samples on the left of the current block are copied to the current block horizontally as prediction values. In mode 2 (DC) illustrated in FIG. 8C, an average value of eight samples (A-D and I-L) is taken as the prediction value of all samples. In mode 3 to mode 8 illustrated in FIG. 8D-FIG. 8I, reference samples are copied to corresponding positions in the current block according to a certain angle, and since some positions in the current block may not correspond exactly to the reference sample, a weighted average of reference samples or interpolated factional samples of the reference samples may be required.

Figure 10:
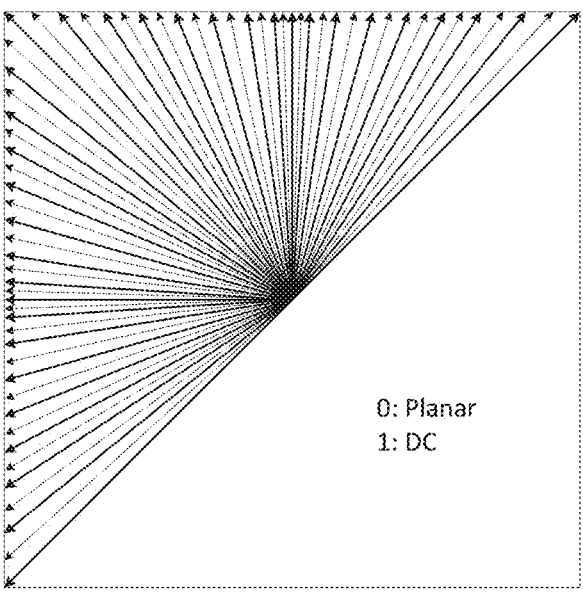
FIG. 10 is a schematic diagram illustrating intra prediction modes.
Figure 11:
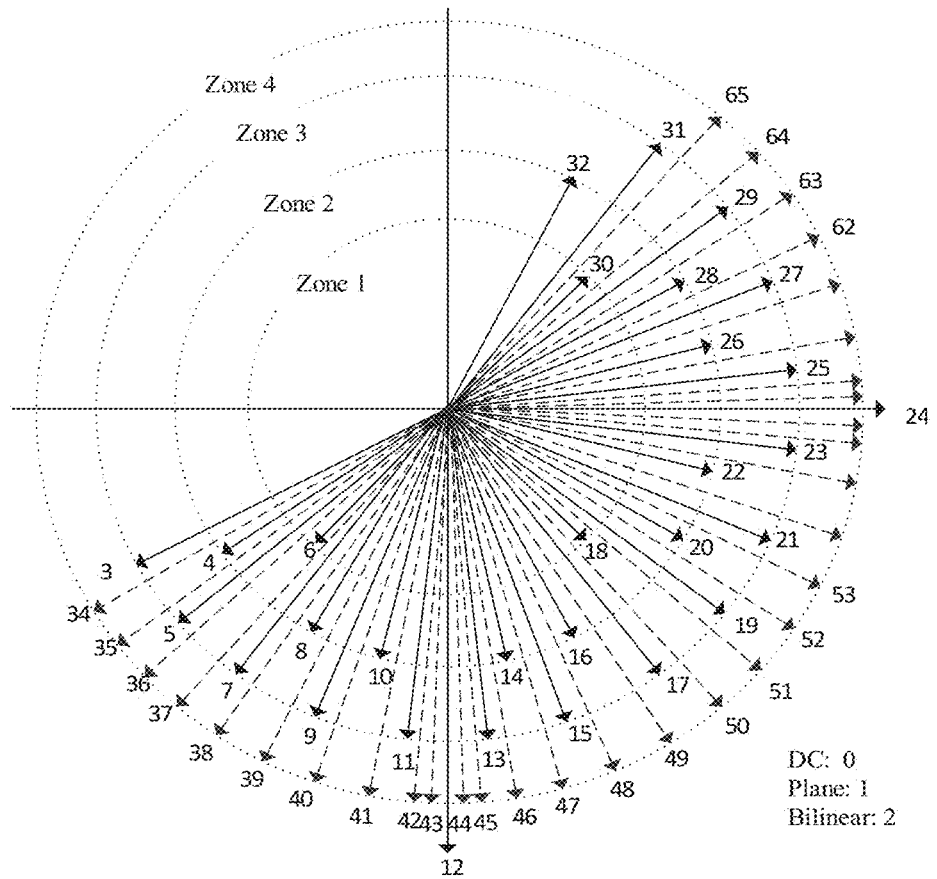
FIG. 11 is a schematic diagram illustrating intra prediction modes.

In addition, there are other modes such as the Plane mode and the planar mode. With development of technology and increase in block size, there are an increasing number of angular prediction modes. FIG. 9 is a schematic diagram illustrating intra prediction modes. As illustrated in FIG. 9, in HEVC, a total of 35 prediction modes are used, including planar, DC, and 33 angular modes. FIG. 10 is a schematic diagram illustrating intra prediction modes. As illustrated in FIG. 10, in VVC, a total of 67 prediction modes are used, including planar, DC, and 65 angular modes. FIG. 11 is a schematic diagram illustrating intra prediction modes. As illustrated in FIG. 11, in VS3, a total of 66 prediction modes are used, including DC, plane, bilinear, PCM and 62 angular modes.

Furthermore, there are some techniques to improve the prediction, such as fractional sample interpolation which improves reference samples, filtering of prediction samples, etc. For example, in multiple intra prediction filter (MIPF) in AVS3, prediction values are generated by using different filters for different block sizes. For different positions of samples within the same block, a filter is used to generate prediction values for samples that are closer to the reference samples, while another filter is used to generate prediction values for samples that are away from the reference samples. With aid of technology for filtering prediction samples, such as intra prediction filter (IPF) in AVS3, the prediction values may be filtered based on the reference samples.

In intra prediction, an intra mode coding technology using a most probable mode (MPM) list may be used to improve coding efficiency. The mode list is generated with intra prediction modes for surrounding coded blocks, intra prediction modes derived from the intra prediction modes for the surrounding coded blocks such as a neighbourhood mode, and some commonly-used or high-probability intra prediction modes such as DC, planar, and bilinear modes. Reference to the intra prediction modes for the surrounding coded blocks utilizes spatial correlation because textures have a certain spatial continuity. The MPM(s) may be used as a prediction for intra prediction modes. That is, it is assumed that the probability of using the MPM for the current block is higher than not using the MPM. Therefore, during binarization, fewer codewords will be assigned to the MPM to reduce overhead and improve coding efficiency.

Figures 12, 13:
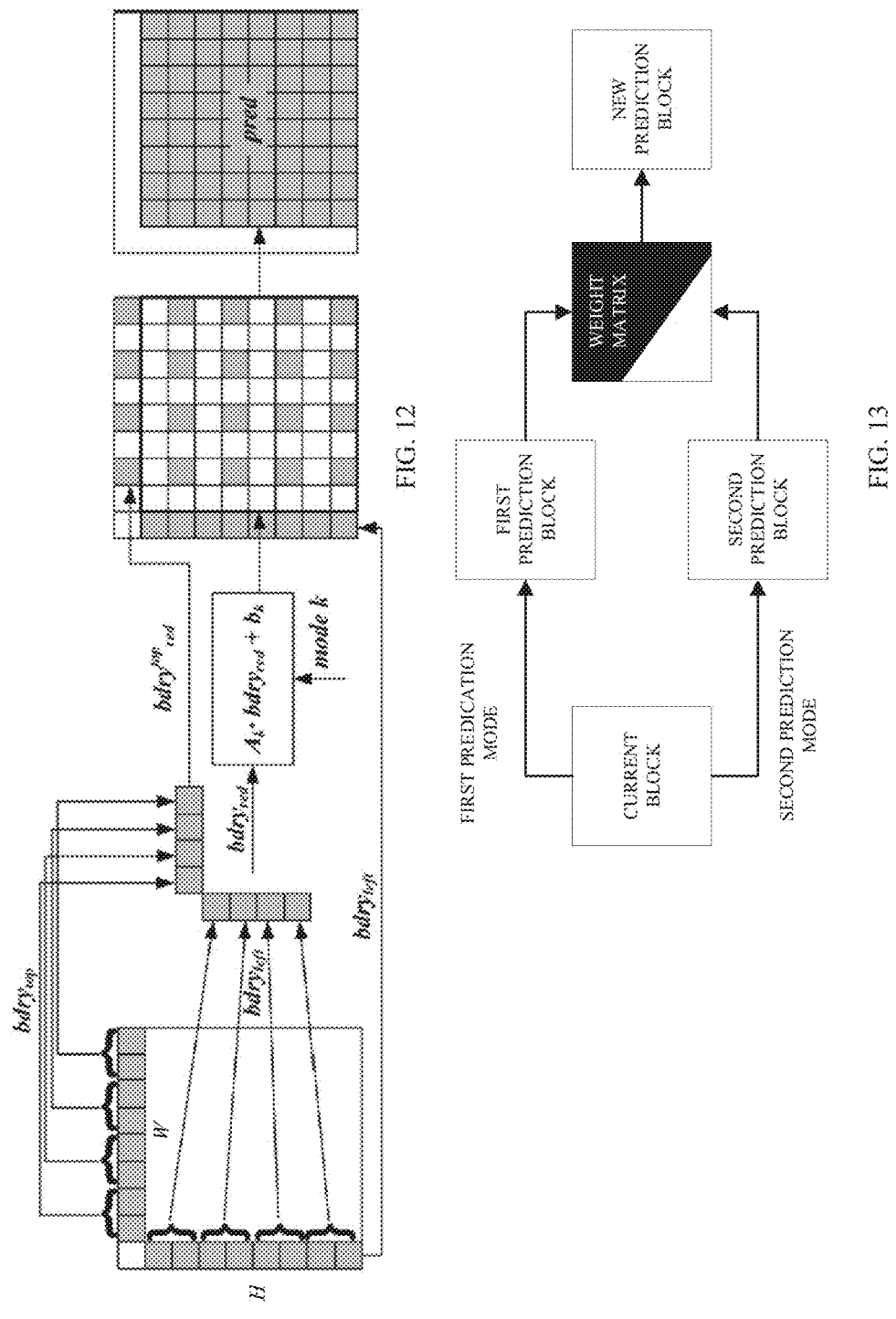
FIG. 12 is a schematic diagram illustrating MIP.
FIG. 13 is a schematic diagram illustrating weighted prediction.

In some embodiments, matrix-based intra prediction (MIP), sometimes also written as matrix weighted intra prediction, may be used for intra prediction. As shown in FIG. 12, in order to predict a block with a width of W and a height of H, in MIP, H reconstructed samples in the left column of the current block and W reconstructed samples in the upper row of the current block are needed as input. In MIP, a prediction block is generated in the following three steps: reference sample averaging, matrix vector multiplication, and interpolation, in which matrix vector multiplication is the core of MIP. MIP may be considered as a process of generating a prediction block using input samples (reference samples) in a manner for matrix vector multiplication. MIP provides various matrices, and the difference in prediction modes is reflected in the difference in matrices. Different results will be obtained for the same input sample, when different matrices are used. The process of reference sample averaging and interpolation is a compromised design between performance and complexity. For a block of with a relatively large size, an effect similar to downsampling may be achieved by reference sample averaging, so that the input may be adapted to a relatively small matrix, while an upsampling effect may be achieved by interpolation. In this way, there is no need to provide an MIP matrix for each size of block, and it is sufficient to only provide one or several matrices of specific sizes. With the increasing demand for compression performance and the improvement of hardware capability, a more complex MIP may appear in the next generation of standard.

MIP is somewhat similar to planar, but it is obviously more complex and more flexible than planar.

In GPM, two inter-prediction blocks are combined by using a weight matrix. In practice, usage of the weight matrix can be extended to combining any two prediction blocks, such as two inter-prediction blocks, two intra-prediction blocks, and one inter-prediction block and one intra-prediction block. A prediction block(s) of intra block copy (IBC) or palette may also be used as one or two of prediction blocks in screen content coding.

In the disclosure, intra, inter, IBC, and palette are referred to as different prediction modes. For ease of elaboration, they are referred to as prediction modes. The prediction mode means that a coder may generate information of a prediction block of the current block according to the prediction mode. For example, in intra prediction, the prediction mode may be a certain intra prediction mode, such as DC, planar, and various intra angular prediction modes. One or more auxiliary information may also be added, for example, an optimization method for intra reference samples, an optimization method (for example, filtering) after a preliminary prediction block is generated, and the like. For example, in inter prediction, the prediction mode may be a skip mode, a merge mode, a merge with motion vector difference (MMVD) mode, or an advanced motion vector prediction (AMVP) mode. The inter prediction mode may be unidirectional prediction, bidirectional prediction, or multi-hypothesis prediction. If unidirectional prediction is used for the inter prediction mode, one motion information needs to be determined by one prediction mode, and a prediction block can be determined according to one motion information. If bidirectional prediction is used for the inter prediction mode, two motion information needs to be determined by one prediction mode, and a prediction block can be determined according to two motion information.

In this way, information that needs to be determined for GPM may be expressed as one weight derivation mode and two prediction modes. The weight derivation mode is used to determine a weight matrix or weights, and the two prediction modes are each used determine a prediction block or prediction value. The weight derivation mode is sometimes referred to as a partitioning mode, but since it is simulated partitioning, the disclosure refers to the partitioning mode as a weight derivation mode.

The two prediction modes may come from the same or different prediction modes, and the prediction modes include but are not limited to intra prediction, inter prediction, IBC, and palette.

Optionally, the two prediction modes may come from the same or different prediction modes, where the prediction mode includes but is not limited to intra prediction, inter prediction, IBC, and palette.

A specific example is as follows. GPM is adopted for the current block and this example is used for an inter-coded block, the intra prediction and the merge mode in the inter prediction are allowed to be used. As illustrated in Table 4, a syntax element intra_mode_idx is added, so as to indicate which prediction mode is an intra prediction mode. For example, if intra_mode_idx=0, it indicates that two prediction modes each are an inter prediction mode, that is, mode0IsInter=1 and mode1IsInter=1. If intra_mode_idx=1, it indicates that the first prediction mode is an intra prediction mode and the second prediction mode is an inter prediction mode, that is, mode0IsInter=0 and mode1IsInter=1. If intra_mode_idx=2, it indicates that the first prediction mode is an inter prediction mode and the second prediction mode is an intra prediction mode, that is, mode0IsInter=1 and mode1IsInter=0. If intra_mode_idx=3, it indicates that the two prediction modes each are an intra prediction mode, that is, mode0IsInter=0, and mode1IsInter=0.

TABLE 4

| | |
|---|---|
| { | |
|     merge_gpm_partition_idx[x0][y0] | ae(v) |
| intra_mode_idx[x0][y0] | ae(v) |
| if( mode0IsInter ) | |
|     merge_gpm_idx0[x0][y0] | ae(v) |
|     if( (!mode0IsInter && mode1IsInter) \|\| | |
| (MaxNumGpmMergeCand > 2 && mode0IsInter && | |
| mode1IsInter)) | |
|     merge_gpm_idx1[x0][y0] | ae(v) |
| } | |

In some embodiments, as illustrated in FIG. 13, a GPM decoding process may be expressed as follows. A bitstream is parsed to determine whether a GPM technology is adopted for the current block. If the GPM technology is adopted for the current block, a weight derivation mode (or a partitioning mode or a weight matrix derivation mode), a first prediction mode, and a second prediction mode are determined. A first prediction block is determined according to the first prediction mode, a second prediction block is determined according to the second prediction mode, a weight matrix is determined according to the weight matrix derivation mode, and a prediction block of the current block is determined according to the first prediction block, the second prediction block, and the weight matrix.

Template matching is originally used in inter prediction. In template matching, by utilizing correlation between neighbouring samples, some regions neighbouring the current block are taken as a template. Before coding the current block, blocks on the left and the top of the current block have already been coded according to a coding order. However, when implemented by an existing hardware decoder, it may not be ensured that blocks on the left and the top of the current block have already been decoded before decoding the current block, where the current block is an inter block. For example, in HEVC, when generating a prediction block for an inter-coding block, neighbouring reconstructed samples are not required, and therefore, a prediction process for the inter block may be performed in parallel. However, for an intra-coding block, reconstructed samples on the left and on the top are required as reference samples. Theoretically, samples on the left and on the top are available, that is, this can be realized by making corresponding adjustments on hardware design. Samples on the right and on the bottom are unavailable based on a coding order in an existing standard such as VVC.

Figure 14:
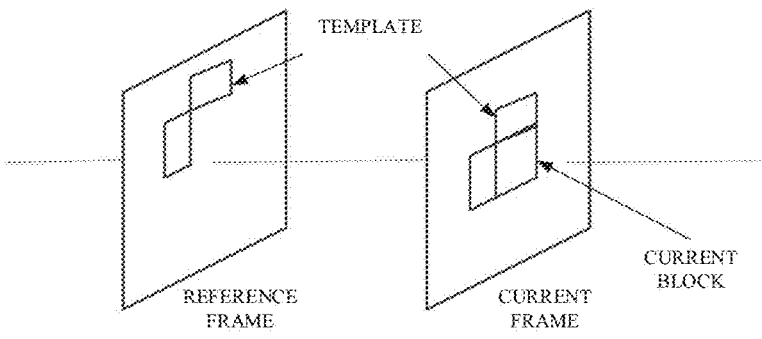
FIG. 14 is a schematic diagram illustrating template matching.

As illustrated in FIG. 14, rectangular regions on the left and the top of the current block are set as a template, where a height of the left part of the template is usually the same as a height of the current block, and a width of the top part of the template is usually the same as a width of the current block. The template may also have a different height or width from the current block. A best matching position of the template is found in a reference picture, so as to determine motion information or a motion vector of the current block. This process may be generally described as follows. In a certain reference picture, search within a certain range starting from a start position. A search rule may be preset, such as a search range and a search step size. Upon moving to a position each time, a degree of matching between a template corresponding to the position and a template neighbouring the current block is calculated. The degree of matching may be measured according to some distortion costs, such as a sum of absolute difference (SAD) and a sum of absolute transformed difference (SATD). A transform used in the SATD is usually a Hadamard transform or a mean-square error (MSE). A lower value of the SAD, the SATD, or the MSE indicates a higher degree of matching. A cost is calculated based on a prediction block of the template corresponding to the position and a reconstructed block of the template neighbouring the current block. In addition to searching for a position of an integer sample, searching for a position of a fractional sample may also be performed. The motion information of the current block is determined according to a position with the highest degree of matching found through searching. Due to correlation between neighbouring samples, motion information suitable for the template may also be motion information suitable for the current block. Template matching may not be applicable to some blocks, and therefore, whether template matching is used for the current block may be determined according to some methods, for example, a control switch is used for the current block to indicate whether to use template matching. Such template matching is also called decoder side motion vector derivation (DMVD). Both an encoder and a decoder may perform searching based on a template to derive motion information or find better motion information based on original motion information. In order to ensure consistency between encoding and decoding, the encoder and the decoder perform searching based on the same rule instead of transmitting a specific motion vector or motion vector difference. With template matching, it is possible to improve compression performance, but the decoder still needs to perform searching, which causes increase in decoder complexity.

The above is a method for applying template matching to inter prediction. Template matching may also be applied to intra prediction, for example, a template is used to determine an intra prediction mode. For the current block, a region within a certain range from the top and the left of the current block may be used as a template, such as a left rectangular region and a top rectangular region illustrated in the foregoing figure. When coding the current block, reconstructed samples in the template are available. This process may be generally described as follows. A set of candidate intra prediction modes is determined for the current block, where the candidate intra prediction modes constitute a subset of all available intra prediction modes, or the candidate intra prediction modes may be a universal set of all available intra prediction modes, which may be determined based on the trade-off between performance and complexity. The set of candidate intra prediction modes may be determined according to an MPM or some rules, such as equidistant selecting. A cost, such as the SAD, the SATD, and the MSE, of each candidate intra prediction mode for the template is calculated. Prediction is performed on the template according to the mode to obtain a prediction block, and the cost is calculated according to the prediction block and a reconstructed block of the template. A mode with lower cost may match the template better, and due to similarity between neighbouring samples, an intra prediction mode that matches well with the template may also be an intra prediction mode that matches well with the current block. One or more modes with low cost are selected. The foregoing two steps may be repeated. For example, after one or more modes with low cost are selected, a set of candidate intra prediction modes is determined, cost is calculated for the newly determined set of candidate intra prediction modes, and one or more modes with lower cost are selected. This may also be understood as a rough selection and a fine selection. The one intra prediction mode finally chosen is determined as the intra prediction mode for the current block, or several intra prediction modes finally chosen are taken as candidates of the intra prediction mode for the current block. The set of candidate intra prediction modes may also be sorted by means of template matching. For example, an MPM list is sorted, that is, for each mode in the MPM list, a prediction block is obtained for the template according to the mode and a cost thereof is determined, and these modes are sorted in an ascending order of cost. Generally, a mode at the front in the MPM list leads to lower overhead in a bitstream, which can also improve compression efficiency.

Template matching may be used to determine two prediction modes of GPM. If template matching is used for GPM, one control switch may be used for the current block to control whether template matching is used for the two prediction modes for the current block, or two control switches may be used respectively to control whether template matching is used for each of the two prediction modes.

Another aspect is how to use template matching. For example, if GPM is used in the merge mode, for example, in GPM in VVC, merge_gpm_idxX is used to determine motion information from mergeCandList, where X=0 or 1. For $X^{th}$ motion information, one method is to perform optimization by means of template matching based on the foregoing motion information. That is, the motion information is determined from mergeCandList according to merge_gpm_idxX. If template matching is used for the motion information, template matching is used to perform optimization based on the motion information. Another method is to determine the motion information directly by searching based on default motion information, instead of using merge_gpm_idxX to determine the motion information from mergeCandList.

If an $X^{th}$ prediction mode is an intra prediction mode and template matching is used for an $X^{th}$ prediction mode for the current block, template matching may be used to determine an intra prediction mode, and an index of the intra prediction mode does not need to be indicated in a bitstream. Alternatively, a candidate set or an MPM list is determined by means of template matching, and an index of the intra prediction mode needs to be indicated in a bitstream.

It can be seen from the above, there are three elements in GPM, one weight matrix and two prediction modes. The advantage of GPM is that it may achieve a more autonomous combination through the weight matrix. On the other hand, as more information needs to be determined in GPM, a greater overhead needs to be paid in the bitstream. Taking GPM in VVC as an example, GPM in VVC is used in the merge mode. In the bitstream, merge_gpm_partition_idx, merge_gpm_idx0, and merge_gpm_idx1 are used to determine the weight matrix, the first prediction mode and the second prediction mode. The weight matrix and the two prediction modes each have multiple possible selections. For example, the weight matrix has 64 possible selections in VCC, while each of merge_gpm_idx0 and merge_gpm_idx1 allows a maximum of 6 possible selections in VVC. Of course, VVC specifies that merge_gpm_idx0 and merge_gpm_idx1 are not the same. Then, such a GPM has 65×6×5 possible selections. If MMVD is used to optimize two motion information (prediction modes), multiple possible selections may be provided for each prediction mode. This number is quite large.

If two intra prediction modes are used in GPM, in which each prediction mode may use 67 common intra prediction modes in VVC, and the two intra prediction modes are different, there are also 64×67×66 possible selections. Of course, in order to save costs, each prediction mode may be limited to only use one subset of all common intra prediction modes, but there are still many possible selections.

Currently, one weight derivation mode and two prediction modes of GPM need to transmit necessary information in the bitstream respectively according to their own rules. For example, the one weight derivation mode has its own one or more syntax elements, the first prediction mode has its own one or more syntax elements, and the second prediction mode has its own one or more syntax elements. Of course, the standard may specify that the second prediction mode cannot be the same as the first prediction mode in some cases, or some optimization measurements may be applied to two prediction modes at the same time (which may also be understood as being applied to the current block), but the three are relatively independent in the writing and parsing of syntax elements. That is, more codewords are needed to indicate the weight derivation mode and the prediction mode, and the encoding overhead is large.

In order to solve the above technical problem, in the disclosure, the weight derivation mode and the K prediction modes are taken as a combination, so that the weight derivation mode and the K prediction modes used by the current block are indicated in the form of a combination in the bitstream, thereby saving codewords and improving coding efficiency.

Figure 15:
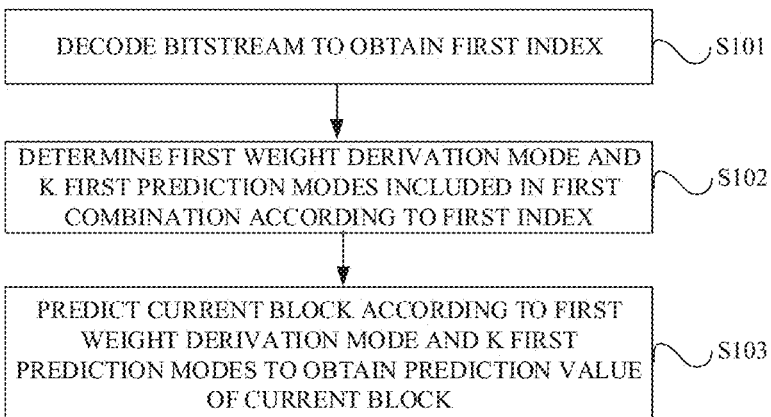
FIG. 15 is a schematic flowchart of a video decoding method provided in an embodiment of the disclosure.

Next, in combination with FIG. 15, the video decoding method provided by embodiments of the disclosure is introduced by taking the decoding end as an example.

FIG. 15 is a schematic flowchart of a video decoding method provided in an embodiment of the disclosure, and the embodiment of the disclosure is applied to the video decoder shown in FIG. 1 and FIG. 3. As shown in FIG. 15, the method of the embodiment of the disclosure includes the following:

S101, a bitstream is decoded to obtain a first index.

The first index indicates a first combination consisting of one weight derivation mode and K prediction modes, and K is a positive integer greater than 1.

From the above, it can see that one weight derivation mode and K prediction modes jointly generate a prediction block, and this prediction block acts on the current block. That is, a weight is determined according to the weight derivation mode, the current block is predicted according to the K prediction modes to obtain K prediction values, and the K prediction values are weighted according to the weight to obtain a prediction value of the current block. It can be seen that the weight derivation mode and the K prediction modes jointly act on the current block as a combination, and they are related to each other.

For example, it is an ideal scenario for inter GPM that the current block contains edges of K relatively moving objects. In theory, this partition should occur at the edges of the objects, but in fact, there are limited possibilities for partition, and it is impossible to cover any edge. Sometimes, a similar partition is selected, and in this way, there may be more than one similar partitions. Which one to select depends on which partition and the K prediction modes as a combination have the best result. Similarly, which prediction mode to select sometimes also depends on which combination has the best result, because even in a portion where the prediction mode is used, for a natural video, this portion is difficult to completely match the current block, and the one with the highest encoding efficiency may be finally selected. Another place where GPM is used more commonly is when the current block contains a portion of an object with relative motion. For example, in places where the swing of an arm causes distortion and deformation, such a partition is vaguer, and it may finally depend on which combination has the best result. Another scenario is intra prediction. It is known that the texture of some portions in a natural picture is very complicated, some portions have a gradual change from one texture to another, and some portions may not be expressed in a simple direction. Intra GPM may provide more complex prediction blocks, and an intra encoded block usually has a larger residual than an inter encoded block under the same quantization. Which prediction mode to select may finally depend on which combination has the best result.

Based on the above description, one weight derivation mode and K prediction modes may act on the current block as a combination. In order to save codewords and reduce the encoding cost, in the embodiments of the disclosure, the weight derivation mode and the K prediction modes corresponding to the current block are taken as a combination, i.e., a first combination, and a first index indicates the first combination. Compared with indicating the weight derivation mode and the K prediction modes separately, in the embodiments of the disclosure, fewer codewords are used, thereby reducing the encoding cost.

Specifically, the encoding end determines a first combination corresponding to the current block, and the first combination consists of one weight derivation mode and K prediction modes. For the convenience of description, the weight derivation mode included in the first combination is referred to as a first weight derivation mode, and the K prediction modes included in the first combination are determined as K first prediction modes. The encoding end uses the first weight derivation mode and the K first prediction modes to predict the current block, thereby obtaining a prediction value of the current block. For example, the first weight derivation mode is used to derive a weight, and the K prediction modes are respectively used to predict the current block, thereby obtaining K prediction values. The K prediction values are weighted according to the derived weight to obtain a prediction value of the current block.

At the same time, in order to maintain the consistency between the encoding end and the decoding end, at the encoding end, the first combination is indicated to the decoding end through the first index, i.e., at the encoding end, the first index is signalled in the bitstream. At the decoding end, the first index is obtained by decoding the bitstream, and then the first combination corresponding to the current block is determined according to the first index, so that the current block is predicted using the first weight derivation mode and the K first prediction modes included in the first combination, thereby obtaining the prediction value of the current block.

The embodiments of the disclosure do not limit the specific syntax element form of the first index.

In a possible implementation, if the current block is predicted using the GPM technology, gpm_cand_idx is used to represent the first index.

As the above first index indicates the first combination, in some embodiments, the first index may also be referred to as a first combination index or an index of the first combination.

In one example, the syntax after adding the first index to the bitstream is shown in Table 5:

TABLE 5

| if( derive the conditions for the current block to use GPM ) | |
| --- | --- |
| { | |
| gpm_cand_idx[ x0 ][ y0 ] | ae(v) |
| } | |
| } | |

Where gpm_cand_idx is the first index.

In some embodiments, at the decoding end, before decoding the first index, whether to use K different prediction modes for weighted prediction of the current block needs to be determined. If it is determined at the decoding end that K different prediction modes are used for weighted prediction of the current block, S101 is performed to decode the bitstream, and the first index is obtained. If it is determined at the decoding end that K different prediction modes are not to be used for weighted prediction of the current block, S101 is skipped.

In a possible implementation, at the decoding end, whether to use K different prediction modes for weighted prediction of the current block may be determined by determining a prediction mode parameter of the current block.

Optionally, in an implementation of the disclosure, the prediction mode parameter may indicate whether a GPM mode or an AWP mode can be used for the current block, that is, indicate whether K different prediction modes can be used for prediction of the current block.

It can be understood that, in the embodiment of the disclosure, the prediction mode parameter may be understood as a flag bit indicating whether the GPM mode or the AWP mode is used. Specifically, at the encoder, a variable may be used as the prediction mode parameter, so that the prediction mode parameter may be set by setting a value of the variable. Exemplarily, in the disclosure, if the GPM mode or the AWP mode is used for the current block, at the encoder, a value of the prediction mode parameter may be set to indicate that the GPM mode or the AWP mode is used for the current block. Specifically, the value of the variable may be set to 1 at the encoder. Exemplarily, in the disclosure, if the GPM mode or the AWP mode is not used for the current block, at the encoder, the value of the prediction mode parameter may be set to indicate that the GPM mode or the AWP mode is not used for the current block. Specifically, the value of the variable may be set to 0 at the encoder. Further, in the embodiment of the disclosure, after setting of the prediction mode parameter is completed, at the encoder, the prediction mode parameter may be signalled into the bitstream and transmitted to the decoder, so that at the decoder, the prediction mode parameter may be obtained after parsing the bitstream.

Based on this, at the decoding end, the bitstream is decoded to obtain the prediction mode parameter, whether the GPM mode or the AWP mode is used for the current block is determined according to the prediction mode parameter, and if the GPM mode or the AWP mode is used for the current block, i. e. K different prediction modes are used for prediction, the weight derivation mode for the current block is determined.

In some embodiments, as shown in Table 5, in the embodiments of the disclosure, the conditions when the GPM mode or the AWP mode can be applied to the current block may also be limited. That is, when it is determined that the current block meets the preset conditions, it is determined that the current block uses the K prediction modes for weighted prediction, and then at the decoding end, the bitstream is decoded, thereby obtaining the first index.

Exemplarily, limitations may be imposed on a size of the current block when applying the GPM mode or the AWP mode.

It may be understood that, in the prediction method provided in the embodiment of the disclosure, it is necessary to use the K different prediction modes to generate the K prediction values, which are then weighted to obtain a prediction value of the current block, in order to reduce complexity while considering the trade-off between compression performance and complexity, the GPM mode or the AWP mode may not be used for blocks with certain sizes in the embodiment of the disclosure. Therefore, in the disclosure, at the decoder, a size parameter of the current block may be firstly determined, and then whether to use the GPM mode or the AWP mode for the current block is determined according to the size parameter.

In the embodiment of the disclosure, the size parameter of the current block may include a height and a width of the current block, and therefore, at the decoder, it may be determined whether the current block uses the GPM mode or the AWP mode based on the height and the width of the current block.

Exemplarily, in the disclosure, if the width of the current block is greater than a first threshold and the height of the current block is greater than a second threshold, it is determined that the GPM mode or the AWP mode is used for the current block. As can be seen, one possible limitation is to use the GPM mode or the AWP mode only when the width of the block is greater than (or greater than or equal to) the first threshold and the height of the block is greater than (or greater than or equal to) the second threshold. The value of each of the first threshold and the second threshold may be 8, 16, 32, etc., and the first threshold may be equal to the second threshold.

Exemplarily, in the disclosure, if the width of the current block is less than a third threshold and the height of the current block is greater than a fourth threshold, it is determined that the GPM mode or the AWP mode is used for the current block. As can be seen, one possible limitation is to use the GPM mode or the AWP mode only when the width of the block is less than (or less than or equal to) the third threshold and the height of the block is greater than (or greater than or equal to) the fourth threshold. The value of each of the third threshold and the fourth threshold may be 8, 16, 32, etc., and the third threshold may be equal to the fourth threshold.

Further, in the embodiment of the disclosure, limitation on the size of a block for which the GPM mode or the AWP mode can be used may also be implemented through limitations on the sample parameter.

Exemplarily, in the disclosure, at the decoder, a sample parameter of the current block may be firstly determined, and then whether the GPM mode or the AWP mode can be used for the current block may be determined according to the sample parameter and a fifth threshold. As can be seen, one possible limitation is to use the GPM mode or the AWP mode only when the number of samples in the block is greater than (or greater than or equal to) the fifth threshold. The value of the fifth threshold may be 8, 16, 32, etc.

That is, in the disclosure, the GPM mode or the AWP mode can be used for the current block when the size parameter of the current block satisfies a size requirement.

Exemplarily, in the disclosure, a flag at a picture-level may be used to determine whether the disclosure is applied to the current decoding picture. For example, it may be configured that the disclosure is applied to an intra frame (such as I frame) but is not applied to an inter frame (such as B frame or P frame). Alternatively, it may be configured that the disclosure is applied to the inter frame but is not applied to the intra frame. Alternatively, it may be configured that the disclosure is applied to some inter frames but is not applied to other inter frames. Since intra prediction may be used for an inter frame, the disclosure may be applied to an inter frame.

In some embodiments, a flag below the picture-level but above a CU level (such as tile, slice, patch, LCU, etc.) may be used to determine whether the disclosure is applied to that region.

S102, the first weight derivation mode and the K first prediction modes included in the first combination are determined according to the first index.

At the decoding end, after the bitstream is decoded and the first index is obtained, the first weight derivation mode and the K first prediction modes included in the first combination are determined according to the first index.

In the disclosure, the weight derivation mode is used to determine weights used for the current block. Specifically, the weight derivation mode may be a mode for deriving weights. For a block of a given length and width, each weight derivation mode may derive one weight matrix. For blocks of the same size, different weight derivation modes derive different weight matrices.

Exemplarily, in the disclosure, AWP has 56 weight derivation modes and GPM has 64 weight derivation modes.

The K different first prediction modes included in the first combination include the following examples.

Example 1: The K different first prediction modes each are an intra prediction mode, for example, the current block is an intra-encoded block and screen content encoding is not applicable.

Example 2: The K different first prediction modes each are an inter prediction mode, for example, the current block is an inter-encoded block.

Example 3: At least one of the K different first prediction modes is an intra prediction mode, and at least one of the K different first prediction modes is an inter prediction mode.

Example 4: At least one of the K different first prediction modes is an intra prediction mode, and at least one of the K different first prediction modes is a non-intra and non-inter prediction mode, for example, an intra block copy (IBC) prediction mode or a palette prediction mode.

Example 5: At least one of the K different first prediction modes is an inter prediction mode, and at least one of the K different first prediction modes is a non-intra and non-inter prediction mode, for example, an IBC prediction mode or a palette prediction mode.

Example 6: None of the K different first prediction modes is an intra prediction mode or an inter prediction mode. For example, one is an IBC prediction mode, and another is a palette prediction mode.

It should be noted that, there is no limitation on the specific types of the K different first prediction modes included in the first combination in embodiments of the disclosure.

In the embodiments of the disclosure, the manner for determining the first weight derivation mode and the K first prediction modes included in the first combination according to the first index at the decoding end, includes, but is not limited to, the following manners.

Manner 1, the first combination corresponding to the first index is determined from multiple preset candidate combinations at the encoding end and the decoding end. For example, the multiple preset candidate combinations include any number of candidate combinations such as 2, 3, 4, 5, 6, 7, 8, and 9. It is assumed that there are 8 candidate combination, each candidate combination includes one weight derivation mode and K prediction modes, and the 8 candidate combinations have different identifiers (or indexes). In this way, at the decoding end, after the first index is obtained, a candidate combination corresponding to the first index is searched for in the multiple candidate combinations, the candidate combination corresponding to the first index is determined as the first combination, then the weight derivation mode included in the candidate combination is determined as a first weight derivation mode, and the K prediction modes included in the candidate combination are determined as K first prediction modes.

Manner 2, at both the decoding end and the encoding end, a list is determined, and the list includes multiple candidate combinations. Therefore, the list is also called a candidate combination list. The first combination corresponding to the first index is determined from the candidate combination list. At this time, S102 includes the following steps:

S102-A, a candidate combination list is determined.

S102-B, the weight derivation mode and the K prediction modes included in the candidate combination corresponding to the first index in the candidate combination list are determined as a first weight derivation mode and K first prediction modes.

The candidate combination list includes multiple candidate combinations, and any candidate combination in the multiple candidate combinations includes one weight derivation mode and K prediction modes.

Exemplarily, the candidate combination list is shown in Table 6:

TABLE 6

| Index | Candidate combination |
|---|---|
| 0 | Candidate combination 1 (including one weight derivation mode and K prediction modes) |
| 1 | Candidate combination 2 (including one weight derivation mode and K prediction modes) |
| . . . | . . . |
| i-1 | Candidate combination i (including one weight derivation mode and K prediction modes) |
| . . . | . . . |

As shown in Table 6, the candidate combination list includes multiple candidate combinations, and any two candidate combinations in the multiple candidate combinations are not exactly the same, i.e., at least one of the weight derivation mode and the K prediction modes included in any two candidate combinations are different. For example, in the candidate combination 1 and the candidate combination 2, the weight derivation modes are different, or in the candidate combination 1 and the candidate combination 2, the weight derivation modes are the same, but at least one of the K prediction modes are different, or in the candidate combination 1 and the candidate combination 2, the weight derivation modes are different, and at least one of the K prediction modes are different.

Exemplarily, the sorting of the candidate combination in the candidate combination list is used as the index in Table 6 above. Optionally, the index of the candidate combination in the candidate combination list may also be reflected in other manners, and this is not limited in embodiments of the disclosure.

In Manner 2, at the decoding end, the bitstream is decoded to obtain the first index, the candidate combination list shown in the Table 6 above is determined, query is performed in the candidate combination list according to the first index, and the first weight derivation mode and the K prediction modes included in the first combination indicated by the first index are obtained.

For example, when the first index is index 1, in the candidate combination list shown in Table 6, the candidate combination corresponding to index 1 is candidate combination 2, that is, the first combination indicated by the first index is candidate combination 2. In this way, at the decoding end, the weight derivation mode and the K prediction modes included in candidate combination 1 are determined as the first weight derivation mode and K first prediction modes included in the first combination, the first weight derivation mode and the K first prediction modes are used to predict the current block, and a prediction value of the current block is obtained.

In Manner 2, at the encoding end and the decoding end, the same candidate combination lists may be determined respectively, for example, at each of the encoding end and the decoding end, a list including N candidate combinations is determined, and each candidate combination includes one weight derivation mode and K prediction modes. In the bitstream, at the encoding end, only the candidate combination finally selected needs to be signalled, such as the first combination, and at the decoding end, the first combination finally selected at the encoding end is parsed. Specifically, at the decoding end, the bitstream is decoded to obtain the first index, and the first combination is determined through the first index in the candidate combination list determined at the decoding end.

In embodiments of the disclosure, the manner for determining the candidate combination list at the decoding end is not limited.

In some embodiments, the candidate combination list is already available. At the decoding end, after the first index is obtained by decoding the bitstream, the candidate combination list may be obtained or read according to the first index, and then the candidate combination corresponding to the first index is queried in the candidate combination list according to the first index.

In some embodiments, the candidate combination list is sent from the encoding end to the decoding end, for example, the candidate combination list is sent to the decoding end, before the current block is encoded at the encoding end.

In some embodiments, the candidate combination list is uploaded from the encoding end to the cloud end, and at the decoding end, the candidate combination list is read from the cloud end, after the bitstream is decoded and the first index is obtained.

In some embodiments, the candidate combination list is generated at the decoding end, for example, at the decoding end, the candidate combination list is generated in response to the first index, after the bitstream is decoded and the first index is obtained.

In embodiments of the disclosure, the manner for forming the candidate combination list at the decoding end is not limited, for example, the probability of occurrence of each combination composed of different weight derivation modes and different prediction modes is analyzed by using information related to the current block, and the candidate combination list is generated according to the probability of occurrence of each combination.

Optionally, the information related to the current block includes mode information of surrounding blocks of the current block, reconstructed samples of the current block, etc.

In some embodiments, at the decoding end, the candidate combination list is generated through the following step S102-A1.

S102-A1, a candidate combination list is generated based on a template of the current block.

In template matching, by utilizing correlation between neighboring samples, some regions neighboring the current block are taken as a template. Before coding the current block, blocks on the left and the top of the current block have already been encoded according to a coding order. In inter prediction, a best matching position of the template is found in a reference picture to determine motion information or a motion vector of the current block. In intra prediction, an intra prediction mode for the current block is determined by using the template.

The template of the current block is composed of the reconstructed regions around the current block, which are correlated to the current block. On this basis, in embodiments of the disclosure, the candidate combination list is generated based on the template of the current block.

There is no limitation on the shape of the template of the current block in the disclosure.

In some embodiments, the template includes at least one of a top encoded region, a left encoded region, or a top-left encoded region of the current block.

Optionally, a width of the top encoded region is the same as a width of the current block, a height of the left encoded region is the same as a height of the current block, a width of the top-left encoded region is the same as a width of the left encoded region, and a height of the top-left encoded region is the same as a height of the top encoded region.

For example, for each combination, the combination is used to predict the template of the current block, to obtain a prediction value of the template with regard to each combination, and a candidate combination list is generated according to a prediction value of the template in each combination.

For each combination, the template of the current block is predicted by using the combination to obtain the prediction value of the template in each combination. Specifically, the weight of the template is derived by using the weight derivation mode included in the combination, the template is predicted by using the K prediction modes included in the combination to obtain K prediction values of the template, and the K prediction values of the template are weighted according to the derived weight of the template to obtain a prediction value of the template under the combination. Finally, a candidate combination list is generated according to the prediction value of the template in each combination.

It should be noted that, the above weights derived according to the weight derivation mode may be understood as a weight corresponding to each sample in the template, and may also be understood as a weight matrix corresponding to the template. When a prediction value of the template is determined based on the weight, K prediction values corresponding to each sample in the template may be determined, a prediction value corresponding to each sample is determined according to the K prediction values and the weight corresponding to each sample, and the prediction value corresponding to each sample in the template constitutes a prediction value of the template. Optionally, when a prediction value of the template is determined based on the weight, it may also be executed with regard to blocks, for example, a prediction value of the template is determined, and the K prediction values of the template are weighted according to the weight matrix of the template to obtain a prediction value of the template.

In some embodiments, S102-A1 includes the following steps S102-A11 to S102-A13.

S102-A11, R second combinations are determined, any second combination in the R second combinations includes one weight derivation mode and K prediction modes, the weight derivation mode and the K prediction modes included in any two combinations in the R second combinations are not completely the same, and R is a positive integer greater than 1.

S102-A12, for any second combination in the R second combinations, the template is predicted using the weight derivation mode and the K prediction modes in the second combination to obtain a template prediction value corresponding to the second combination.

S102-A13, a candidate combination list is generated according to the template prediction value corresponding to each of the R second combinations.

In the embodiment, when a candidate combination list is generated at the decoding end, first, R second combinations are determined. The specific value of "R" is not limited in the disclosure, such as 8, 16 and 32. Each second combination in the R second combinations includes one weight derivation mode and K prediction modes, and the weight derivation mode and the K prediction modes included in any two combinations in the R second combinations are not the same. Subsequently, for each second combination in the R second combinations, the template of the current block is predicted using the weight derivation mode and the K prediction modes included in the second combination to obtain a prediction value of the template in the second combination. Finally, a candidate combination list is generated according to a template prediction value corresponding to each of the R second combinations.

In the forgoing S102-A13, the manner for generating a candidate combination list according to the template prediction value corresponding to each of the R second combinations includes, but is not limited to, the following.

Manner 1, a candidate combination list is generated according to a value of the template prediction value corresponding to each of the R second combinations.

For example, the R second combinations are sorted according to the value of the template prediction value corresponding to each of the R second combinations, and the sorted R second combinations are determined as a candidate combination list. In this case, the candidate combination list includes R candidate combinations.

For another example, the R second combinations are sorted according to the value of the template prediction value corresponding to each of the R second combinations, and N second combinations are selected from the sorted second combinations to generate a candidate combination list. In this case, the candidate combination list includes N candidate combinations.

Manner 2, the foregoing S102-A13 includes the following steps.

S102-A13-1, a cost corresponding to the second combination is determined according to a template prediction value and a reconstruction value of the template corresponding to the second combination.

S102-A13-2, a candidate combination list is generated according to the cost corresponding to each second combination of the R second combinations.

As the template of the current block is a reconstructed region, the reconstruction value of the template may be obtained at the decoding end, so that for each of the R second combinations, a prediction distortion cost corresponding to the second combination may be determined according to the prediction value of the template and the reconstruction value of the template in the second combination. The manner for determining the cost corresponding to the second combination includes, but is not limited to, SAD, SATD, SEE, etc. Then, a candidate combination list is generated according to the cost corresponding to each second combination in the R second combinations.

In S102-A13-2, the manner for generating the candidate combination list according to the cost corresponding to each second combination in the R second combinations includes, but is not limited to, the following examples.

Example 1, the R second combinations are sorted according to the cost corresponding to each second combination in the R second combinations; and the sorted R second combinations are determined as the candidate combination list. The candidate combination list generated in Example 1 includes R candidate combinations.

Optionally, the R candidate combinations in the candidate combination list are sorted in ascending order of the cost, that is, the costs corresponding to the R candidate combinations in the candidate combination list increase sequentially according to the sorting.

Sorting the R second combinations according to the cost corresponding to each second combination in the R second combinations may be to sort the R second combinations in ascending order of the cost.

Example 2, N second combinations are selected from the R second combinations according to the cost corresponding to the second combination, and the list composed of the N second combinations is determined as a candidate combination list.

Optionally, the N second combinations are the first N second combinations with the lowest cost among the R second combinations. For example, N second combinations with the lowest cost are selected from the R second combinations according to the cost corresponding to each second combination in the R second combinations to generate a candidate combination list. In this case, the candidate combination list includes N candidate combinations.

Optionally, the N candidate combinations in the candidate combination list are sorted in ascending order of the cost, that is, the costs corresponding to the N candidate combinations in the candidate combination list increase sequentially according to the sorting.

Next, the process of determining R second combinations in S102-A11 will be introduced.

In some embodiments, the R second combinations are preset. In this way, each second combination in the preset R second combinations is applied to predict the template of the current block to obtain a template prediction value corresponding to each second combination, then a cost corresponding to each second combination is determined according to the template prediction value and the reconstruction value of the template corresponding to each second combination, the R second combinations are sorted according to the cost corresponding to each second combination, and the sorted R second combinations are used as a candidate combination list, or N second combinations with the lowest cost are selected from the sorted R second combinations to generate a candidate combination list.

In some embodiments, S102-A11 includes the following steps.

S102-A11-1, P weight derivation modes and Q prediction modes are determined, P is a positive integer, and Q is a positive integer greater than or equal to K.

S102-A11-2, R second combinations are formed according to the P weight derivation modes and the Q prediction modes, any second combination in the R second combinations includes one weight derivation mode in the P weight derivation modes and K prediction modes in the Q prediction modes, P is a positive integer, and Q is a positive integer greater than or equal to K.

In the embodiment, at the decoding end, first, P weight derivation modes and Q prediction modes are determined, and then R second combinations are formed according to the P weight derivation modes and the Q prediction modes.

For example, the second combination includes one weight derivation mode and two prediction modes. It is assumed that the P weight derivation modes are weight derivation mode 1 and weight derivation mode 2, and the Q prediction modes are prediction mode 1, prediction mode 2, and prediction mode 3. The two weight derivation modes and three prediction modes may be combined into $2 \times 3 \times 2 = 12$ second combinations.

In embodiments of the disclosure, the specific numbers of the foregoing P weight derivation modes and Q prediction modes are not limited.

In one possible implementation, it is assumed that the current block is an intra encoded block, and it is assumed that there are 64 possible weight derivation modes for GPM and 67 possible intra prediction modes for GPM, which may be found in the VVC standard. However, it is not to limit that there are only 64 possible weights for GPM, or specific 64 possible weights are used. It should be noted that the reason why 64 possible weights are selected for GPM of VVC is also a trade-off solution between improving the prediction effect and increasing the overhead in the bitstream. However, a fixed logic is no longer used to encode a weight derivation mode in the disclosure, and therefore, in theory, more kinds of weights may be used and they may be more flexibly used in the disclosure. Similarly, it is not to limit that there are only 67 intra predication modes for GPM, or specific 67 intra predication modes are used. Theoretically, all possible intra prediction modes may be used for GPM. For example, if an intra angular prediction mode is made more detailed and more intra angular prediction modes are generated, more intra angular prediction modes may be used for GPM. For example, the MIP (matrix-based intra prediction) mode of VVC may also be used in the disclosure. However, considering that there are many sub-modes of MIP for selection, MIP is not introduced in the embodiments for convenience of understanding. In addition, there are some wide angular modes which may also be used in the disclosure, and they will not be described in the embodiment.

It is assumed that K=2, the forgoing K prediction modes include a first prediction mode and a second prediction mode, it is assumed that there are all together 67 available prediction modes (i.e. Q=67), the first prediction mode has 67 possibilities, as the second prediction mode is different from the first prediction mode, there are 66 second prediction modes; it is assumed that there are 64 weight derivation modes (i.e. P=64), then in the disclosure, a second combination composed of any two different prediction modes and any one of the weight derivation modes may be used, and there are all together 64*67*66 possible second combinations.

In the implementation, P weight derivation modes are all possible weight derivation modes, for example, 64 weight derivation modes in GPM and Q prediction modes are all possible prediction modes, such as, 67 intra prediction modes in GPM. All possible second combinations are obtained using an exhaustive method, for example, 64*67*66 possible second combinations are obtained. The template of the current block is predicted using each second combination in the 64*67*66 possible second combinations, a distortion cost of each second combination is calculated, and then a candidate combination list corresponding to the current block is obtained according to the distortion cost of each second combination.

In some embodiments, in order to reduce the data volume and improve the generating speed of the candidate combination list, not every prediction mode is tried, and some prediction modes may be selected for trying.

In this case, the implementation for determining Q prediction modes in the foregoing S102-A11-1 includes, but is not limited to, the following manners.

Manner I, the Q prediction modes are preset prediction modes.

Manner II, at least one of a candidate prediction mode list of the current block, alternative prediction mode lists respectively corresponding to the K prediction modes, and a prediction mode corresponding to the weight derivation mode is determined, and Q prediction modes are determined according to the at least one of the candidate prediction mode list, the alternative prediction mode lists respectively corresponding to the K prediction modes, and the prediction mode corresponding to the weight derivation mode.

The candidate prediction mode list includes multiple candidate prediction modes, and the candidate prediction mode list corresponding to any prediction mode in the K prediction modes includes at least one candidate prediction mode.

For example, Q prediction modes are determined according to the candidate prediction mode list of the current block.

For another example, Q prediction modes are determined according to the alternative prediction mode lists respectively corresponding to the K prediction modes.

For another example, Q prediction modes are determined according to the prediction mode corresponding to the weight derivation mode.

For another example, Q prediction modes are determined according to the candidate prediction mode list of the current block and the alternative prediction mode lists respectively corresponding to the K prediction modes.

For another example, Q prediction modes are determined according to the candidate prediction mode list of the current block and the prediction mode corresponding to the weight derivation mode.

For another example, Q prediction modes are determined according to the alternative prediction mode lists respectively corresponding to the K prediction modes and the prediction mode corresponding to the weight derivation mode.

For another example, Q prediction modes are determined according to the candidate prediction mode list, the alternative prediction mode lists respectively corresponding to the K prediction modes, and the prediction mode corresponding to the weight derivation mode.

Determining the alternative prediction mode list respectively corresponding to the K prediction modes may be understood as determining an alternative prediction mode list for each prediction mode in the K prediction modes, and when a second combination is subsequently formed, a certain prediction mode in the second combination is selected from the alternative prediction mode list corresponding to the prediction mode. For example, K=2, K prediction modes include a first prediction mode and a second prediction mode, at the decoding end, alternative prediction mode list 1 is generated for the first prediction mode, and alternative prediction mode list 2 is generated for the second prediction mode. In this way, when different second combinations are formed in a later stage, an alternative prediction mode is selected from alternative prediction mode list 1 as the first prediction mode, and an alternative prediction mode is selected from alternative prediction mode list 2 as the second prediction mode, so that a weight derivation mode as well as the currently selected first prediction mode and second prediction mode constitute a second combination.

In embodiments of the disclosure, the manner for determining the alternative prediction mode list corresponding to each prediction mode in the K prediction modes is not limited.

In one possible implementation, for any prediction mode in the K prediction modes, at least one of the candidate prediction mode list corresponding to the prediction mode and the prediction mode corresponding to the weight derivation mode is determined; and the alternative prediction mode list corresponding to the prediction mode is determined according to the at least one of the candidate prediction mode list and the prediction mode corresponding to the weight derivation mode.

In embodiments of the disclosure, the process of determining a candidate prediction mode list corresponding to a certain one in the K prediction modes is basically similar to the process of determining a candidate prediction mode list corresponding to the current block, and the following description may be referred to for details.

In some embodiments, the candidate prediction mode list includes one or more inter prediction modes, for example, it includes at least one of skip, merge, normal inter prediction mode, unidirectional prediction, bidirectional prediction, multi-hypothesis prediction, etc.

In some embodiments, the candidate prediction mode list includes one or more intra prediction modes, for example, it includes at least one of direct current (DC) mode, PLANAR mode, angular mode, etc. Optionally, the candidate prediction mode list includes at least one intra prediction mode in the MPM list.

In some embodiments, the candidate prediction mode list may also include modes such as IBC and palette.

In the disclosure, the types of prediction modes and the numbers of prediction modes included in the candidate prediction mode list are not limited.

In some embodiments, the candidate prediction mode list is determined by at least one of the following manners.

Manner 1, the candidate prediction mode list includes a preset mode(s).

Manner 2, the candidate prediction mode list includes modes in the MPM list.

In some embodiments, a candidate intra prediction mode list may be an MPM list of the current block, for example, in VVC, an MPM list with a length of 6 may be obtained for the current block. In addition, in some subsequent technical evolutions, there is a solution of a secondary MPM, which may derive an MPM list with a length of 22. It can also be said that lengths of a first MPM list and a second MPM list add up to 22. That is, in embodiments of the disclosure, MPM may be used to select the intra prediction modes.

In some embodiments, if a preset mode is not included in the candidate prediction mode list determined above, the preset mode is added to the candidate prediction mode list.

Optionally, the preset mode includes at least one of DC, horizontal mode and vertical mode.

Optionally, a preset mode may be added in certain conditions, for example, when the number of prediction modes in the candidate prediction modes is less than or equal to a threshold, and the threshold may be 3, 4, 5, 6, etc.

Manner 3, the candidate prediction mode list includes a set of candidate prediction modes determined according to some rules, such as equal spacing selecting.

Manner 4: the candidate prediction mode list is determined according to the prediction mode used by at least one block adjacent to the current block.

For example, the prediction modes used by one or more blocks adjacent to the current block are added to the candidate prediction mode list to obtain a candidate prediction mode list of the current block, or to obtain a candidate prediction mode list corresponding to the $k^{th}$ prediction mode in the K prediction modes, where the $k^{th}$ prediction mode is any prediction mode in the K prediction modes.

For another example, the prediction mode corresponding to the $k^{th}$ prediction mode in the prediction modes used by one or more blocks adjacent to the current block is added to the candidate prediction mode list corresponding to the $k^{th}$ prediction mode. For example, if K=2, the $k^{th}$ prediction mode is the first prediction mode, and two blocks adjacent to the current block are also assumed to use two prediction modes for weighted prediction, where the two prediction modes used by the first adjacent block are respectively prediction mode 1 and prediction mode 3, and the two prediction modes used by the second adjacent block are respectively prediction mode 4 and prediction mode 5, so that prediction mode 1 and prediction mode 4 may be added to the candidate prediction mode list corresponding to the first prediction mode.

It should be noted that the forgoing Manners 1 to 4 may be used alone or in any combination when determining the candidate prediction mode list.

In some embodiments, the candidate prediction mode list includes at least one of a candidate intra prediction mode list and a candidate inter prediction mode list. The candidate intra prediction mode list includes at least one candidate intra prediction mode, and the candidate inter prediction mode list includes at least one candidate inter prediction mode.

According to the foregoing manner, after obtaining the candidate prediction mode list of the current block, Q prediction modes are determined according to the candidate prediction mode list, for example, all or some of the candidate prediction modes included in the candidate prediction mode list are determined as all or some of the Q prediction modes.

The process of determining the prediction mode corresponding to the weight derivation mode is introduced below.

In embodiments of the disclosure, the prediction mode corresponding to the weight derivation mode is a general term, for example, it may be a prediction mode corresponding to one preset weight derivation mode or prediction modes corresponding to several preset weight derivation modes. In some embodiments, the prediction mode corresponding to the weight derivation mode may also be understood as a prediction mode list corresponding to the weight derivation mode, and the prediction mode list includes at least one prediction mode.

In some embodiments, the prediction mode corresponding to the foregoing weight derivation mode includes a prediction mode corresponding to at least one weight derivation mode in the P weight derivation modes. In this case, determining the prediction mode corresponding to the weight derivation mode includes: with respect to the $p^{th}$ weight derivation mode in the P weight derivation modes, determining a prediction mode corresponding to the $p^{th}$ weight derivation mode, and determining a prediction mode corresponding to the foregoing weight derivation mode according to a prediction mode corresponding to at least one weight derivation mode in the P weight derivation modes, where p is a positive integer.

In embodiments of the disclosure, the process of determining the prediction mode corresponding to each of the P weight derivation modes is basically the same. For the convenience of description, the $p^{th}$ weight derivation mode in the P weight derivation modes is taken as an example in the following description.

There are two manners for determining the prediction mode corresponding to the $p^{th}$ weight derivation mode as follows.

Manner 1: if at least one of the prediction modes corresponding to the $p^{th}$ weight derivation mode is an intra prediction mode, an angle index is determined according to the $p^{th}$ weight derivation mode, and an intra prediction mode corresponding to the angle index is determined as at least one of the prediction modes corresponding to the $p^{th}$ weight derivation mode.

The angle index indicates an angle index of a boundary line of weights.

In some embodiments, the angle index is represented by the field "angleIdx".

Table 2 above shows a correspondence between merge_gpm_partition_idx and angleIdx. With reference to Table 2, the angle index may be derived according to the $p^{th}$ weight derivation mode.

In the disclosure, there is a correspondence between angle indices and intra prediction modes, that is, different angle indices correspond to different intra prediction modes.

Exemplarily, the correspondence between angle indices and intra prediction modes is that as illustrated in Table 7.

TABLE 7

| angleIdx | Intra prediction mode |
|---|---|
| 0 | 50 |
| 2 | 42 |
| 3 | 38 |
| 4 | 34 |
| 5 | 30 |
| . . . | . . . |

In manner I, taking K=2 as an example, if the first prediction mode or the second prediction mode is an intra prediction mode, the angle index is determined according to the $p^{th}$ weight derivation mode, for example, the angle index corresponding to the $p^{th}$ weight derivation mode is derived according to Table 2. Then, the intra prediction mode corresponding to the angle index is determined according to Table 7 above, for example, the angle index is 2, and the intra prediction mode corresponding to the angle index is 42, and then the intra prediction mode 42 is determined as the first prediction mode or the second prediction mode.

Manner II: if at least one of the prediction modes corresponding to the $p^{th}$ weight derivation mode is an intra prediction mode, an intra prediction mode corresponding to the $p^{th}$ weight derivation mode is determined, and at least one of the intra prediction modes corresponding to the $p^{th}$ weight derivation mode is determined as at least one of the prediction modes corresponding to the $p^{th}$ weight derivation mode.

The intra prediction mode corresponding to the $p^{th}$ weight derivation mode includes at least one of an intra prediction mode in which a prediction direction is parallel to a boundary line of weights, an intra prediction mode in which a prediction direction is perpendicular to the boundary line, and a planar mode.

It should be noted that the intra prediction mode in which the prediction direction is parallel to the boundary line of weights includes one or several intra prediction modes in which the prediction direction is parallel or approximately parallel to the boundary line of weights. The intra prediction modes in which the prediction direction is perpendicular to the boundary line of weights include one or several intra prediction modes in which the prediction direction is perpendicular or approximately perpendicular to the boundary line of weights.

In Manner II, taking K=2 as an example, if the first prediction mode and/or the second prediction mode is an intra prediction mode, the first prediction mode and/or the second prediction mode is determined from the intra prediction modes corresponding to the weight derivation mode. For example, the first prediction mode and/or the second prediction mode may be an intra prediction mode in which the prediction deriction is in the same line or approximately the same line as the weight partition line (also called the boundary line). Alternatively, the first prediction mode and/or the second prediction mode may be an intra prediction mode in which the prediction direction is perpendicular or approximately perpendicular to the weight boundary line. For example, if the boundary line of weights is in a horizontal direction, such as the modes in which indices of GPM are 18, 19, 50 and 51 in FIG. 4, the first prediction mode and/or the second prediction mode is mode 18 in the horizontal direction or mode 50 in the perpendicular direction.

At the decoding end, a prediction mode corresponding to at least one weight derivation mode in the P weight derivation modes is determined according to the above steps, and then a prediction mode corresponding to the weight derivation mode is determined according to the prediction mode corresponding to at least one weight derivation mode in the P weight derivation modes. For example, all or some of the prediction modes corresponding to at least one weight derivation mode in the P weight derivation modes are taken as the prediction mode corresponding to the weight derivation mode.

Further, as there may be repeated prediction modes in the prediction modes corresponding to the P weight derivation modes, the repeated prediction modes are excluded, and the remaining different prediction modes are determined as the prediction modes corresponding to the weight derivation modes.

In embodiments of the disclosure, in order to reduce the number of R second combinations, the prediction modes are screened. Specifically, Q prediction modes are determined according to the above method.

In some embodiments, in order to reduce the complexity at the decoding end, the number of the Q prediction modes is limited, for example, Q is less than or equal to a first preset threshold. In the disclosure, the specific value of the first preset threshold is not limited, and may be determined according to actual needs, for example, the first preset threshold is 6, i.e., 6 prediction modes are selected to form R second combinations to limit the number of the second combinations.

In some embodiments, the value of Q is related to a size and/or a shape of the current block, where the shape of the current block may be understood to be determined by an aspect ratio of the current block.

During prediction, for relatively small blocks, similar prediction modes have little effect on the prediction results, while for relatively large blocks, similar prediction modes have more obvious effects on the prediction results. Based on this, in embodiments of the disclosure, different Q values are set for blocks of different sizes, that is, a relatively large Q value is set for relatively large blocks and a relatively small Q value is set for relatively large blocks.

In this case, when the value of Q corresponding to the current block is determined, it is set according to the size of the current block. For example, if the size of the current block is greater than a first value, Q is greater than or equal to a second preset threshold. For another example, if the size of the current block is less than or equal to the first value, Q is less than a third preset threshold. In embodiments of the disclosure, the specific value of the first value, the second preset threshold, and the third preset threshold are not limited, where the third preset threshold is less than the second preset threshold.

The process of determining P weight derivation modes in S102-A11-1 is introduced below.

As can be seen from the above, GPM includes 64 weight derivation modes and AWP includes 56 weight derivation modes.

In some embodiments, P weight derivation modes are the 64 weight derivation modes in GPM, or the 56 weight derivation modes in AWP.

In some embodiments, P weight derivation modes are selected from M preset weight derivation modes, where M is a positive integer greater than or equal to P.

The M preset weight derivation modes may be the 64 weight derivation modes in GPM, or the 56 weight derivation modes in AWP, or some weight derivation modes in the 64 weight derivation modes in GPM, or some weight derivation modes in the 56 weight derivation modes in AWP.

In the embodiment, in order to further reduce the number of the R second combinations, the M preset weight derivation modes are screened, and P weight derivation modes may be selected from the M preset weight derivation modes to form R second combinations.

Figure 16A:
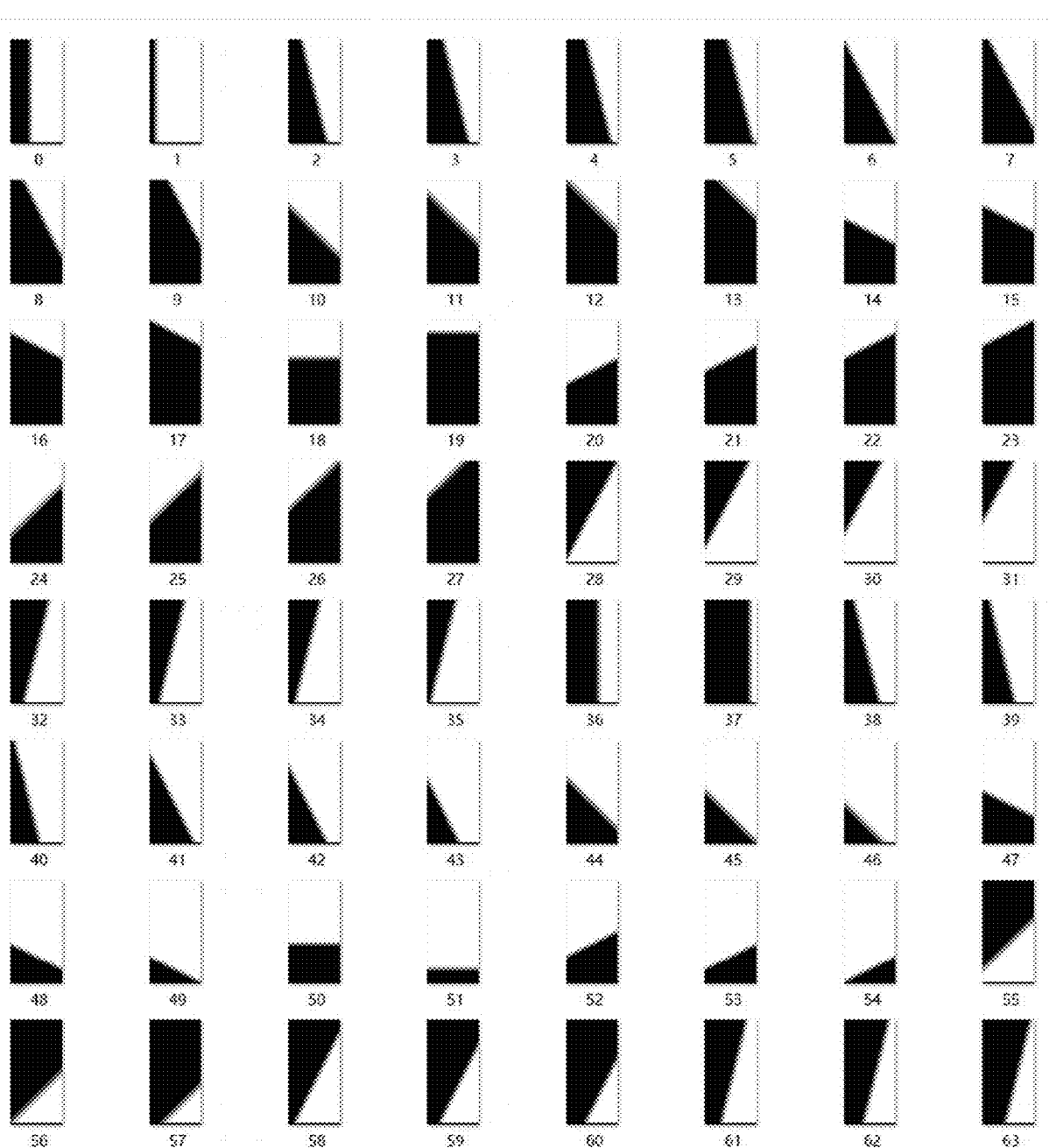
FIG. 16A is a schematic diagram illustrating weight allocation.

In some embodiments, weight derivation modes corresponding to preset partition angles and/or preset offsets are excluded from the M weight derivation modes to obtain P weight derivation modes. As the same partition angle may correspond to multiple offsets in the weight derivation mode, as shown in FIG. 16A, weight derivation modes 10, 11, 12 and 13 have the same partition angle but different offsets, some weight derivation modes corresponding to the preset offset may be excluded, and/or some weight derivation modes corresponding to the preset partition angle may also be excluded. This may reduce the total number of possible second combinations, and make the differences among possible second combinations more obvious.

In some embodiments, as selecting conditions corresponding to different blocks may be different, when P weight derivation modes corresponding to the current block are determined, a selecting condition corresponding to the current block is first determined, and P weight derivation modes are selected from the M weight derivation modes according to the selecting condition corresponding to the current block.

In some embodiments, the selecting condition corresponding to the current block includes a selecting condition corresponding to the size of the current block and/or a selecting condition corresponding to the shape of the current block. During prediction, for relatively small blocks, similar weight derivation modes have little effect on the prediction results, while for relatively large blocks, similar weight derivation modes have more obvious effects on the prediction results. Based on this, in embodiments of the disclosure, different P values are set for blocks of different sizes, that is, a relatively large P value is set for relatively large blocks, while a relatively small P value is set for relatively small blocks.

In some embodiments, the forgoing selecting condition include an array, the array includes M elements, the M elements are in one-one correspondence with the M weight derivation modes, and an element corresponding to each weight derivation mode indicates whether the weight derivation mode is available, where whether the weight derivation mode is available may be understood as whether the weight derivation mode can be used as one weight derivation mode in the P weight derivation modes for forming a second combination subsequently.

The array may be a one-dimensional array or a two-dimensional array.

Exemplarily, taking GPM as an example, there are 64 M weight derivation modes, an array containing 64 elements is set, and a value of each element indicates whether a weight derivation mode corresponding to it is available. Taking a one-dimensional array as an example, a specific example is as follows, and an array of g_sgpm_splitDir is set.

```
g_sgpm_splitDir[64] = {
1,1,1,0,1,0,1,0,
1,0,1,0,1,0,1,0,
1,0,1,1,1,0,1,0,
1,0,1,0,1,0,1,0,
0,0,0,0,1,1,0,1,
0,0,1,0,0,1,0,0,
1,0,1,1,0,1,0,0,
1,0,0,1,0,0,1,0
};
```

The value of g_sgpm_splitDir[x] being 1 indicates that the weight derivation mode with index x is available, and the value of g_sgpm_splitDir[x] being 0 indicates that the weight derivation mode with index x is not available.

In some embodiments, if the selecting condition corresponding to the current block include the selecting condition corresponding to the size of the current block and the selecting condition corresponding to the shape of the current block, and for the same weight derivation mode, if the selecting condition corresponding to the size of the current block and the selecting condition corresponding to the shape of the current block both indicate that the weight derivation mode is available, then the weight derivation mode is determined as one of the P weight derivation modes. If at least one of the selecting condition corresponding to the size of the current block and the selecting condition corresponding to the shape of the current block indicates that the weight derivation mode is not available, then it is determined that the weight derivation mode is not included in the P weight derivation modes.

In some embodiments, for the selecting conditions corresponding to different block sizes and the selecting conditions corresponding to different block shapes, multiple arrays may be used for respective implementations.

In some embodiments, for the selecting conditions corresponding to different block sizes and the selecting conditions corresponding to different block shapes, a two-bit array may be used for implementation, that is, a two-bit array includes both the selecting condition corresponding to the block size and the selecting condition corresponding to the block shape.

Exemplarily, the selecting condition corresponding to a block of size A and shape B is as follows, and the selecting condition is represented by a two-bit array.

```
g_sgpm_splitDir[64] = {
 (1,1) , (1,1) , (1,1) , (1,0) , (1,0) , (0,0) , (1,0), (1,1) ,
 (1,1) , (0,0) , (1,1) , (1,0) , (1,0) , (0,0) , (1,0), (1,1),
 (0,1) , (0,0) , (1,1) , (0,0) , (1,0) , (0,0) , (1,0), (0,0) ,
 (1,1) , (0,0) , (0,1) , (1,0) , (1,0) , (1,0) , (1,0), (0,0) ,
 (0,0) , (0,0) , (1,1) , (0,0) , (1,1) , (1,1) , (1,0), (0,1) ,
 (0,0) , (0,0) , (1,1) , (0,0) , (1,0) , (0,0) , (1,0), (0,0) ,
 (1,0) , (0,0) , (1,1) , (1,0) , (1,0) , (1,0) , (0,0), (0,0) ,
 (1,1) , (0,0) , (1,1) , (0,0) , (0,0) , (1,0) , (1,1), (0,0)
};
```

The values of g_sgpm_splitDir[x] being all 1 indicates that the weight derivation mode with index x is available, and one of the values of g_sgpm_splitDir[x] being 0 indicates that the weight derivation mode with index x is not available. For example, g_sgpm_splitDir[4]=(1,0) indicates that weight derivation mode 4 is available for blocks of size A, but not available for blocks of shape B. Therefore, if a block has size A and shape B, the weight derivation mode is not available.

At the decoding end, after Q prediction modes and P weight derivation modes are determined according to the above steps, R different second combinations are formed according to the Q prediction modes and the P weight derivation modes.

In some embodiments, in order to further improve the speed of generating the candidate combination list, at the decoding end, the Q prediction modes and the P weight derivation modes determined above are screened again. In this case, the foregoing S102-A11-2 of forming R second combinations according to the determined P weight derivation modes and Q prediction modes includes the following steps S102-A11-21 to S102-A11-23.

S102-A11-21, S weight derivation modes are selected from the P weight derivation modes, where S is a positive integer less than or equal to P.

Specifically, the weight derivation modes with a lower probability of occurrence are excluded from the P weight derivation modes determined above, and the screened S weight derivation modes are obtained.

The foregoing method of selecting S weight derivation modes from P weight derivation modes in the S102-A11-21 includes, but is not limited to, the following.

Manner 1, for the $i^{th}$ weight derivation mode in the P weight derivation modes, weights of K second prediction modes for the template are determined according to the $i^{th}$ weight derivation mode, the K second prediction modes are any K prediction modes in the Q prediction modes, and i is a positive integer from 1 to P. If a weight of any prediction mode in the K prediction modes for the template is less than a first preset value, the $i^{th}$ weight derivation mode is excluded from the P weight derivation modes to obtain S weight derivation modes.

In Manner 1, if a template weight derived by a weight derivation mode makes a certain prediction mode have little effect on the template, or have no effect on the template, this weight derivation mode is not used. For example, the weight derivation mode 52 in FIG. 4 (the square block) makes the weight of the second prediction mode on the template relatively small. For another example, the weight derivation mode 54 makes the weight of the second prediction mode on the template 0, that is, it can be considered that in the weight derivation mode 54, the second prediction mode has no effect on the template, and the prediction value of the template is completely determined by the first prediction mode. In this case, the second prediction mode has no effect at all, and such a weight derivation mode needs to be excluded from the P weight derivation modes.

Figure 16B:
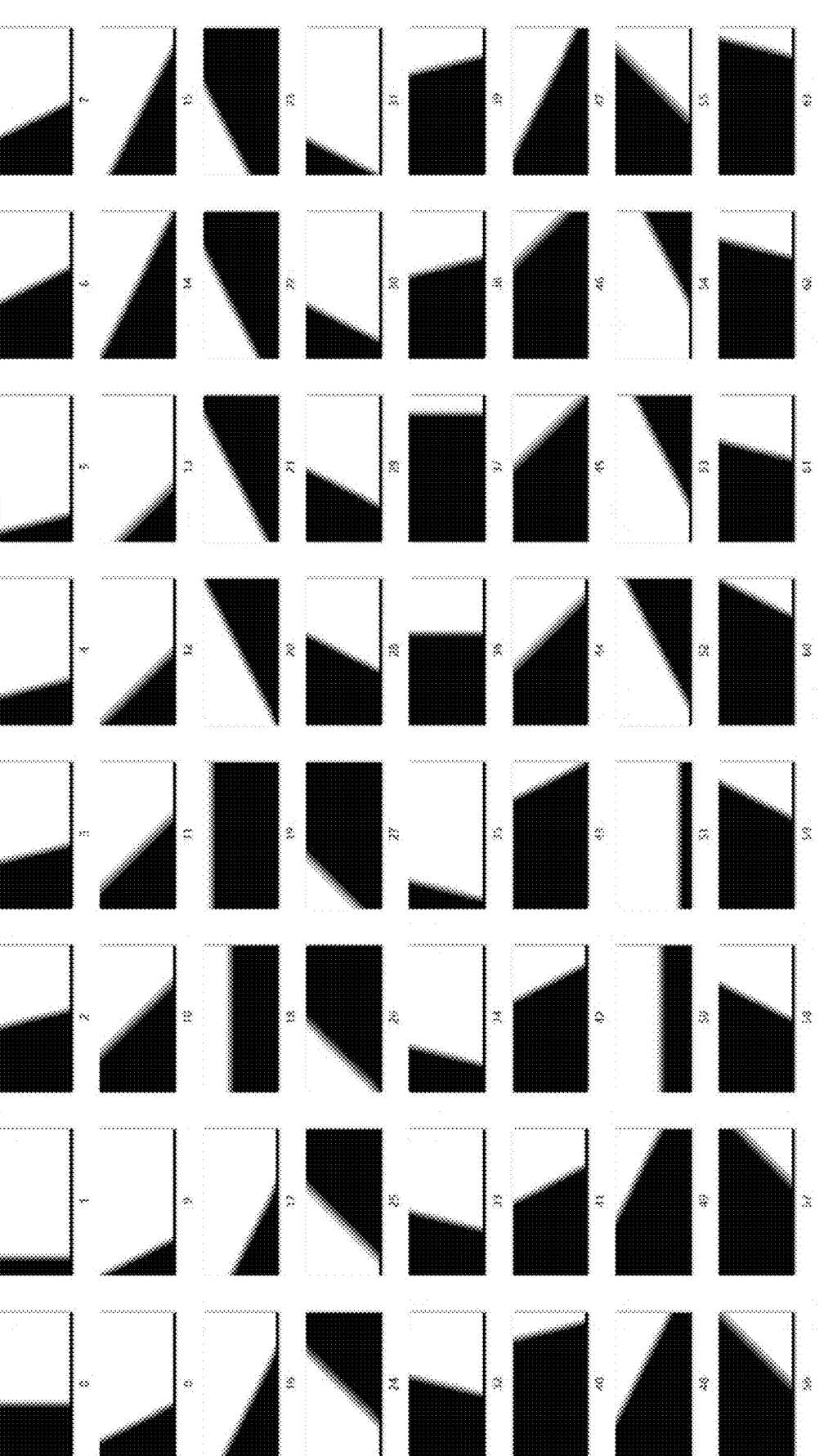
FIG. 16B is another schematic diagram illustrating weight allocation.

It should be noted that the same weight derivation mode for blocks of different shapes may make the effects of the two prediction modes different. As the current block may be a square or a rectangle, a length may be larger than a width or a width may be larger than a length, and the ratio may also be 1:2, 1:4, etc. FIG. 16A and FIG. 16B illustrate the weight derivation modes of GPM in 32×64 blocks and 64×32 blocks. It can be seen that the intersection of a boundary line and a block boundary of the same weight derivation mode for different shapes is not the same. The block shape has changed, but the angle of the boundary line does not change according to the change of the block shape. As shown in FIG. 16A, for the weight derivation mode with index 52, in a 32×64 block, when the dividing surface of the weight derivation mode with index 52 is extended toward the template region of the current block and intersects with the template region, so that the weight of the second prediction mode in the template is not less than a preset value. This indicates that the second prediction mode has an effect on the template. However, as shown in FIG. 16B, for the weight derivation mode with index 52, in a 64×32 block, when the dividing surface of the weight derivation mode with index 52 is extended toward the template region of the current block, it does not intersect with the template region, so that the weight of the second prediction mode in the template is 0. This indicates that the second prediction mode has no effect on the template.

In the forgoing Manner 1, the weight derivation mode which cause the weight of any prediction mode in the K prediction modes for the template being less than the first preset value is excluded from the P weight derivation modes to obtain S weight derivation modes.

In embodiments of the disclosure, the specific value of the first preset value is not limited, for example, it is a smaller value greater than or equal to 0.

Manner 2, for the $i^{th}$ weight derivation mode in the P weight derivation modes, a cost of using the $i^{th}$ weight derivation mode to predict the template is determined, i is a positive integer from 1 to P; and S weight derivation modes are selected from the P weight derivation modes according to the cost corresponding to the $i^{th}$ weight derivation mode.

In Manner 2, S weight derivation modes are selected from the P weight derivation modes by calculating a cost corresponding to each weight derivation mode in the P weight derivation modes.

In embodiments of the disclosure, the weight derivation mode and the K prediction modes are taken as a combination to calculate the cost. In this way, for the convenience of calculation, the cost of the P weight derivation modes is calculated on the basis of the given K prediction modes. That is, the P weight derivation modes are respectively combined with the given K prediction modes to obtain P combinations, and a cost corresponding to each combination in the P combinations is calculated, thereby obtaining costs of the P weight derivation modes.

For example, it is assumed that the given K prediction modes are prediction mode 1 and prediction mode 2, for the $i^{th}$ weight derivation mode in the P weight derivation modes, a combination is constituted by the $i^{th}$ weight derivation mode with prediction mode 1 and prediction mode 2, and is referred to as combination i. The combination i is used to predict the template of the current block to obtain a prediction value of the template under combination i, a prediction distortion cost corresponding to combination i is determined according to the prediction value of the template and a reconstruction value of the template under combination i, and the prediction distortion cost corresponding to combination i is determined as a cost corresponding to the $i^{th}$ weight derivation mode. In this way, a cost corresponding to any weight derivation mode in the P weight derivation modes may be determined.

According to the above method, after the cost corresponding to the $i^{th}$ weight derivation mode in the P weight derivation modes is determined, S weight derivation modes are selected from the P weight derivation modes according to the cost corresponding to the $i^{th}$ weight derivation mode.

In Manner 2, at the decoding end, the manner for selecting S weight derivation modes from the P weight derivation modes according to the cost corresponding to the $i^{th}$ weight derivation mode includes the following:

First manner, if the cost corresponding to the $i^{th}$ weight derivation mode is less than a second preset value, a weight derivation mode similar to the $i^{th}$ weight derivation mode is selected from the P weight derivation modes; and S weight derivation modes are determined according to the $i^{th}$ weight derivation mode and the weight derivation mode similar to the $i^{th}$ weight derivation mode. The weight derivation mode similar to the $i^{th}$ weight derivation mode may be understood as a weight derivation mode having a prediction result similar to a prediction result of the $i^{th}$ weight derivation mode. For example, the weight derivation mode similar to the $i^{th}$ weight derivation mode includes a weight derivation mode having a partition angle similar to a partition angle of the $i^{th}$ weight derivation mode, and/or a weight derivation mode having an offset similar to an offset of the $i^{th}$ weight derivation mode, where an offset of a weight derivation mode may also be understood as an intercept of a boundary line of the weight derivation mode on an edge of the current block.

Exemplarily, the forgoing similar division angle may refer to the same division angle and different offsets, such as the weight derivation mode 11 and the weight derivation mode 13 in FIG. 4, may also refer to the same division angle and similar offsets, such as the weight derivation mode 11 and the weight derivation mode 12 in FIG. 4, may also refer to similar division angles and different offsets, such as the weight derivation mode 9 and the weight derivation mode 11 in FIG. 4, and may also refer to similar division angles and similar offsets, such as the weight derivation mode 9 and the weight derivation mode 12 in FIG. 4.

Exemplarily, the foregoing similar offsets may refer to similar offsets and the same division angle, such as the weight derivation mode 29 and the weight derivation mode 30 in FIG. 4, and may also refer to the same or similar offsets and similar division angles, such as the weight derivation mode 2 and the weight derivation mode 38 in FIG. 4.

In some embodiments, the weight derivation mode similar to the $i^{th}$ weight derivation mode may be understood as a weight derivation mode having an index close to the index of the $i^{th}$ weight derivation mode.

In the first manner, if the cost corresponding to the $i^{th}$ weight derivation mode is less than the second preset value, it indicates that when the $i^{th}$ weight derivation mode is used to predict the current block, a better prediction effect may be achieved. In this case, the $i^{th}$ weight derivation mode is selected from the P weight derivation modes to form a subsequent R second combinations. In addition, as the weight derivation mode similar to the $i^{th}$ weight derivation mode has similar characteristics to the $i^{th}$ weight derivation mode, a weight derivation mode similar to the $i^{th}$ weight derivation mode is selected from the P weight derivation modes to form the subsequent R second combinations. Next, a weight derivation mode is selected from remaining weight derivation modes in the P weight derivation modes as a new $i^{th}$ weight derivation mode, and the above steps are repeated to obtain the S weight derivation modes.

In embodiments of the disclosure, the value of the second preset value is not limited, and it is determined according to actual needs.

In some embodiments, at the decoding end, S weight derivation modes may also be selected from the P weight derivation modes in the following second manner.

Second manner, if a cost corresponding to the $i^{th}$ weight derivation mode is greater than a third preset value, the $i^{th}$ weight derivation mode and a weight derivation mode similar to the $i^{th}$ weight derivation mode are excluded from the P weight derivation modes to obtain at least one weight derivation mode after exclusion; and S weight derivation modes are determined according to the at least one weight derivation mode after exclusion.

In the second manner, if the cost corresponding to the $i^{th}$ weight derivation mode is less than the third preset value, it indicates that when the $i^{th}$ weight derivation mode is used to predict the current block, it may not be possible to achieve a better prediction effect. In this case, the $i^{th}$ weight derivation mode is excluded from the P weight derivation modes. In addition, as a weight derivation mode similar to the $i^{th}$ weight derivation mode has similar characteristics to the $i^{th}$ weight derivation mode, the weight derivation mode similar to the $i^{th}$ weight derivation mode is also excluded from the P weight derivation modes to obtain a set of weight derivation mode after exclusion. Next, in the set of weight derivation mode after exclusion, a weight derivation mode is selected as a new $i^{th}$ weight derivation mode, and the above steps are repeated, so that the weight derivation modes included in the set of weight derivation mode are finally obtained, and determines as the S weight derivation modes.

In embodiments of the disclosure, the value of the third preset value is not limited, and is determined according to actual needs. The third preset value is greater than the second preset value.

According to the above steps, at the decoding end, after S weight derivation modes are selected from the P weight derivation modes, the following steps S102-A11-22 are performed.

S102-A11-22, T prediction modes are selected from Q prediction modes, and T is a positive integer less than or equal to Q.

In embodiments of the disclosure, the manner for selecting T prediction modes from the Q prediction modes are not limited.

In some embodiments, preset T prediction modes are selected from the Q prediction modes.

In some embodiments, for the $i^{th}$ prediction mode in the Q prediction modes, at the decoding end, a cost of using the $i^{th}$ prediction mode to predict the template is determined, i is a positive integer from 1 to Q; and T prediction modes are selected from the Q prediction modes according to the cost corresponding to the $i^{th}$ prediction mode.

In embodiments of the disclosure, the prediction mode and the K prediction modes are taken as a combination to calculate the cost. In this way, for the convenience of calculation, the cost of the Q weight derivation modes is calculated on the basis of the given weight derivation modes and other K−1 prediction modes. That is, the Q prediction modes are respectively combined with the given weight derivation modes and the K−1 prediction modes to obtain Q combinations, and a cost corresponding to each combination in the Q combinations is calculated, thereby obtaining costs of the Q prediction modes.

For example, it is assumed that the given K−1 prediction mode is a prediction mode 1 and the given weight derivation mode is a weight derivation mode 1, for the $i^{th}$ prediction mode in the Q prediction modes, a combination is constituted by weight derivation mode 1 with the $i^{th}$ prediction mode and prediction mode 1, and is referred to as combination i. Combination i is used to predict the template of the current block to obtain a prediction value of the template under combination i, a prediction distortion cost corresponding to combination i is determined according to the prediction value of the template and a reconstruction value of the template under combination i, and the prediction distortion cost corresponding to combination i is determined as a cost corresponding to the $i^{th}$ prediction mode. In this way, a cost corresponding to any prediction mode in the Q prediction modes may be determined.

According to the above method, after the cost corresponding to the $i^{th}$ prediction mode in the Q prediction modes is determined, T prediction modes are selected from the Q prediction modes according to the cost corresponding to the $i^{th}$ prediction mode.

At the decoding end, the manner for selecting T prediction modes from the Q prediction modes according to the cost corresponding to the $i^{th}$ prediction mode includes the following.

First manner, if the cost corresponding to the $i^{th}$ prediction mode is less than a fourth preset value, a prediction mode similar to the $i^{th}$ prediction mode is selected from the Q prediction modes; and T prediction modes are determined according to the $i^{th}$ prediction mode and the prediction mode similar to the $i^{th}$ prediction mode. The prediction mode similar to the $i^{th}$ prediction mode may be understood as a prediction mode having a prediction result similar (close) to a prediction result of the $i^{th}$ prediction mode, for example, a prediction mode having a prediction direction (or angle) close to the prediction direction (or angle) of the $i^{th}$ prediction mode, or a prediction mode having a prediction mode index close to the index of the $i^{th}$ prediction mode, such as, a prediction mode having an index which is 1, 2, etc. larger than the index of the $i^{th}$ prediction mode, or a prediction mode having an index which is 1, 2, etc. smaller than the index of the $i^{th}$ prediction mode.

In the first manner, if the cost corresponding to the $i^{th}$ prediction mode is less than the fourth preset value, it indicates that when the $i^{th}$ prediction mode is used to predict the current block, a better prediction effect may be achieved. In this case, the $i^{th}$ prediction mode is selected from the Q prediction modes to form subsequent R second combinations. In addition, as the prediction mode similar to the $i^{th}$ prediction mode has similar characteristics to the $i^{th}$ prediction mode, a prediction mode similar to the $i^{th}$ prediction mode is selected from the Q prediction modes to form the subsequent R second combinations. Next, a prediction mode is selected from remaining prediction modes in the Q prediction modes as a new $i^{th}$ prediction mode, and the above steps are repeated to obtain the T prediction modes.

In embodiments of the disclosure, the value of the fourth preset value is not limited, and it is determined according to actual needs.

Second manner, if a cost corresponding to the $i^{th}$ prediction mode is greater than a fifth preset value, the $i^{th}$ prediction mode and a prediction mode similar to the $i^{th}$ prediction mode are excluded from the Q prediction modes to obtain at least one prediction mode after exclusion; and T prediction modes are determined according to the at least one prediction mode after exclusion.

In the second manner, if the cost corresponding to the $i^{th}$ prediction mode is larger than fifth preset value, it indicates that when the $i^{th}$ prediction mode is used to predict the current block, it may not be possible to achieve a better prediction effect. In this case, the $i^{th}$ prediction mode is excluded from the Q prediction modes. In addition, as a prediction mode similar to the $i^{th}$ prediction mode has similar characteristics to the $i^{th}$ prediction mode, the prediction mode similar to the $i^{th}$ prediction mode is also excluded from the Q prediction modes to obtain a set of prediction mode after exclusion. Next, in the set of prediction modes after exclusion, a prediction mode is selected as a new $i^{th}$ prediction mode, and the above steps are repeated, so that the prediction modes included in the set of prediction modes are finally obtained, and determines as the T prediction modes.

In embodiments of the disclosure, the value of the fifth preset value is not limited, and is determined according to actual needs. The fifth preset value is greater than the fourth preset value.

According to the above steps, the S weight derivation modes are selected from the P weight derivation modes, and the T prediction modes are selected from the Q prediction modes. Next, the following S102-A11-23 is performed.

S102-A11-23, the R second combinations are formed according to the S weight derivation modes and the T prediction modes.

Specifically, a weight derivation mode is selected from the S weight derivation modes, the K prediction modes are selected from the T prediction modes, and this weight derivation mode and the K prediction modes forms a second combination. This step is repeatedly performed and the R second combinations may be obtained.

It can be seen from the above that one second combination includes one weight derivation mode and K prediction modes. In this way, when prediction modes are screened, a possible selection of another element may be restricted when K elements in a combination are fixed. For example, when K=2, a possible selection of another element may be restricted when it is used in combination with two of the elements.

One implementation process of the above S102-A11-2 is introduced below by taking a selecting process of another prediction mode when the weight derivation mode and one prediction mode are fixed as an example.

In some embodiments, the above S102-A11-2 includes the following: for the it weight derivation mode in the P weight derivation modes, a cost of using the $i^{th}$ weight derivation mode and the $j^{th}$ prediction mode in the Q prediction modes to predict the template is determined; the $j^{th}$ prediction mode and a prediction mode similar to the $j^{th}$ prediction mode are excluded from the Q prediction modes to obtain at least one prediction mode after exclusion, if a cost corresponding to a combination of the $i^{th}$ weight derivation mode and the $j^{th}$ prediction mode is greater than a sixth preset value; and the R second combinations is formed according to the $i^{th}$ weight derivation mode and the at least one prediction mode after exclusion.

In this embodiment, when the weight derivation mode and one prediction mode are fixed, the other prediction mode needs to be selected. For example, for a certain weight derivation mode, if a certain intra prediction mode may not obtain a relatively small cost as the first prediction mode, then under the weight derivation mode, an intra prediction mode similar to the intra prediction mode is no longer tried as the first prediction mode.

Specifically, for the $i^{th}$ weight derivation mode in the P weight derivation modes, it is assumed that K=2, i.e., the combination includes a $i^{th}$ weight derivation mode, a first prediction mode and a second prediction mode. It is assumed that the second prediction mode is set to be prediction mode 1, and the prediction mode 1 may be one of the Q prediction modes or other prediction modes other than the Q prediction modes. A possible selection of the first prediction mode is determined from the Q prediction modes. Specifically, the $j^{th}$ prediction mode in the Q prediction modes is taken as the first prediction mode. In this case, a prediction value of the template when combination j of the $i^{th}$ weight derivation mode, the $j^{th}$ prediction mode, and prediction mode 1 is used to predict the template is determined, a cost corresponding to combination j is determined according to the prediction value, and the cost corresponding to combination j is determined as a cost corresponding to the $j^{th}$ prediction mode. Next, it is determined whether the cost corresponding to the $j^{th}$ prediction mode is greater than a sixth preset value. If the cost corresponding to the $j^{th}$ prediction mode is greater than the sixth preset value, it indicates that the combination of the $j^{th}$ prediction mode with the $i^{th}$ weight derivation mode and prediction mode 1 may not achieve an accurate prediction of the template. In this case, the $j^{th}$ prediction mode is excluded from the Q prediction modes. As a prediction mode similar to the $j^{th}$ prediction mode has similar characteristics to the $j^{th}$ prediction mode, the prediction mode similar to the $j^{th}$ prediction mode is excluded from the Q prediction modes and a set of prediction modes after exclusion is obtained. In the set of prediction mode after exclusion, a new prediction mode is selected as a new $j^{th}$ prediction mode. The above steps are repeated, so that a final set of prediction modes corresponding to the $i^{th}$ weight derivation mode after exclusion is obtained.

According to the above steps, a final set of prediction modes corresponding to each weight derivation mode in the P weight derivation modes after exclusion may be determined, so that the R second combinations are formed according to the P weight derivation modes and their respective corresponding final sets of prediction modes after exclusion.

It should be noted that the above embodiment shows a manner for selecting a prediction mode in the form of a combination. Optionally, any one of a weight derivation mode and a prediction mode may also be selected in the form of a combination to finally form the R second combinations.

At the decoding end, after the R second combinations are determined according to the above methods, for any second combination in the R second combinations, the weight derivation mode and the K prediction modes in the second combination are used to predict the template to obtain a template prediction value corresponding to the second combination.

The process of predicting a template of the current block using any second combination to obtain a prediction value of the template will be introduced as follows.

First, a weight of the template is determined using a weight derivation mode included in the second combination.

At present, as shown in FIG. 13 above, the template of the current block is a top encoded region of the current block, or a left encoded region of the current block, or a left-top encoded region of the current block.

Figure 17:
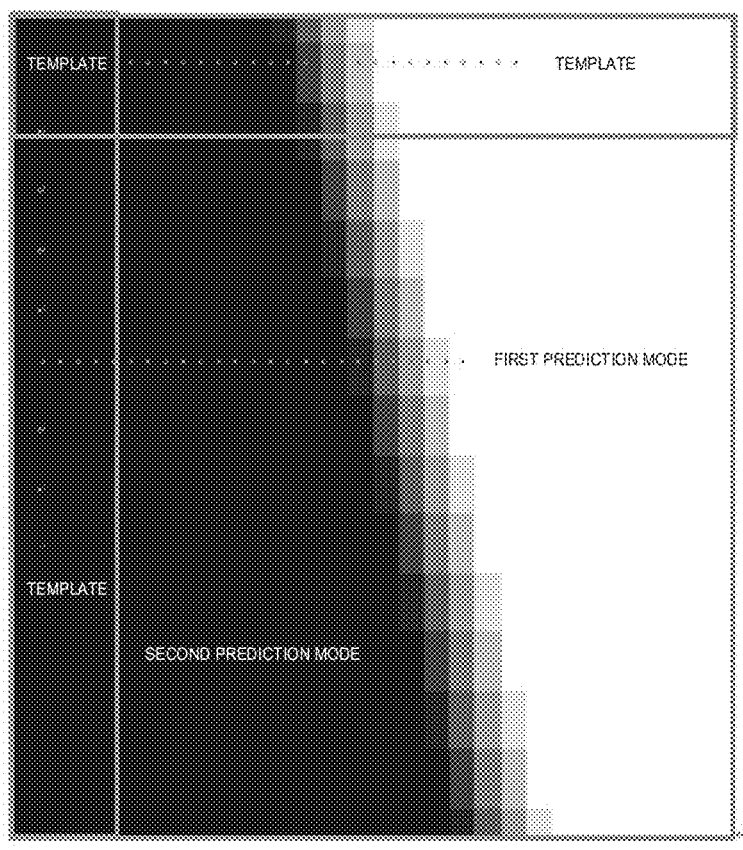
FIG. 17 is a schematic diagram of deriving a template weight.

In some embodiments, the weight matrix may be directly extended to a template region, for example, extended leftwards and upwards to cover the template, so as to determine the template weight. For example, as illustrated in FIG. 17, a small rectangular region in the top-left of the current block may be added to the template, so that the template and the current block can constitute a rectangle. Alternatively, only the left part and the top part may be used as the template. As illustrated in FIG. 17, the top-left region is exemplarily added, and regions in the left, the top-left, and the top in an upside-down L-shaped region are a template region, and a bottom-right rectangular region is the current block. In this case, part of the weight matrix extended to the top-left becomes a weight matrix of the template.

In the embodiment of the disclosure, the process of deriving the template weight according to the weight derivation mode is combined with the process of deriving a weight of a prediction value, for example, the template weight and the weight of the prediction value are derived at the same time, where the weight of the prediction value may be understood as a weight corresponding to the prediction value. For example, the first prediction value is obtained according to the first prediction mode, the second prediction value is obtained according to the second prediction mode, a first weight of the first prediction value is determined according to the weight derivation mode, a second weight of the second prediction value is determined according to the weight derivation mode, and a sum of a product of the first prediction value and the first weight and a product of the second prediction value and the second weight is determined as a prediction value of the current block.

In the disclosure, in order to distinguish from the template weight, the first weight and the second weight each are referred to as a weight of a prediction value.

In some embodiments, determining the template weight according to the weight derivation mode includes the following steps.

Step 1, an angle index and a distance index are determined according to the weight derivation mode.

Step 2, the template weight is determined according to the angle index, the distance index, and a size of the template.

In the disclosure, the template weight may be derived in the same manner as deriving a weight of a prediction value. For example, the angle index and the distance index are firstly determined according to the weight derivation mode, where the angle index may be understood as an angle index of a boundary line of each weight derived from the weight derivation mode. Exemplarily, the angle index and the distance index corresponding to the weight derivation mode may be determined according to Table 2 above. For example, if the weight derivation mode is 27, a corresponding angle index is 12 and a corresponding distance index is 3. Then, the template weight is determined according to the angle index, the distance index, and the size of the template.

The manner for determining the template weight according to the angle index, the distance index, and the size of the template in Step 2 includes, but is not limited to the following manners.

Manner I: The template weight is determined directly according to the angle index, the distance index, and the size of the template. In this case, Step 2 includes the following steps Step 21 to Step 23.

Step 21, a first parameter of a sample in the template is determined according to the angle index, the distance index, and the size of the template.

Step 22, a weight of the sample in the template is determined according to the first parameter of the sample in the template.

Step 23, the template weight is determined according to the weight of the sample in the template.

In this implementation, the weight of the sample in the template is determined according to the angle index, the distance index, the size of the template, and a size of the current block, and then a weight matrix formed by a weight of each sample in the template is determined as the template weight.

The first parameter of the disclosure is used to determine a weight. In some embodiments, the first parameter is also referred to as a weight index.

In a possible implementation, an offset and the first parameter may be determined in the following manner.

Inputs to the process of deriving the template weight are: as illustrated in FIG. 17, the width nCbW of the current block, the height nCbH of the current block, a width nTmW of a left template, a height nTmH of a top template, a "partition" angle index variable angleId of GPM, a distance index variable distanceIdx of GPM, a component index variable cIdx. Exemplarily, in the disclosure, a luma component is taken as an example, and therefore cIdx=0, which indicates the luma component.

Variables nW, nH, shift1, offset1, displacementX, displacementY, partFlip, and shiftHor are derived as follows:
nW=(cIdx==0)?nCbW:nCbW*SubWidthC
nH=(cIdx==0)?nCbH:nCbH*SubHeightC shift1=Max(5, 17—BitDepth), where BitDepth represents a coding bit depth;
offset1=1<<(shift1—1)
displacementX=angleIdx
displacementY=(angleIdx+8) % 32
partFlip=(angleIdx>=13 && angleIdx<=27)?0:1
shiftHor=(angleIdx % 16==8 (angleIdx % 16 !=0 && nH>=nW))?0:1

Offsets offsetX and offsetY are derived as follows:
if shiftHor=0:

$$offsetX = (-nW) >> 1$$

$$offsetY = ((-nH) >> 1) +$$
$$(angleIdx < 16 \; ? \; (distanceIdx * nH) >> 3 : -((distanceIdx * nH) >> 3))$$

otherwise (i. e. shiftHor=1):

$$offsetX = ((-nW) >> 1) +$$
$$(angleIdx < 16 \; ? \; (distanceIdx * nW) >> 3 : -((distanceIdx * nH) >> 3))$$
$$offsetY = (-nH) >> 1$$

A weight matrix wTemplateValue[x][y](where x=−nTmW . . . nCbW−1, y=−nTmH . . . nCbH−1, except for the case where x≥0 and y≥0) of the template is derived as follows (it should be noted that in this example, the coordinate of a top-left corner of the current block is (0, 0)):
variables xL and yL are derived as follows:

$$xL = (cIdx == 0) \; ? \; x:x * SubWidthC$$

$$yL = (cIdx == 0) \; ? \; y:y * SubHeightC$$

disLut is determined according to Table 3 above;
the first parameter weightIdx is derived as follows:

$$weightIdx = (((xL + offsetX) << 1) + 1) * disLut[displacementX] +$$
$$(((yL + offsetY) << 1) + 1) * disLut[displacementY]$$

After the first parameter weightIdx is determined according to the foregoing method, a weight of a sample (x, y) in the template is determined according to weightIdx.

In the disclosure, the manner for determining the weight of the sample in the template according to the first parameter of the sample in the template in Step 22 includes, but is not limited to, the following manners.

Manner 1: A second parameter of the sample in the template is determined according to the first parameter of the sample in the template, and the weight of the sample in the template is determined according to the second parameter of the sample in the template.

The second parameter is also used for determining a weight. In some embodiments, the second parameter is also referred to as a weight index for a first component, and the first component may be a luma component, a chroma component, or the like.

For example, the weight of the sample in the template is determined according to the following formula:

$$weightIdxL = partFlip \ ? \ 32 + weightIdx : 32 - weightIdx;$$

$$wTemplateValue[x][y] = \text{Clip3}(0, \ 8, \ (weightIdxL + 4) >> 3)$$

wTemplateValue[x][y] is the weight of the sample (x, y) in the template. weightIdxL is the second parameter of the sample (x, y) in the template, and is also referred to as a weight index for the first component (for example, a luma component). wTemplateValue[x][y] is the weight of the sample (x, y) in the template. partFlip is an intermediate variable, and is determined according to the angle index angleIdx, for example, partFlip=(angleIdx>=13 && angleIdx<=27)?0:1 as described above, that is, partFlip=1 or 0. If partFlip=0, weightIdxL=32–weightIdx; and if partFlip=1, weightIdxL=32+weightIdx. It should be noted that, 32 herein is merely an example, and the disclosure is not limited thereto.

Manner 2: The weight of the sample in the template is determined according to the first parameter of the sample in the template, a first threshold, and a second threshold.

In order to reduce complexity of calculating the template weight, in manner 2, the weight of the sample in the template is limited to the first threshold or the second threshold, that is, the weight of the sample in the template is either the first threshold or the second threshold, thereby reducing complexity of calculating the template weight.

The value of each of the first threshold and the second threshold is not limited in the disclosure.

Optionally, the first threshold is 1.

Optionally, the second threshold is 0.

In an example, the weight of the sample in the template may be determined according to the following formula:

$$wTemplateValue[x][y] = (partFlip \ ? \ weightIdx : -weightIdx) > 0 \ ? \ 1 : 0$$

wTemplateValue[x][y] is the weight of the sample (x, y) in the template. In the foregoing "1:0", 1 is the first threshold and 0 is the second threshold.

In manner I above, the weight of each sample in the template is determined according to the weight derivation mode, and a weight matrix formed by the weight of each sample in the template is used as the template weight.

Manner II: A weight of the current block and the template weight are determined according to the weight derivation mode. That is, in manner II, a merge region consisting of the current block and the template is taken as a whole, and a weight of a sample in the merge region is derived according to the weight derivation mode. Based on this, Step 2 includes the following steps Step 2-1 and Step 2-2.

Step 2-1, a weight of a sample in a merge region consisting of the current block and the template is determined according to the angle index, the distance index, the size of the template, and a size of the current block.

Step 2-2, the template weight is determined according to the size of the template and the weight of the sample in the merge region.

In manner II, the current block and the template are taken as a whole, the weight of the sample in the merge region consisting of the current block and the template is determined according to the angle index, the distance index, the size of the template, and the size of the current block, and then according to the size of the template, a weight corresponding to the template in the merge region is determined as the template weight, for example, as illustrated in FIG. 17, a weight corresponding to an L-shaped template region in the merge region is determined as the template weight.

In manner II, in a weight determination process, the template weight and the weight of a prediction value are determined, i.e. the weight of the prediction value is a weight corresponding to the merge region other than template weight, so that a subsequent prediction process can be performed according to the weight of the prediction value, and the weight of the prediction value does not need to be determined again, thereby reducing the steps for prediction and improving prediction efficiency.

There is no limitation on the implementation of determining the weight of the sample in the merge region consisting of the current block and the template according to the angle index, the distance index, the size of the template, and the size of current block in the disclosure.

In some embodiments, determining the weight of the sample in the merge region in Step 2-1 includes the following steps Step 2-11 to Step 2-12.

Step 2-11, a first parameter of the sample in the merge region is determined according to the angle index, the distance index, and a size of the merge region.

Step 2-12, the weight of the sample in the merge region is determined according to the first parameter of the sample in the merge region.

In this implementation, the weight of the sample in the merge region is determined according to the angle index, the distance index, and the size of the merge region, and a weight of each sample in the merge region forms a weight matrix.

In a possible implementation, an offset and the first parameter may be determined in the following manner.

Inputs to the process of deriving the weight of the merge region are: as illustrated in FIG. 17, the width nCbW of the current block, the height nCbH of the current block, a width nTmW of a left template, a height nTmH of a top template, a "partition" angle index variable angleId of GPM, a distance index variable distanceIdx of GPM, a component index variable cIdx. Exemplarily, in the disclosure, a luma component is taken as an example, and therefore cIdx=0, which indicates the luma component.

Variables nW, nH, shift1, offset1, displacementX, displacementY, partFlip, and shiftHor are derived as follows:

nW=(cIdx==0)?nCbW:nCbW*SubWidthC
nH=(cIdx==0)?nCbH:nCbH*SubHeightC
shift1=Max(5, 17—BitDepth), where BitDepth represents a coding bit depth;
offset1=1<<(shift1—1)
displacementX=angleIdx
displacementY=(angleIdx+8) % 32
partFlip=(angleIdx>=13 && angleIdx<=27)?0:1
shiftHor=(angleIdx % 16==8 (angleIdx % 16 !=0 && nH>=nW))?0:1

Offsets offsetX and offsetY are derived as follows:
if shiftHor=0:

$$offsetX = (-nW) >> 1$$

$$offsetY = ((-nH) >> 1) +$$

-continued $$\left(angleIdx < 16 \ ? \ (distanceIdx * nH) >> 3 : -\left((distanceIdx * nH) >> 3\right)\right)$$

otherwise (i. e. shiftHor=1):

$$offsetX = \left((-nW) >> 1\right) +$$

$$\left(angleIdx < 16 \ ? \ (distanceIdx * nW) >> 3 : -\left((distanceIdx * nH) >> 3\right)\right)$$

$$offsetY = (-nH) >> 1$$

The weight matrix wValueMatrix[x][y](where x=−nTmW . . . nCbW−1, y=−nTmH . . . nCbH−1) of the sample in the merge region is derived as follows (it should be noted that in this example, the coordinate of a top-left corner of the current block is (0, 0)):
variables xL and yL are derived as follows:

$$xL = \left(cIdx == 0\right) \ ? \ x : x * SubWidthC$$

$$yL = \left(cIdx == 0\right) \ ? \ y : y * SubHeightC$$

disLut is determined according to Table 3;
the first parameter weightIdx is derived as follows:

$$weightIdx = \left(\left((xL + offsetX) << 1\right) + 1\right) * disLut[displacementX] +$$

$$\left(\left((yL + offsetY) << 1\right) + 1\right) * disLut[displacementY]$$

After the first parameter weightIdx is determined according to the foregoing method, a weight of a sample (x, y) in the merge region is determined according to weightIdx.

In the disclosure, the manner for determining the weight of the sample in the merge region according to the first parameter of the sample in the merge region in Step 2-12 includes, but is not limited to, the following manners.

Manner 1: A second parameter of the sample in the merge region is determined according to the first parameter of the sample in the merge region, and the weight of the sample in the merge region is determined according to the second parameter of the sample in the merge region.

For example, the weight of the sample in the merge region is determined according to the following formula:

$$weightIdx = \left(\left((xL + offsetX) << 1\right) + 1\right) * disLut[displacementX] +$$

$$\left(\left((yL + offsetY) << 1\right) + 1\right) * disLut[displacementY]$$

$$weightIdxL = partFlip \ ? \ 32 + weightIdx : 32 - weightIdx$$

$$wValueMatrix[x][y] = \mathrm{Clip3}\left(0, \ 8, \ (weightIdxL + 4) >> 3\right)$$

wValueMatrix[x][y] is the weight of the sample (x, y) in the merge region. weightIdxL is the second parameter of the sample (x, y) in the merge region. wTemplateValue[x][y] is the weight of the sample (x, y) in the merge region.

Manner 2: The weight of the sample in the merge region is determined according to the first parameter of the sample in the merge region, a first threshold, and a second threshold.

Exemplarily, the weight of the sample in the merge region is the first threshold or the second threshold.

In order to reduce complexity of calculating the weight of the merge region, in manner 2, the weight of the sample in the merge region is limited to the first threshold or the second threshold, that is, the weight of the sample in the merge region is either the first threshold or the second threshold, thereby reducing complexity of calculating the weight of the merge region.

The value of each of the first threshold and the second threshold is not limited in the disclosure.

Optionally, the first threshold is 1.

Optionally, the second threshold is 0.

In an example, the weight of the sample in the merge region may be determined according to the following formula:

$$wTemplateValue[x][y] = \left(partFlip \ ? \ weightIdx : - weightIdx\right) > 0 \ ? \ 1 : 0$$

wValueMatrix[x][y] is the weight of the sample (x, y) in the merge region. In the foregoing "1:0", 1 is the first threshold and 0 is the second threshold.

In manner II above, the weight of each sample in the merge region consisting of the current block and the template is determined according to the weight derivation mode, and then a weight corresponding to the template in the merge region is determined as the template weight according to the size of the template. In addition, in manner II, a weight of a prediction value is also determined, and it is unnecessary to perform subsequent steps of determining the weight of the prediction value, thereby reducing the steps for prediction and improving prediction efficiency.

According to the foregoing method, after the template weight corresponding to the weight derivation mode included in the second combination is determined, the template is predicted using K prediction modes in the second combination to obtain K prediction values, and the K prediction values are weighted according to the template weight to obtain the prediction value of the template.

The prediction value of the template may be understood as a matrix composed of prediction values of samples in the template.

In some embodiments, the foregoing prediction values are also called prediction samples.

Subsequently, a cost of the second combination is determined according to the prediction value and the reconstruction value of the template.

The foregoing manners for determining the cost of the second combination include, but are not limited to, the following.

Manner I, the cost of the second combination is determined by using a matrix. Specifically, a loss is determined according to the prediction value and the reconstruction value of the template, and the loss is recorded as a first loss. As the prediction value and the reconstruction value of the template are matrices, the obtained first loss is also a matrix. For example, an absolute value of a difference between the prediction value and the reconstruction value of the template is determined as the first loss, and the first loss is determined as the cost of the second combination.

Manner II, the cost of the second combination is determined by means of point-by-point calculation.

Specifically, with respect to the $i^{th}$ sample in the template, during determination of a prediction value of each prediction mode in the K prediction modes in the second combination at the $i^{th}$ sample, a template weight corresponding to the $i^{th}$ sample in the template weight is determined, and a prediction value of the $i^{th}$ sample is obtained according to the template weight of the $i^{th}$ sample and K prediction values of the $i^{th}$ sample. The cost of the second combination at the $i^{th}$ sample is obtained according to the prediction value and the reconstruction value of the $i^{th}$ sample. According to this method, a prediction distortion cost of the second combination at each sample in the template may be determined. Finally, a cumulative sum of the prediction distortion costs of the second combination at each sample in the template is determined as the cost of the second combination.

According to the above method, a cost of each of the R second combinations may be determined.

Then, a candidate combination list is generated according to the cost of each of the R second combinations.

For example, R second combinations are sorted in an ascending order according to the costs of the second combinations, and the sorted R second combinations are determined as a candidate combination list.

For another example, N second combinations with the lowest costs are selected from the R second combinations according to the costs of the second combinations, and a candidate combination list is generated.

Optionally, N is 8 or 16 or 32, etc.

According to the above method, a candidate combination list is determined, and the candidate combinations in the candidate combination list are sorted in an ascending order of the costs. Exemplarily, the candidate combination list is as shown in Table 6 above.

In this way, at the decoding end, a candidate combination corresponding to the first index is queried in the candidate combination list shown in Table 6 according to the first index, and the candidate combination corresponding to the first index is determined as the first combination. That is, the weight derivation mode included in the candidate combination is determined as the first weight derivation mode, and the K prediction modes included in the candidate combination are determined as K first prediction modes. Next, at the decoding end, the following S103 is performed.

S103, the current block is predicted according to the first weight derivation mode and the K first prediction modes, and a prediction value of the current block is obtained.

Specifically, weights of prediction values are determined according to the first weight derivation mode, K prediction values are determined according to the K prediction modes, the K prediction values are weighted according to the weights of prediction values, and a weighted result is determined as a prediction value of the current block.

In the disclosure, the manner for determining the weights respectively corresponding to the K prediction values according to the weight derivation mode includes, but is not limited to, the following manners.

Manner I: if the template weight is determined according to the weight derivation mode but a weight corresponding to a sample in the current block is not yet determined during determination of the template weight, the foregoing step S103 includes the following steps.

S103-A1, weights of the prediction values are determined according to the first weight derivation mode.

S103-A2, K prediction values are determined according to the K first prediction modes.

S103-A3, the prediction value of the current block is determined according to the K prediction values and the weights of the prediction values.

There is no sequence to perform S103-A1 and S103-A2, that is, S103-A1 may be performed before S103-A2, after S103-A2, or in parallel with S103-A2.

It should be noted that, in the disclosure, the first weight derivation mode is used to determine weights of prediction values used for the current block. For a block of a given length and width, each weight derivation mode may be used to derive one weight matrix of prediction values. For blocks of the same size, weight matrices of prediction values derived from different weight derivation modes may be different. In this way, at the decoding end, the weights of the prediction values determined according to the first weight derivation mode are a weight matrix, and the weight matrix includes a prediction weight corresponding to each sample in the current block.

In some embodiments, when the current block is predicted, each of the K first prediction modes is used to predict a certain sample A in the current block to obtain K prediction values of the K first prediction modes at sample A, and a weight of a prediction value of sample A is determined according to the first weight derivation mode, for example, a weight matrix is determined according to the first weight derivation mode, and the weight matrix includes a weight corresponding to each sample in the current block, so that a weight of a prediction value of sample A may be determined in the weight matrix. Subsequently, the K prediction values are weighted using the weight of the prediction value of sample A to obtain a prediction value of sample A. The above steps are performed on each sample in the current block, so that a prediction value of each sample in the current block may be obtained, and the prediction value of each samples in the current block constitutes a prediction value of the current block. Taking K=2 as an example, a certain sample A in the current block is predicted using the first prediction mode to obtain a first prediction value of sample A; sample A is predicted using the second prediction mode to obtain a second prediction value of sample A; and the first prediction value and the second prediction value are weighted according to weights of the prediction values corresponding to sample A to obtain a prediction value of sample A.

Exemplarily, in the disclosure, there are 56 weight derivation modes for AWP in AVS3 and 64 weight derivation modes for GPM in VVC.

It can be understood that, in the embodiment of the disclosure, at the decoding end, when determining the prediction value based on the K first prediction modes and the weights of the prediction values, the K first prediction values may be firstly determined according to the K prediction modes, and then the K prediction values are weighted according to the weights of the prediction values, so as to obtain a prediction value of the current block.

In manner I, it can be understood that, determination of the template weight according to the weight derivation mode and determination of the weights of the prediction values according to the first weight derivation mode are two independent processes and do not interfere with each other.

In some embodiments, the weights of the prediction values may also be determined in the following manner II.

Manner II: If a weight of a sample in a merge region consisting of a template region and the current block is determined according to the first weight derivation mode during determination of the template weight, S103 includes the following steps.

S103-B1, K prediction values are determined according to the K first prediction modes.

S103-B2, weights of the prediction values are determined according to the weight of the sample in the merge region.

S103-B3, a prediction value of the current block is determined according to the K prediction values and the weights of the prediction values.

There is no sequence to perform S103-B1 and S103-B2, that is, S103-B1 may be performed before S103-B2, after S103-B2, or in parallel with S103-B2.

In manner II, during weight derivation, the weight of the sample in the merge region is derived according to the first weight derivation mode, and the merge region includes the current block and a template region of the current block, so that weights corresponding to the current block in the merge region are determined as the weights of the prediction values, and a weight corresponding to the template region in the merge region is determined as the template weight. That is, in manner II, the template region and the current block are taken as a whole, so that the template weight and the weights of the prediction values are derived in one step, thereby reducing steps for weight derivation and improving prediction effect.

In some embodiments, the foregoing prediction process is performed on a sample basis, and accordingly, the weight is a weight corresponding to a sample. In this case, when predicting the current block, sample A in the current block is predicted with each of the K first prediction modes, so as to obtain K first prediction values at sample A for the K prediction modes; weights of the prediction values at sample A are determined according to the first weight derivation mode. Specifically, a weight matrix corresponding to the merge region is determined according to the first weight derivation mode, and the weight matrix includes a weight corresponding to each sample in the current block, so that a weight of a prediction value of sample A may be determined in the weight matrix. Subsequently, the K prediction values are weighted using the weight of the prediction value of sample A, so as to obtain a prediction value of sample A. The foregoing steps are performed on each sample in the current block, and a prediction value of each sample in the current block can be obtained, where the final prediction value of each sample in the current block forms a prediction value of the current block. For example, K=2, sample A in the current block is predicted with the first prediction mode, to obtain a first prediction value of sample A; sample A is predicted with the second prediction mode, to obtain a second prediction value of sample A; and the first prediction value and the second prediction value are weighted according to weights of prediction values corresponding to sample A, to obtain a prediction value of sample A.

In an example, for example, K=2, if the first prediction mode and the second prediction mode are intra prediction modes, a first intra prediction mode is used for prediction to obtain a first prediction value, a second intra prediction mode is used for prediction to obtain a second prediction value, and the first prediction value and the second prediction value are weighted according to weights of prediction values to obtain a prediction value of the current block. For example, sample A is predicted with the first intra prediction mode to obtain a first prediction value of sample A, sample A is predicted with the second intra prediction mode to obtain a second prediction value of sample A, and the first prediction value and the second prediction value are weighted according to weights of prediction values corresponding to sample A, so as to obtain a prediction value of sample A.

In some embodiments, if the $j^{th}$ prediction mode in the K first prediction modes is an inter prediction mode, determining the prediction value according to the K first prediction modes and the first weight derivation mode in step S103 includes the following steps.

S103-C1, motion information is determined according to the $j^{th}$ prediction mode.

S103-C2, a $j^{th}$ prediction value is determined according to the motion information.

S103-C3, (K−1) prediction values are determined according to prediction modes other than the $j^{th}$ prediction mode in the K first prediction modes.

S103-C4, weights of the K first prediction values are determined according to the weight derivation mode.

S103-C5, a prediction value of the current block is determined according to the $j^{th}$ prediction value, the (K−1) prediction values, and the weights of the prediction values.

For example, K=2, if the first prediction mode is an intra prediction mode and the second prediction mode is an inter prediction mode, the intra prediction mode is used for prediction to obtain a first prediction value, the inter prediction mode is used for prediction to obtain a second prediction value, and the first prediction value and the second prediction value are weighted according to weights of prediction values to obtain a prediction value of the current block. In this example, the intra prediction mode is used for prediction of each sample in the current block, so as to obtain a prediction value of each sample in the current block, and the prediction value of each sample in the current block constitutes a first prediction value of the current block. The inter prediction mode is used to determine motion information, a best matching block of the current block is determined according to the motion information, and the best matching block is determined as a second prediction value of the current block. With regard to weights of prediction values of each sample in the current block, the first prediction value and the second prediction value of the current block are weighted on a sample basis, so as to obtain a prediction value of the current block. For example, for sample A in the current block, a first prediction value corresponding to sample A in the first prediction value of the current block and a second prediction value corresponding to sample A in the second prediction value of the current block are weighted according to weights of prediction values of sample A, so as to obtain a prediction value of sample A.

In some embodiments, if K>2, weights of prediction values corresponding to two prediction modes in the K first prediction modes may be determined according to the first weight derivation mode, and a weight(s) of a prediction value(s) corresponding to other prediction mode(s) in the K first prediction modes may be a preset value(s). For example, K=3, a first weight of a prediction value corresponding to the first prediction mode and a weight of a prediction value corresponding to the second prediction mode are derived according to the weight derivation mode, and a weight of a prediction value corresponding to a third prediction mode is a preset value. In some embodiments, if a total prediction-value weight (that is, total weight of prediction values) corresponding to the K first prediction modes is constant, for example, is 8, a weight of a prediction value corresponding to each of the K first prediction modes may be determined according to a preset weight proportion. Assuming that the weight of the prediction value corresponding to the third prediction mode accounts for ¼ of the total prediction-value weight, it may be determined that the weight of the prediction value of the third prediction mode is 2, and the remaining ¾ of the total prediction-value weight is allocated to the first prediction mode and the second prediction mode. Exemplarily, if a weight of the prediction value corresponding to the first prediction mode derived according to the weight derivation mode is 3, it is determined that the weight of the prediction value corresponding to the first prediction mode is (3/4)*3, and the weight of the prediction value corresponding to the second prediction mode is (3/4)*5.

According to the above method, the prediction value of the current block is determined, at the same time, the bitstream is decoded to obtain a quantization coefficient of the current block, the quantization coefficient of the current block is inversely quantized and inversely transformed to obtain a residual value of the current block, and the prediction value and the residual value of the current block are summed to obtain a reconstruction value of the current block.

From the above, it can be seen that the candidate combinations in the candidate combination list in embodiments of the disclosure are sorted in an ascending order of the cost, and the candidate combination with a low cost has a high probability to be selected. Based on this, in order to further reduce the encoding cost, shorter codewords are used to encode the candidate combinations ranked at the top of the candidate combination list, and longer codewords are used to encode the candidate combinations ranked at the bottom of the candidate combination list, so that the overall encoding efficiency is improved.

In some embodiments, the first index is encoded into the bitstream in a variable-length encoding manner, for example, Columbus encoding manner is used for encoding.

In some embodiments, if the number of candidate combinations included in the candidate combination list is less than a fourth preset threshold, the first index is encoded into the bitstream in a fixed-length encoding manner. That is, in embodiments of the disclosure, if the number of candidate combinations included in the candidate combination list is relatively small, all candidate combinations are uniformly encoded using a preset bit length. In embodiments of the disclosure, the specific value of the fourth preset threshold is not limited, for example, the fourth preset threshold is equal to 16.

In some embodiments, a high level syntax may be used to control the switch of the technical solution of a combined encoding provided in embodiments of the disclosure. For example, at least one flag may be used to indicate whether the current block is allowed to use the technical solution of the combined encoding provided in embodiments of the disclosure, i.e., whether the first combination is allowed to be applied for decoding.

In one possible implementation, at least one set flag may be a flag of a variable level, which indicates whether a corresponding level is allowed to use the technical solution of a combined encoding provided in embodiments of the disclosure.

Optionally, the at least one flag includes at least one of a sequence level flag, a picture-level flag, a slice-level flag, a unit-level flag, and a block-level flag.

For example, the at least one flag includes a sequence level flag, and the sequence level flag indicates whether the current sequence is allowed to use the technical solution of a combined encoding provided in embodiments of the disclosure.

Exemplarily, the syntax element sps_cgpm_enabled_flag is added to the sequence parameter set. cgpm may be considered as the abbreviation of combined geometric partitioning mode. If the value of sps_cgpm_enabled_flag is 1, it indicates that the current sequence is allowed to use the technical solution of the disclosure; and if the value of sps_cgpm_enabled_flag is 0, it indicates that the current sequence is not allowed to use the technical solution of the disclosure.

If the technical solution provided in embodiments of the disclosure is used in inter mode, as sps_gpm_enbled_flag has already existed in the inter mode, the solution may also be controlled by sps_gpm_enbled_flag. As the solution may also be used in intra mode, sps_cgpm_enabled_flag or sps_gpm_enabled_flag may also be used in intra mode together with inter code. Of course, different flags may be used for intra mode and inter mode for better flexibility, such as setting an sps_sgpm_enabled_flag. sgpm may be considered as the abbreviation of spatial geometric partitioning mode. sps_sgpm_enabled_flag controls whether the solution is allowed to be used in intra mode, while sps_cgpm_e-nabled_flag or sps_gpm_enabled_flag controls whether the solution is allowed to be used in inter mode.

For another example, the at least one flag includes a picture-level flag, and the picture-level flag indicates whether the current picture is allowed to use the technical solution of the disclosure.

Optionally, if at least one flag includes a picture-level flag, the picture-level flag may be located in a picture header.

For another example, the at least one flag includes a slice-level flag, and the slice-level flag indicates whether the current slice is allowed to use the technical solution of the disclosure.

Optionally, if at least one flag includes a slice-level flag, the slice-level flag may be located in a slice header.

For another example, the at least one flag includes a unit-level flag, and the unit-level flag indicates whether the current CTU is allowed to use the technical solution of the disclosure.

For another example, the at least one flag includes a block (CU)-level flag, and the CU-level flag indicates whether the current block is allowed to use the technical solution of the disclosure.

Taking intra mode as an example, it is assumed that the CU-level flag is cu_sgpm_flag. If the value of cu_sgpm_flag is 1, it indicates that the current block is allowed to use the technical solution of the disclosure; and if the value of cu_sgpm_flag is 0, it indicates that the current block is not allowed to use the technical solution of the disclosure. At present, GPM in VVC is used in an intra merge mode, and it is obtained by derivation. Of course, it may also be directly represented by a CU-level flag in the future, and no limit is made here.

In this way, at the decoding end, first, the bitstream is decoded to obtain the at least one flag, and it is determined according to the at least one flag whether the current block is allowed to use the technical solution of the disclosure. If it is determined according to the at least one flag that the current block is not allowed to use the technical solution of the disclosure, the method in embodiments of the disclosure is skipped. If it is determined according to the at least one flag that the current block is allowed to use the technical solution of the disclosure, the method in embodiments of the disclosure is performed, that is, the bitstream is decoded to obtain a first index.

In the video decoding method provided in embodiments of the disclosure, a first index is obtained by decoding the bitstream, the first index indicates a first combination composed of one weight derivation mode and K prediction modes, and K is a positive integer greater than 1; the first weight derivation mode and K first prediction modes included in the first combination are determined according to the first index; and the current block is predicted according to the first weight derivation mode and the K first prediction modes to obtain a prediction value of the current block. In the disclosure, the weight derivation mode and the K prediction modes are taken as a combination, so that the weight derivation mode and the K prediction modes used by the current block are indicated in the form of a combination in the bitstream, so that the syntax becomes simpler, codewords are saved, determination of various situations are not needed, and the encoding efficiency is further improved.

The prediction method of the disclosure is introduced above taking the decoding end as an example, and it will be introduced below taking the encoding end as an example.

FIG. 19 is a schematic flowchart of a video encoding method provided in an embodiment of the disclosure, and the embodiment of the disclosure is applied to a video encoders shown in FIG. 1 and FIG. 2. As shown in FIG. 19, the method in the embodiment of the disclosure includes:

S201, a first combination is determined.

The first combination includes a first weight derivation mode and K first prediction modes.

Based on the above description, one weight derivation mode and K prediction modes may act together on the current block as a combination. In order to save codewords and reduce encoding costs, in embodiments of the disclosure, the weight derivation mode and K prediction modes corresponding to the current block are taken as a combination, i.e., a first combination, and a first index is used to indicate the first combination. Compared with indicating the weight derivation mode and the K prediction modes respectively, fewer codewords are used in embodiments of the disclosure, thereby reducing encoding costs.

Specifically, at the encoding end, a first combination corresponding to the current block is determined, and the first combination is composed of one weight derivation mode and K prediction modes. For convenience of description, the weight derivation mode included in the first combination is referred to as a first weight derivation mode, and the K prediction modes included in the first combination are determined as K first prediction modes. At the encoding end, the first weight derivation mode and the K first prediction modes are used to predict the current block to obtain a prediction value of the current block. For example, the first weight derivation mode is used to derive weights, the K prediction modes are respectively used to predict the current block to obtain K prediction values, and the K prediction values are weighted according to the derived weights to obtain a prediction value of the current block.

In some embodiments, at the encoding end, before determining the first combination, whether to use K different prediction modes for weighted prediction of the current block needs to be determined. If it is determined at the encoding end that K different prediction modes are used for weighted prediction of the current block, the foregoing S201 is performed to determine the first combination. If it is determined at the encoding end that K different prediction modes are not used for weighted prediction of the current block, the foregoing S201 is skipped.

In a possible implementation, at the encoding end, whether to use K different prediction modes for weighted prediction of the current block may be determined by determining a prediction mode parameter of the current block.

Optionally, in an implementation of the disclosure, the prediction mode parameter may indicate whether a GPM mode or an AWP mode can be used for the current block, that is, indicate whether K different prediction modes can be used for prediction of the current block.

It can be understood that, in the embodiment of the disclosure, the prediction mode parameter may be understood as a flag bit indicating whether the GPM mode or the AWP mode is used. Specifically, the encoder may use a variable as the prediction mode parameter, so that the prediction mode parameter may be set by setting a value of the variable. Exemplarily, in the disclosure, if the GPM mode or the AWP mode is used for the current block, the encoder may set a value of the prediction mode parameter to indicate that the GPM mode or the AWP mode is used for the current block. Specifically, the encoder may set the value of the variable to 1. Exemplarily, in the disclosure, if the GPM mode or the AWP mode is not used for the current block, the encoder may set the value of the prediction mode parameter to indicate that the GPM mode or the AWP mode is not used for the current block. Specifically, the encoder may set the value of the variable to 0. Further, in the embodiments of the disclosure, after setting of the prediction mode parameter is completed, the encoder may signal the prediction mode parameter into a bitstream and transmit the bitstream to a decoder, so that the decoder can obtain the prediction mode parameter after parsing the bitstream.

In some embodiments, as shown in Table 5, in embodiments of the disclosure, the conditions when the current block uses the GPM mode or the AWP mode may also be limited, that is, when it is determined that the current block meets the preset conditions, it is determined that the current block uses the K prediction modes for weighted prediction, and then the first combination is determined.

Exemplarily, limitations may be imposed on a size of the current block when applying the GPM mode or the AWP mode.

It may be understood that, in the prediction method provided in the embodiment of the disclosure, it is necessary to use the K different prediction modes to generate the K prediction values, which are then weighted to obtain a prediction value of the current block, in order to reduce complexity while considering the trade-off between compression performance and complexity, the GPM mode or the AWP mode may not be used for blocks with certain sizes in the embodiment of the disclosure. Therefore, in the disclosure, at the encoding end, a size parameter of the current block may be firstly determined, and then whether to use the GPM mode or the AWP mode for the current block is determined according to the size parameter.

In the embodiment of the disclosure, the size parameter of the current block may include a height and a width of the current block, and therefore, at the encoder, whether the current block uses the GPM mode or the AWP mode may be determined according to the height and the width of the current block.

Exemplarily, in the disclosure, if the width of the current block is greater than a first threshold and the height of the current block is greater than a second threshold, it is determined that the GPM mode or the AWP mode is used for the current block. As can be seen, one possible limitation is to use the GPM mode or the AWP mode only when the width of the block is greater than (or greater than or equal to) the first threshold and the height of the block is greater than (or greater than or equal to) the second threshold. The value of each of the first threshold and the second threshold may be 8, 16, 32, etc., and the first threshold may be equal to the second threshold.

Exemplarily, in the disclosure, if the width of the current block is less than a third threshold and the height of the current block is greater than a fourth threshold, it is determined that the GPM mode or the AWP mode is used for the current block. As can be seen, one possible limitation is to use the GPM mode or the AWP mode only when the width of the block is less than (or less than or equal to) the third threshold and the height of the block is greater than (or greater than or equal to) the fourth threshold. The value of each of the third threshold and the fourth threshold may be 8, 16, 32, etc., and the third threshold may be equal to the fourth threshold.

Further, in the embodiments of the disclosure, limitation on the size of a block for which the GPM mode or the AWP mode can be used may also be implemented through limitations on the sample parameter.

Exemplarily, in the disclosure, the encoder may firstly determine a sample parameter of the current block, and then determine, according to the sample parameter and a fifth threshold, whether the GPM mode or the AWP mode can be used for the current block. As can be seen, one possible limitation is to use the GPM mode or the AWP mode only when the number of samples in the block is greater than (or greater than or equal to) the fifth threshold. The value of the fifth threshold may be 8, 16, 32, etc.

That is, in the disclosure, the GPM mode or the AWP mode can be used for the current block when the size parameter of the current block satisfies a size requirement.

Exemplarily, in the disclosure, a flag at a picture-level may be used to determine whether the disclosure is applied to the current encoding picture. For example, it may be configured that the disclosure is applied to an intra frame (such as I frame) but is not applied to an inter frame (such as B frame or P frame). Alternatively, it may be configured that the disclosure is applied to the inter frame but is not applied to the intra frame. Alternatively, it may be configured that the disclosure is applied to some inter frames but is not applied to other inter frames. Since intra prediction may be used for an inter frame, the disclosure may be applied to an inter frame.

In some embodiments, a flag below the picture-level but above a CU level (such as tile, slice, patch, LCU, etc.) may further be used to determine whether the technical solution of the disclosure is applied to that region.

In embodiments of the disclosure, the first combination includes one first weight derivation mode and K first prediction modes.

The first weight derivation mode is used to determine the weights used by the current block. Specifically, the first weight derivation mode may be a mode for deriving weights. For a block with a given length and width, each weight derivation mode may derive a weight matrix; and for blocks with the same size, weight matrices derived by different weight derivation modes are different.

Exemplarily, in the disclosure, AWP has 56 weight derivation modes and GPM has 64 weight derivation modes.

The K different first prediction modes included in the first combination include the following examples.

Example 1: The K different first prediction modes each are an intra prediction mode, for example, the current block is an intra-encoded block and screen content encoding is not applicable.

Example 2: The K different first prediction modes each are an inter prediction mode, for example, the current block is an inter-encoded block.

Example 3: At least one of the K different first prediction modes is an intra prediction mode, and at least one of the K different first prediction modes is an inter prediction mode.

Example 4: At least one of the K different first prediction modes is an intra prediction mode, and at least one of the K different first prediction modes is a non-intra and non-inter prediction mode, for example, an intra block copy (IBC) prediction mode or a palette prediction mode.

Example 5: At least one of the K different first prediction modes is an inter prediction mode, and at least one of the K different first prediction modes is a non-intra and non-inter prediction mode, for example, an IBC prediction mode or a palette prediction mode.

Example 6: None of the K different first prediction modes is an intra prediction mode or an inter prediction mode. For example, one is an IBC prediction mode, and another is a palette prediction mode.

It should be noted that, there is no limitation on the specific types of the K different first prediction modes included in the first combination in embodiments of the disclosure.

In embodiments of the disclosure, the manner for determining the first combination at the encoding end, includes, but is not limited to, the following manners.

Manner 1, the first combination is a preset combination.

Manner 2, at the encoding end, a list is determined, and the list includes multiple candidate combinations. Therefore, the list is also called a candidate combination list. The first combination is determined from the candidate combination list. At this time, S201 includes the following steps:

S201-A, a candidate combination list is determined.

S201-B, a first combination is determined from the candidate combination list.

The candidate combination list includes multiple candidate combinations, and any candidate combination in the multiple candidate combinations includes one weight derivation mode and K prediction modes.

Exemplarily, the candidate combination list is shown in Table 6 above.

As shown in Table 6, the candidate combination list includes multiple candidate combinations, and any two candidate combinations in the multiple candidate combinations are not exactly the same, i.e., at least one of the weight derivation mode and the K prediction modes included in any two candidate combinations are different. For example, in the candidate combination 1 and the candidate combination 2, the weight derivation modes are different, or in the candidate combination 1 and the candidate combination 2, the weight derivation modes are the same, but at least one of the K prediction modes are different, or in the candidate combination 1 and the candidate combination 2, the weight derivation modes are different, and at least one of the K prediction modes are different.

Exemplarily, the sorting of the candidate combination in the candidate combination list is used as the index in Table 6 above. Optionally, the index of the candidate combination in the candidate combination list may also be reflected in other manners, and this is not limited in embodiments of the disclosure.

In Manner 2, at the encoding end, one candidate combination in the candidate combination list is determined as the first combination.

For example, at the encoding end, the first one of the candidate combinations in the candidate combination list is determined as the first combination.

In Manner 2, at the encoding end and the decoding end, the same candidate combination list may be determined respectively, for example, at each of the encoding end and the decoding end, a list including N candidate combinations is determined, and each candidate combination includes one weight derivation mode and K prediction modes. In the bitstream, at the encoding end, only the candidate combination finally selected needs to be signalled, such as the first combination, and at the decoding end, the first combination finally selected at the encoding end is parsed. Specifically, at the decoding end, the bitstream is decoded to obtain the first index, and the first combination is determined through the first index in the candidate combination list determined at the decoding end.

In embodiments of the disclosure, the specific manner for determining the candidate combination list at the encoding end is not limited.

In some embodiments, the candidate combination list is existing, and at the encoding end, when it is determined that weighted prediction can be performed on the current block using K prediction modes, the candidate combination list is obtained.

In some embodiments, the candidate combination list is formed at the encoding end. In this case, in some embodiments, the formed candidate combination list may be sent from the encoding end to the decoding end. In some embodiments, at the encoding end, the formed candidate combination list is uploaded to the cloud end, and at the decoding end, after the bitstream is decoded and a first index is obtained, the candidate combination list is read from the cloud end.

The process of forming the candidate combination list at the encoding end will be introduced below.

In embodiments of the disclosure, the manner for forming the candidate combination list at the encoding end is not limited.

In some embodiments, at the encoding end, the candidate combination list is formed through the following step S201-A1.

S201-A1, a candidate combination list is formed based on a template of the current block.

In template matching, by utilizing correlation between neighboring samples, some regions neighboring the current block are taken as a template. Before encoding the current block, blocks on the left and the top of the current block have already been encoded according to a coding order. In inter prediction, a best matching position of the template is found in a reference picture to determine motion information or a motion vector of the current block. In intra prediction, an intra prediction mode for the current block is determined by using the template.

The template of the current block is composed of the reconstructed regions around the current block, which are correlated to the current block. On this basis, in embodiments of the disclosure, the candidate combination list is formed based on the template of the current block.

There is no limitation on the shape of the template of the current block in the disclosure.

In some embodiments, the template includes at least one of a top encoded region, a left encoded region, or a top-left encoded region of the current block.

Optionally, a width of the top encoded region is the same as a width of the current block, a height of the left encoded region is the same as a height of the current block, a width of the top-left encoded region is the same as a width of the left encoded region, and a height of the top-left encoded region is the same as a height of the top encoded region.

For example, for each combination, the combination is used to predict the template of the current block, to obtain a prediction value of the template under each combination, and a candidate combination list is generated according to a prediction value of the template under each combination.

For each combination, the template of the current block is predicted by using the combination to obtain the prediction value of the template in each combination. Specifically, the weight of the template is derived by using the weight derivation mode included in the combination, the template is predicted by using the K prediction modes included in the combination to obtain K prediction values of the template, and the K prediction values of the template are weighted according to the derived weight of the template to obtain a prediction value of the template under the combination. Finally, a candidate combination list is generated according to the prediction value of the template in each combination.

It should be noted that, the above weights derived according to the weight derivation mode may be understood as a weight corresponding to each sample in the template, and may also be understood as a weight matrix corresponding to the template. When a prediction value of the template is determined based on the weight, K prediction values corresponding to each sample in the template may be determined, a prediction value corresponding to each sample is determined according to the K prediction values and the weight corresponding to each sample, and the prediction value corresponding to each sample in the template constitutes a prediction value of the template. Optionally, when a prediction value of the template is determined based on the weight, it may also be executed with regard to blocks, for example, a prediction value of the template is determined, and the K prediction values of the template are weighted according to the weight matrix of the template to obtain a prediction value of the template.

In some embodiments, S201-A1 includes the following steps S201-A11 to S201-A13.

S201-A11, R second combinations are determined, any second combination in the R second combinations includes one weight derivation mode and K prediction modes, the weight derivation mode and the K prediction modes included in any two combinations in the R second combinations are not completely the same, and R is a positive integer greater than 1.

S201-A12, for any second combination in the R second combinations, the template is predicted using the weight derivation mode and the K prediction modes in the second combination to obtain a template prediction value corresponding to the second combination.

S201-A13, a candidate combination list is generated according to the template prediction value corresponding to each of the R second combinations.

In the embodiment, when a candidate combination list is generated at the encoding end, first, R second combinations are determined. The specific value of "R" is not limited in the disclosure, such as 8, 16 and 32. Each second combination in the R second combinations includes one weight derivation mode and K prediction modes, and the weight derivation mode and the K prediction modes included in any two combinations in the R second combinations are not the same. Subsequently, for each second combination in the R second combinations, the template of the current block is predicted using the weight derivation mode and the K prediction modes included in the second combination to obtain a prediction value of the template in the second combination. Finally, a candidate combination list is generated according to a template prediction value corresponding to each of the R second combinations.

In the forgoing S201-A13, the manner for generating a candidate combination list according to the template prediction value corresponding to each of the R second combinations includes, but is not limited to, the following.

Manner 1, a candidate combination list is generated according to a value of the template prediction value corresponding to each of the R second combinations.

For example, the R second combinations are sorted according to the value of the template prediction value corresponding to each of the R second combinations, and the sorted R second combinations are determined as a candidate combination list. In this case, the candidate combination list includes R candidate combinations.

For another example, the R second combinations are sorted according to the value of the template prediction value corresponding to each of the R second combinations, and N second combinations are selected from the sorted second combinations to generate a candidate combination list. In this case, the candidate combination list includes N candidate combinations.

Manner 2, the foregoing S201-A13 includes the following steps.

S201-A13-1, a cost corresponding to the second combination is determined according to a template prediction value and a reconstruction value of the template corresponding to the second combination.

S201-A13-2, a candidate combination list is generated according to the cost corresponding to each second combination of the R second combinations.

As the template of the current block is a reconstructed region, the reconstruction value of the template may be obtained at the encoding end, so that for each of the R second combinations, a prediction distortion cost corresponding to the second combination may be determined according to the prediction value of the template and the reconstruction value of the template in the second combination. The manner for determining the cost corresponding to the second combination includes, but is not limited to, SAD, SATD, SEE, etc. Then, a candidate combination list is generated according to the cost corresponding to each second combination in the R second combinations.

In S201-A13-2, the manner for generating the candidate combination list according to the cost corresponding to each second combination in the R second combinations includes, but is not limited to, the following examples.

Example 1, the R second combinations are sorted according to the cost corresponding to each second combination in the R second combinations; and the sorted R second combinations are determined as the candidate combination list.

The candidate combination list generated in Example 1 includes R candidate combinations.

Optionally, the R candidate combinations in the candidate combination list are sorted in ascending order of the cost, that is, the costs corresponding to the R candidate combinations in the candidate combination list increase sequentially according to the sorting.

Sorting the R second combinations according to the cost corresponding to each second combination in the R second combinations may be to sort the R second combinations in ascending order of the cost.

Example 2, N second combinations are selected from the R second combinations according to the cost corresponding to the second combination, and the list composed of the N second combinations is determined as a candidate combination list.

Optionally, the N second combinations are the first N second combinations with the lowest cost among the R second combinations. For example, N second combinations with the lowest cost are selected from the R second combinations according to the cost corresponding to each second combination in the R second combinations to generate a candidate combination list. In this case, the candidate combination list includes N candidate combinations.

Optionally, the N candidate combinations in the candidate combination list are sorted in ascending order of the cost, that is, the costs corresponding to the N candidate combinations in the candidate combination list increase sequentially according to the sorting.

Next, the process of determining R second combinations in S201-A11 will be introduced.

In some embodiments, the R second combinations are preset. In this way, each second combination in the preset R second combinations is applied to predict the template of the current block to obtain a template prediction value corresponding to each second combination, then a cost corresponding to each second combination is determined according to the template prediction value and the reconstruction value of the template corresponding to each second combination, the R second combinations are sorted according to the cost corresponding to each second combination, and the sorted R second combinations are used as a candidate combination list, or N second combinations with the lowest cost are selected from the sorted R second combinations to generate a candidate combination list.

In some embodiments, S201-A11 includes the following steps.

S201-A11-1, P weight derivation modes and Q prediction modes are determined, P is a positive integer, and Q is a positive integer greater than or equal to K.

S201-A11-2, R second combinations are constructed according to the P weight derivation modes and the Q prediction modes, any second combination in the R second combinations includes one weight derivation mode in the P weight derivation modes and K prediction modes in the Q prediction modes, P is a positive integer, and Q is a positive integer greater than or equal to K.

In the embodiment, at the encoding end, first, P weight derivation modes and Q prediction modes are determined, and then R second combinations are formed according to the P weight derivation modes and the Q prediction modes.

In embodiments of the disclosure, the specific numbers of the foregoing P weight derivation modes and Q prediction modes are not limited.

In one possible implementation, it is assumed that the current block is an intra encoded block, and it is assumed that there are 64 possible weight derivation modes for GPM and 67 possible intra prediction modes for GPM, which may be found in the VVC standard. However, it is not to limit that there are only 64 possible weights for GPM, or specific 64 possible weights are used. It should be noted that the reason why 64 possible weights are selected for GPM of VVC is also a trade-off solution between improving the prediction effect and increasing the overhead in the bitstream. However, a fixed logic is no longer used to encode a weight derivation mode in the disclosure, and therefore, in theory, more kinds of weights may be used and they may be more flexibly used in the disclosure. Similarly, it is not to limit that there are only 67 intra predication modes for GPM, or specific 67 intra predication modes are used. Theoretically, all possible intra prediction modes may be used for GPM. For example, if an intra angular prediction mode is made more detailed and more intra angular prediction modes are generated, more intra angular prediction modes may be used for GPM. For example, the MIP (matrix-based intra prediction) mode of VVC may also be used in the disclosure. However, considering that there are many sub-modes of MIP for selection, MIP is not introduced in the embodiments for convenience of understanding. In addition, there are some wide angular modes which may also be used in the disclosure, and they will not be described in the embodiment.

It is assumed that K=2, the forgoing K prediction modes include a first prediction mode and a second prediction mode, it is assumed that there are all together 67 available prediction modes (i.e. Q=67), the first prediction mode has 67 possibilities, as the second prediction mode is different from the first prediction mode, there are 66 second prediction modes; it is assumed that there are 64 weight derivation modes (i.e. P=64), then in the disclosure, a second combination composed of any two different prediction modes and any one of the weight derivation modes may be used, and there are all together 64*67*66 possible second combinations.

In the implementation, P weight derivation modes are all possible weight derivation modes, for example, 64 weight derivation modes in GPM and Q prediction modes are all possible prediction modes, such as, 67 intra prediction modes in GPM. All possible second combinations are obtained using an exhaustive method, for example, 64*67*66 possible second combinations are obtained. The template of the current block is predicted using each second combination in the 64*67*66 possible second combinations, a distortion cost of each second combination is calculated, and then a candidate combination list corresponding to the current block is obtained according to the distortion cost of each second combination.

In some embodiments, in order to reduce the data volume and improve the generating speed of the candidate combination list, not every prediction mode is tried, and some prediction modes may be selected for trying.

In this case, the implementation for determining Q prediction modes in the foregoing S201-A11-1 includes, but is not limited to, the following manners.

Manner I, the Q prediction modes are preset prediction modes.

Manner II, at least one of a candidate prediction mode list of the current block, alternative prediction mode lists respectively corresponding to the K prediction modes, and a prediction mode corresponding to the weight derivation mode is determined, and Q prediction modes are determined according to the at least one of the candidate prediction mode list, the alternative prediction mode lists respectively corresponding to the K prediction modes, and the prediction mode corresponding to the weight derivation mode.

The candidate prediction mode list includes multiple candidate prediction modes, and the candidate prediction mode list corresponding to any prediction mode in the K prediction modes includes at least one candidate prediction mode.

Determining the alternative prediction mode list respectively corresponding to the K prediction modes may be understood as determining an alternative prediction mode list for each prediction mode in the K prediction modes, and when a second combination is subsequently formed, a certain prediction mode in the second combination is selected from the alternative prediction mode list corresponding to the prediction mode. For example, K=2, K prediction modes include a first prediction mode and a second prediction mode, at the encoding end, alternative prediction mode list 1 is generated for the first prediction mode, and an alternative prediction mode list 2 is generated for the second prediction mode. In this way, when different second combinations are formed in a later stage, an alternative prediction mode is selected from alternative prediction mode list 1 as the first prediction mode, and an alternative prediction mode is selected from alternative prediction mode list 2 as the second prediction mode, so that a weight derivation mode as well as the currently selected first prediction mode and second prediction mode constitute a second combination.

In embodiments of the disclosure, the manner for determining the alternative prediction mode list corresponding to each prediction mode in the K prediction modes is not limited.

In one possible implementation, for any prediction mode in the K prediction modes, at least one of the candidate prediction mode list corresponding to the prediction mode and the prediction mode corresponding to the weight derivation mode is determined; and the alternative prediction mode list corresponding to the prediction mode is determined according to the at least one of the candidate prediction mode list and the prediction mode corresponding to the weight derivation mode.

In embodiments of the disclosure, the process of determining a candidate prediction mode list corresponding to a certain one in the K prediction modes is basically similar to the process of determining a candidate prediction mode list corresponding to the current block, and the following description may be referred to for details.

In some embodiments, the candidate prediction mode list includes one or more inter prediction modes, for example, it includes at least one of skip, merge, normal inter prediction mode, unidirectional prediction, bidirectional prediction, multi-hypothesis prediction, etc.

In some embodiments, the candidate prediction mode list includes one or more intra prediction modes, for example, it includes at least one of direct current (DC) mode, PLANAR mode, angular mode, etc. Optionally, the candidate prediction mode list includes at least one intra prediction mode in the MPM list.

In some embodiments, the candidate prediction mode list may also include modes such as IBC and palette.

In the disclosure, the types of prediction modes and the numbers of prediction modes included in the candidate prediction mode list are not limited.

In some embodiments, the candidate prediction mode list is determined by at least one of the following manners.

Manner 1, the candidate prediction mode list includes a preset mode(s).

Manner 2, the candidate prediction mode list includes modes in the MPM list.

In some embodiments, a candidate intra prediction mode list may be an MPM list of the current block, for example, in VVC, an MPM list with a length of 6 may be obtained for the current block. In addition, in some subsequent technical evolutions, there is a solution of a secondary MPM, which may derive an MPM list with a length of 22. It can also be said that lengths of a first MPM list and a second MPM list add up to 22. That is, in embodiments of the disclosure, MPM may be used to select the intra prediction modes.

In some embodiments, if a preset mode is not included in the candidate prediction mode list determined above, the preset mode is added to the candidate prediction mode list.

Optionally, the preset mode includes at least one of DC, horizontal mode and vertical mode.

Optionally, a preset mode may be added in certain conditions, for example, when a number of prediction modes in the candidate prediction modes is less than or equal to a threshold, and the threshold may be 3, 4, 5, 6, etc.

Manner 3, the candidate prediction mode list includes a set of candidate prediction modes determined according to some rules, such as equal spacing selecting.

Manner 4: the candidate prediction mode list is determined according to the prediction mode used by at least one block adjacent to the current block.

For example, the prediction modes used by one or more blocks adjacent to the current block are added to the candidate prediction mode list to obtain a candidate prediction mode list of the current block, or to obtain a candidate prediction mode list corresponding to the $k^{th}$ prediction mode in the K prediction modes, where the $k^{th}$ prediction mode is any prediction mode in the K prediction modes.

For another example, the prediction mode corresponding to the $k^{th}$ prediction mode in the prediction modes used by one or more blocks adjacent to the current block is added to the candidate prediction mode list corresponding to the $k^{th}$ prediction mode. For example, if K=2, the $k^{th}$ prediction mode is the first prediction mode, and two blocks adjacent to the current block are also assumed to use two prediction modes for weighted prediction, where the two prediction modes used by the first adjacent block are respectively prediction mode 1 and prediction mode 3, and the two prediction modes used by the second adjacent block are respectively prediction mode 4 and prediction mode 5, so that prediction mode 1 and prediction mode 4 may be added to the candidate prediction mode list corresponding to the first prediction mode.

It should be noted that the forgoing Manners 1 to 4 may be used alone or in any combination when determining the candidate prediction mode list.

In some embodiments, the candidate prediction mode list includes at least one of a candidate intra prediction mode list and a candidate inter prediction mode list. The candidate intra prediction mode list includes at least one candidate intra prediction mode, and the candidate inter prediction mode list includes at least one candidate inter prediction mode.

According to the foregoing manner, after obtaining the candidate prediction mode list of the current block, Q prediction modes are determined according to the candidate prediction mode list, for example, all or some of the candidate prediction modes included in the candidate prediction mode list are determined as all or some of the Q prediction modes.

The process of determining the prediction mode corresponding to the weight derivation mode is introduced below.

In embodiments of the disclosure, the prediction mode corresponding to the weight derivation mode is a general term, for example, it may be a prediction mode corresponding to one preset weight derivation mode or prediction modes corresponding to several preset weight derivation modes. In some embodiments, the prediction mode corresponding to the weight derivation mode may also be understood as a prediction mode list corresponding to the weight derivation mode, and the prediction mode list includes at least one prediction mode.

In some embodiments, the prediction mode corresponding to the foregoing derivation mode includes a prediction mode corresponding to at least one weight derivation mode in the P weight derivation modes. In this case, determining the prediction mode corresponding to the weight derivation mode includes: with respect to the $p^{th}$ weight derivation mode in the P weight derivation modes, determining a prediction mode corresponding to the $p^{th}$ weight derivation mode, and determining a prediction mode corresponding to the foregoing weight derivation mode according to a prediction mode corresponding to at least one weight derivation mode in the P weight derivation modes, where p is a positive integer.

In embodiments of the disclosure, the process of determining the prediction mode corresponding to each of the P weight derivation modes is basically the same. For the convenience of description, the $p^{th}$ weight derivation mode in the P weight derivation modes is taken as an example in the following description.

There are two manners for determining the prediction mode corresponding to the $p^{th}$ weight derivation mode as follows.

Manner 1: if at least one of the prediction modes corresponding to the $p^{th}$ weight derivation mode is an intra prediction mode, an angle index is determined according to the $p^{th}$ weight derivation mode, and an intra prediction mode corresponding to the angle index is determined as at least one of the prediction modes corresponding to the $p^{th}$ weight derivation mode.

The angle index indicates an angle index of a boundary line of weights.

In some embodiments, the angle index is represented by the field "angleIdx".

Table 2 above shows a correspondence between merge_gpm_partition_idx and angleIdx. With reference to Table 2, the angle index may be derived according to the $p^{th}$ weight derivation mode.

In the disclosure, there is a correspondence between angle indices and intra prediction modes, that is, different angle indices correspond to different intra prediction modes.

Exemplarily, the correspondence between angle indices and intra prediction modes is that as illustrated in Table 7.

In manner I, taking K=2 as an example, if the first prediction mode or the second prediction mode is an intra prediction mode, the angle index is determined according to the $p^{th}$ weight derivation mode, for example, the angle index corresponding to the $p^{th}$ weight derivation mode is derived according to Table 2. Then, the intra prediction mode corresponding to the angle index is determined according to Table 7 above, for example, the angle index is 2, and the intra prediction mode corresponding to the angle index is 42, and then the intra prediction mode 42 is determined as the first prediction mode or the second prediction mode.

Manner II: if at least one of the prediction modes corresponding to the $p^{th}$ weight derivation mode is an intra prediction mode, an intra prediction mode corresponding to the $p^{th}$ weight derivation mode is determined, and at least one of the intra prediction modes corresponding to the $p^{th}$ weight derivation mode is determined as at least one of the prediction modes corresponding to the $p^{th}$ weight derivation mode.

The intra prediction mode corresponding to the $p^{th}$ weight derivation mode includes at least one of an intra prediction mode having a prediction direction parallel to a boundary line of weights, an intra prediction mode having a prediction direction perpendicular to the boundary line, and a planar mode.

It should be noted that the intra prediction mode having a prediction direction parallel to the boundary line of weights includes one or several intra prediction modes having a prediction direction parallel or approximately parallel to the boundary line of weights. The intra prediction modes having a prediction direction perpendicular to the boundary line of weights include one or several intra prediction modes having a prediction direction perpendicular or approximately perpendicular to the boundary line of weights.

In Manner II, taking K=2 as an example, if the first prediction mode and/or the second prediction mode is an intra prediction mode, the first prediction mode and/or the second prediction mode is determined from the intra prediction modes corresponding to the weight derivation mode. For example, the first prediction mode and/or the second prediction mode may be an intra prediction mode in which the prediction direction is in the same line or approximately the same line as the weight partition line (also called the boundary line). Alternatively, the first prediction mode and/or the second prediction mode may be an intra prediction mode having a prediction direction perpendicular or approximately perpendicular to the weight boundary line. For example, if the boundary line of weights is in a horizontal direction, such as the modes in which indices of GPM are 18, 19, 50 and 51 in FIG. 4, the first prediction mode and/or the second prediction mode is mode 18 in the horizontal direction or mode 50 in the perpendicular direction.

At the encoding end, a prediction mode corresponding to at least one weight derivation mode in the P weight derivation modes is determined according to the above steps, and then a prediction mode corresponding to the weight derivation mode is determined according to the prediction mode corresponding to at least one weight derivation mode in the P weight derivation modes. For example, all or some of the prediction modes corresponding to at least one weight derivation mode in the P weight derivation modes are taken as the prediction mode corresponding to the weight derivation mode.

Further, as there may be repeated prediction modes in the prediction modes corresponding to the P weight derivation modes, the repeated prediction modes are excluded, and the remaining different prediction modes are determined as the prediction modes corresponding to the weight derivation modes.

In embodiments of the disclosure, in order to reduce the number of R second combinations, the prediction modes are screened. Specifically, Q prediction modes are determined according to the above method.

In some embodiments, in order to reduce the complexity at the encoding end, the number of the Q prediction modes is limited, for example, Q is less than or equal to a first preset threshold. In the disclosure, the value of the first preset threshold is not limited, and may be determined according to actual needs, for example, the first preset threshold is 6, i.e., 6 prediction modes are selected to form R second combinations to limit the number of the second combinations.

In some embodiments, the value of Q is related to a size and/or a shape of the current block, where the shape of the current block may be understood to be determined by an aspect ratio of the current block.

During prediction, for relatively small blocks, similar prediction modes have little effect on the prediction results, while for relatively large blocks, similar prediction modes have more obvious effects on the prediction results. Based on this, in embodiments of the disclosure, different Q values are set for blocks of different sizes, that is, a relatively large Q value is set for relatively large blocks and a relatively small Q value is set for relatively small blocks.

In this case, when the value of Q corresponding to the current block is determined, it is set according to the size of the current block. For example, if the size of the current block is greater than a first value, Q is greater than or equal to a second preset threshold. For another example, if the size of the current block is less than or equal to the first value, Q is less than a third preset threshold. In embodiments of the disclosure, the specific value of the first value, the second preset threshold, and the third preset threshold are not limited, where the third preset threshold is less than the second preset threshold.

The process of determining P weight derivation modes in S202-A11-1 is introduced below.

As can be seen from the above, GPM includes 64 weight derivation modes and AWP includes 56 weight derivation modes.

In some embodiments, P weight derivation modes are the 64 weight derivation modes in GPM, or the 56 weight derivation modes in AWP.

In some embodiments, P weight derivation modes are selected from M preset weight derivation modes, where M is a positive integer greater than or equal to P.

The M preset weight derivation modes may be the 64 weight derivation modes in GPM, or the 56 weight derivation modes in AWP, or some weight derivation modes in the 64 weight derivation modes in GPM, or some weight derivation modes in the 56 weight derivation modes in AWP.

In the embodiment, in order to further reduce the number of the R second combinations, the M preset weight derivation modes are screened, and P weight derivation modes may be selected from the M preset weight derivation modes to form R second combinations.

In some embodiments, weight derivation modes corresponding to preset partition angles and/or preset offsets are excluded from the M weight derivation modes to obtain P weight derivation modes. As the same partition angle may correspond to multiple offsets in the weight derivation mode, as shown in FIG. 16A, weight derivation modes 10, 11, 12 and 13 have the same partition angle but different offsets, some weight derivation modes corresponding to the preset offsets may be excluded, and/or some weight derivation modes corresponding to the preset partition angle may also be excluded. This may reduce the total number of possible second combinations, and make the differences among possible second combinations more obvious.

In some embodiments, as selecting conditions corresponding to different blocks may be different, when P weight derivation modes corresponding to the current block are determined, a selecting condition corresponding to the current block is first determined, and P weight derivation modes are selected from the M weight derivation modes according to the selecting condition corresponding to the current block.

In some embodiments, the selecting condition corresponding to the current block includes a selecting condition corresponding to the size of the current block and/or a selecting condition corresponding to the shape of the current block. During prediction, for relatively small blocks, similar weight derivation modes have little effect on the prediction results, while for relatively large blocks, similar weight derivation modes have more obvious effects on the prediction results. Based on this, in embodiments of the disclosure, different P values are set for blocks of different sizes, that is, a relatively large P value is set for relatively large blocks, while a relatively small P value is set for relatively small blocks.

In some embodiments, the forgoing selecting conditions include an array, the array includes M elements, the M elements are in one-to one correspondence with the M weight derivation modes, and an element corresponding to each weight derivation mode indicates whether the weight derivation mode is available, where whether the weight derivation mode is available may be understood as whether the weight derivation mode can be used as one weight derivation mode in the P weight derivation modes for forming a second combination later.

The array may be a one-dimensional array or a two-dimensional array.

In some embodiments, if the selecting condition corresponding to the current block include the selecting condition corresponding to the size of the current block and the selecting condition corresponding to the shape of the current block, and for the same weight derivation mode, if the selecting condition corresponding to the size of the current block and the selecting condition corresponding to the shape of the current block both indicate that the weight derivation mode is available, then the weight derivation mode is determined as one of the P weight derivation modes. If at least one of the selecting condition corresponding to the size of the current block and the selecting condition corresponding to the shape of the current block indicates that the weight derivation mode is not available, then it is determined that the weight derivation mode is not included in the P weight derivation modes.

In some embodiments, for the selecting conditions corresponding to different block sizes and the selecting conditions corresponding to different block shapes, multiple arrays may be used for respective implementations.

In some embodiments, for the selecting conditions corresponding to different block sizes and the selecting conditions corresponding to different block shapes, a two-bit array may be used for implementation, that is, a two-bit array includes both the selecting condition corresponding to the block size and the selecting condition corresponding to the block shape.

At the encoding end, after Q prediction modes and P weight derivation modes are determined according to the above steps, R different second combinations are formed according to the Q prediction modes and the P weight derivation modes.

In some embodiments, in order to further improve the speed of generating the candidate combination list, at the encoding end, the Q prediction modes and the P weight derivation modes determined above are screened again. In this case, the foregoing S201-A11-2 of forming R second combinations according to the determined P weight derivation modes and Q prediction modes includes the following steps S201-A11-21 to S201-A11-23.

S201-A11-21, S weight derivation modes are selected from the P weight derivation modes, where S is a positive integer less than or equal to P.

Specifically, the weight derivation modes with a lower probability of occurrence are excluded from the P weight derivation modes determined above, and the screened S weight derivation modes are obtained.

The foregoing method of selecting S weight derivation modes from P weight derivation modes in the S201-A11-21 includes, but is not limited to, the following.

Manner 1, for the $i^{th}$ weight derivation mode in the P weight derivation modes, weights of K second prediction modes for the template are determined according to the $i^{th}$ weight derivation mode, the K second prediction modes are any K prediction modes in the Q prediction modes, and i is a positive integer from 1 to P. If a weight of any prediction mode in the K prediction modes for the template is less than a first preset value, the $i^{th}$ weight derivation mode is excluded from the P weight derivation modes to obtain S weight derivation modes.

In Manner 1, if a template weight derived by a weight derivation mode makes a certain prediction mode have little effect on the template, or have no effect on the template, this weight derivation mode is not used. For example, the weight derivation mode 52 in FIG. 4 (the square block) makes the weight of the second prediction mode on the template relatively small. For another example, the weight derivation mode 54 makes the weight of the second prediction mode on the template 0, that is, it can be considered that in the weight derivation mode 54, the second prediction mode has no effect on the template, and the prediction value of the template is completely determined by the first prediction mode. In this case, the second prediction mode has no effect at all, and such a weight derivation mode needs to be excluded from the P weight derivation modes.

In the forgoing Manner 1, the weight derivation modes in which the weight of any prediction mode in the K prediction modes for the template is less than the first preset value are excluded from the P weight derivation modes to obtain S weight derivation modes.

In embodiments of the disclosure, the value of the first preset value is not limited, for example, it is a smaller value greater than or equal to 0.

Manner 2, for the $i^{th}$ weight derivation mode in the P weight derivation modes, a cost of using the $i^{th}$ weight derivation mode to predict the template is determined, i is a positive integer from 1 to P; and S weight derivation modes are selected from the P weight derivation modes according to the cost corresponding to the $i^{th}$ weight derivation mode.

In Manner 2, S weight derivation modes are selected from the P weight derivation modes by calculating a cost corresponding to each weight derivation mode in the P weight derivation modes.

In embodiments of the disclosure, the weight derivation mode and the K prediction modes are taken as a combination to calculate the cost. In this way, for the convenience of calculation, the cost of the P weight derivation modes is calculated on the basis of the given K prediction modes. That is, the P weight derivation modes are respectively combined with the given K prediction modes to obtain P combinations, and a cost corresponding to each combination in the P combinations is calculated, thereby obtaining costs of the P weight derivation modes.

According to the above method, after the cost corresponding to the $i^{th}$ weight derivation mode in the P weight derivation modes is determined, S weight derivation modes are selected from the P weight derivation modes according to the cost corresponding to the $i^{th}$ weight derivation mode.

In Manner 2, at the encoding end, the manner for selecting S weight derivation modes from the P weight derivation modes according to the cost corresponding to the $i^{th}$ weight derivation mode includes the following:

First manner, if the cost corresponding to the $i^{th}$ weight derivation mode is less than a second preset value, a weight derivation mode similar to the $i^{th}$ weight derivation mode is selected from the P weight derivation modes; and S weight derivation modes are determined according to the $i^{th}$ weight derivation mode and the weight derivation mode similar to the $i^{th}$ weight derivation mode. The weight derivation mode similar to the $i^{th}$ weight derivation mode may be understood as a weight derivation mode having a prediction result similar to a prediction result of the $i^{th}$ weight derivation mode.

In embodiments of the disclosure, the value of the second preset value is not limited, and it is determined according to actual needs.

In some embodiments, at the encoding end, S weight derivation modes may also be selected from the P weight derivation modes in the following second manner.

Second manner, if a cost corresponding to the $i^{th}$ weight derivation mode is greater than a third preset value, the $i^{th}$ weight derivation mode and a weight derivation mode similar to the $i^{th}$ weight derivation mode are excluded from the P weight derivation modes to obtain at least one weight derivation mode after exclusion; and S weight derivation modes are determined according to the at least one weight derivation mode after exclusion.

In embodiments of the disclosure, the value of the third preset value is not limited, and is determined according to actual needs. The third preset value is greater than the second preset value.

According to the above steps, at the encoding end, after S weight derivation modes are selected from the P weight derivation modes, the following steps S201-A11-22 are performed.

S201-A11-22, T prediction modes are selected from Q prediction modes, and T is a positive integer less than or equal to Q.

In embodiments of the disclosure, the manner for selecting T prediction modes from the Q prediction modes are not limited.

In some embodiments, preset T prediction modes are selected from the Q prediction modes.

In some embodiments, for the $i^{th}$ prediction mode in the Q prediction modes, at the encoding end, a cost of using the $i^{th}$ prediction mode to predict the template is determined, i is a positive integer from 1 to Q; and T prediction modes are selected from the Q prediction modes according to the cost corresponding to the $i^{th}$ prediction mode.

In embodiments of the disclosure, the prediction mode and the K prediction modes are taken as a combination to calculate the cost. In this way, for the convenience of calculation, the cost of the Q weight derivation modes is calculated on the basis of the given weight derivation modes and other K−1 prediction modes. That is, the Q prediction modes are respectively combined with the given weight derivation modes and the K−1 prediction modes to obtain Q combinations, and a cost corresponding to each combination in the Q combinations is calculated, thereby obtaining costs of the Q prediction modes.

For example, it is assumed that the given K−1 prediction mode is a prediction mode 1 and the given weight derivation mode is a weight derivation mode 1, for the $i^{th}$ prediction mode in the Q prediction modes, a combination is constituted by weight derivation mode 1 with the $i^{th}$ prediction mode and prediction mode 1, and is referred to as combination i. Combination i is used to predict the template of the current block to obtain a prediction value of the template under combination i, a prediction distortion cost corresponding to the combination i is determined according to the prediction value of the template and a reconstruction value of the template under combination i, and the prediction distortion cost corresponding to combination i is determined as a cost corresponding to the $i^{th}$ prediction mode. In this way, a cost corresponding to any prediction mode in the Q prediction modes may be determined.

According to the above method, after the cost corresponding to the $i^{th}$ prediction mode in the Q prediction modes is determined, T prediction modes are selected from the Q prediction modes according to the cost corresponding to the $i^{th}$ prediction mode.

At the encoding end, the manner for selecting T prediction modes from the Q prediction modes according to the cost corresponding to the $i^{th}$ prediction mode includes the following.

First manner, if the cost corresponding to the $i^{th}$ prediction mode is less than a fourth preset value, a prediction mode similar to the $i^{th}$ prediction mode is selected from the Q prediction modes; and T prediction modes are determined according to the $i^{th}$ prediction mode and the prediction mode similar to the $i^{th}$ prediction mode. The prediction mode similar to the $i^{th}$ prediction mode may be understood as a prediction mode having a prediction result similar (close) to a prediction result of the $i^{th}$ prediction mode, for example, a prediction mode having a prediction direction (or angle) close to the prediction direction (or angle) of the $i^{th}$ prediction mode, or a prediction mode having a prediction mode index close to the index of the $i^{th}$ prediction mode, such as, a prediction mode having an index which is 1, 2, etc. larger than the index of the $i^{th}$ prediction mode, or a prediction mode having an index which is 1, 2, etc. smaller than the index of the $i^{th}$ prediction mode.

In embodiments of the disclosure, the value of the fourth preset value is not limited, and it is determined according to actual needs.

Second manner, if a cost corresponding to the $i^{th}$ prediction mode is greater than a fifth preset value, the $i^{th}$ prediction mode and a prediction mode similar to the $i^{th}$ prediction mode are excluded from the Q prediction modes to obtain at least one prediction mode after exclusion; and T prediction modes are determined according to the at least one prediction mode after exclusion.

In embodiments of the disclosure, the value of the fifth preset value is not limited, and is determined according to actual needs. The fifth preset value is greater than the fourth preset value.

According to the above steps, the S weight derivation modes are selected from the P weight derivation modes, and the T prediction modes are selected from the Q prediction modes. Next, the following S201-A11-23 is performed.

S201-A11-23, the R second combinations are formed according to the S weight derivation modes and the T prediction modes.

Specifically, a weight derivation mode is selected from the S weight derivation modes, the K prediction modes are selected from the T prediction modes, and this weight derivation mode and the K prediction modes forms a second combination. This step is repeatedly performed and the R second combinations may be obtained.

In some embodiments, the above S201-A11-2 includes the following: for the it weight derivation mode in the P weight derivation modes, a cost of using the $i^{th}$ weight derivation mode and the $j^{th}$ prediction mode in the Q prediction modes to predict the template is determined; the $j^{th}$ prediction mode and a prediction mode similar to the $j^{th}$ prediction mode are excluded from the Q prediction modes, to obtain at least one prediction mode after exclusion, if a cost corresponding to a combination of the $i^{th}$ weight derivation mode and the $j^{th}$ prediction mode is greater than a sixth preset value; and the R second combinations is formed according to the $i^{th}$ weight derivation mode and the at least one prediction mode after exclusion.

In this embodiment, when the weight derivation mode and one prediction mode are fixed, the other prediction mode needs to be selected. For example, for a certain weight derivation mode, if a certain intra prediction mode may not obtain a relatively small cost as the first prediction mode, then under the weight derivation mode, an intra prediction mode similar to the intra prediction mode is no longer tried as the first prediction mode.

According to the above steps, a final set of prediction modes corresponding to each weight derivation mode in the P weight derivation modes after exclusion may be determined, so that the R second combinations are formed according to the P weight derivation modes and their respective corresponding final sets of prediction modes after exclusion.

It should be noted that the above embodiment shows a manner for selecting a prediction mode in a form of a combination. Optionally, any one of a weight derivation mode and a prediction mode may also be screened in a form of a combination to finally form the R second combinations.

At the encoding end, after the R second combinations are determined according to the above methods, for any second combination in the R second combinations, the weight derivation mode and the K prediction modes in the second combination are used to predict the template to obtain a template prediction value corresponding to the second combination.

The process of predicting a template of the current block using any second combination to obtain a prediction value of the template will be introduced as follows.

First, a weight of the template is determined using a weight derivation mode included in the second combination.

At present, as shown in FIG. 13 above, the template of the current block is a top encoded region of the current block, or a left encoded region of the current block, or a left-top encoded region of the current block.

In some embodiments, the weight matrix may be directly extended to a template region, for example, extended leftwards and upwards to cover the template, so as to determine the template weight. For example, as illustrated in FIG. 17, a small rectangular region in the top-left of the current block may be added to the template, so that the template and the current block can constitute a rectangle. Alternatively, only the left part and the top part may be used as the template. As illustrated in FIG. 17, the top-left region is exemplarily added, and regions in the left, the top-left, and the top in an upside-down L-shaped region are a template region, and a bottom-right rectangular region is the current block. In this case, part of the weight matrix extended to the top-left becomes a weight matrix of the template.

In the embodiment of the disclosure, the process of deriving the template weight according to the weight derivation mode is combined with the process of deriving a weight of a prediction value, for example, the template weight and the weight of the prediction value are derived at the same time, where the weight of the prediction value may be understood as a weight corresponding to the prediction value. For example, the first prediction value is obtained according to the first prediction mode, the second prediction value is obtained according to the second prediction mode, a first weight of the first prediction value is determined according to the weight derivation mode, a second weight of the second prediction value is determined according to the weight derivation mode, and a sum of a product of the first prediction value and the first weight and a product of the second prediction value and the second weight is determined as a prediction value of the current block.

In the disclosure, in order to distinguish from the template weight, the first weight and the second weight each are referred to as a weight of a prediction value.

In some embodiments, determining the template weight according to the weight derivation mode includes the following steps.

Step 3, an angle index and a distance index are determined according to the weight derivation mode.

Step 4, the template weight is determined according to the angle index, the distance index, and a size of the template.

In the disclosure, the template weight may be derived in the same manner as deriving a weight of a prediction value. For example, the angle index and the distance index are firstly determined according to the weight derivation mode, where the angle index may be understood as an angle index of a boundary line of each weight derived from the weight derivation mode. Exemplarily, the angle index and the distance index corresponding to the weight derivation mode may be determined according to Table 2 above. For example, if the weight derivation mode is 27, a corresponding angle index is 12 and a corresponding distance index is 3. Then, the template weight is determined according to the angle index, the distance index, and the size of the template.

The manner for determining the template weight according to the angle index, the distance index and the size of the template in Step 4 includes, but is not limited to the following manners.

Manner I: The template weight is determined directly according to the angle index, the distance index, and the size of the template. In this case, Step 4 includes the following steps Step 41 to Step 43.

Step 41, a first parameter of a sample in the template is determined according to the angle index, the distance index, and the size of the template.

Step 42, a weight of the sample in the template is determined according to the first parameter of the sample in the template.

Step 43, the template weight is determined according to the weight of the sample in the template.

In this implementation, the weight of the sample in the template is determined according to the angle index, the distance index, the size of the template, and a size of the current block, and then a weight matrix formed by a weight of each sample in the template is determined as the template weight.

The first parameter of the disclosure is used to determine a weight. In some embodiments, the first parameter is also referred to as a weight index.

In a possible implementation, an offset and the first parameter may be determined in the following manner.

Figure 18:
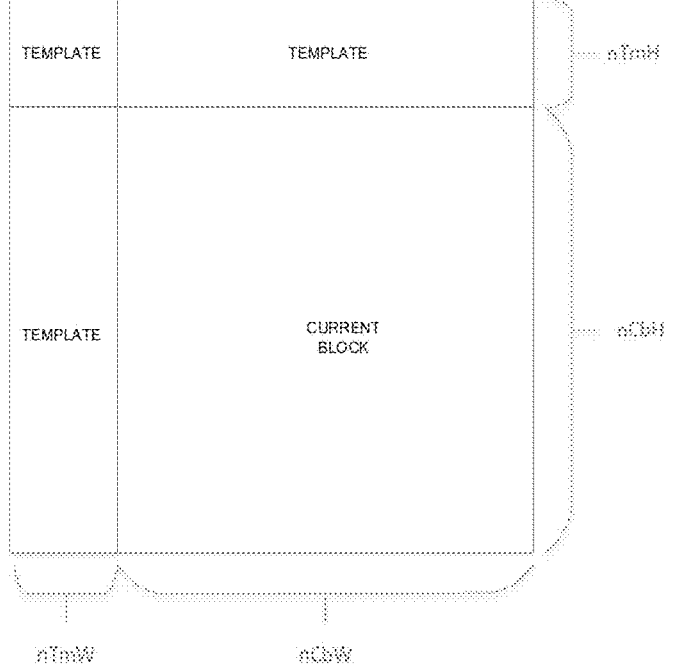
FIG. 18 is a schematic diagram illustrating a template.

Inputs to the process of deriving the template weight are: as illustrated in FIG. 18, the width nCbW of the current block, the height nCbH of the current block, a width nTmW of a left template, a height nTmH of a top template, a "partition" angle index variable angleId of GPM, a distance index variable distanceIdx of GPM, a component index variable cIdx. Exemplarily, in the disclosure, a luma component is taken as an example, and therefore cIdx=0, which indicates the luma component.

Variables nW, nH, shift1, offset1, displacementX, displacementY, partFlip, and shiftHor are derived as follows:

nW=(cIdx==0)?nCbW:nCbW*SubWidthC
nH=(cIdx==0)?nCbH:nCbH*SubHeightC
shift1=Max(5, 17—BitDepth), where BitDepth represents a coding bit depth;
offset1=1<<(shift1—1)
displacementX=angleIdx
displacementY=(angleIdx+8) % 32
partFlip=(angleIdx>=13 && angleIdx<=27)?0:1
shiftHor=(angleIdx % 16==8 (angleIdx % 16 !=0 && nH>=nW))?0:1

Offsets offsetX and offsetY are derived as follows:

if shiftHor=0:

$$offsetX = (-nW) >> 1$$

$$offsetY = ((-nH) >> 1) + $$
$$(angleIdx < 16 ? (distanceIdx * nH) >> 3 : -((distanceIdx * nH) >> 3))$$

otherwise (i. e. shiftHor=1):

$$offsetX = \left( (-nW) >> 1 \right) +$$

$$\left( angleIdx < 16 \;?\; (distanceIdx * nW) >> 3 : - \left( (distanceIdx * nW) >> 3 \right) \right)$$

$$offsetY = (-nH) >> 1$$

A template weight matrix wTemplateValue [x][y](where x=−nTmW . . . nCbW−1, y=−nTmH . . . nCbH−1, except for the case where x≥0 and y≥0) of the template is derived as follows (it should be noted that in this example, the coordinate of a top-left corner of the current block is (0, 0)):

variables xL and yL are derived as follows:

$$xL = \left( cIdx == 0 \right) \;?\; x{:}x * SubWidthC$$

$$yL = \left( cIdx == 0 \right) \;?\; y{:}y * SubHeightC$$

disLut is determined according to Table 3 above;
the first parameter weightIdx is derived as follows:

$$weightIdx = \left( ((xL + offsetX) << 1) + 1 \right) * disLut[displacementX] +$$

$$\left( ((yL + offsetY) << 1) + 1 \right) * disLut[displacementY]$$

After the first parameter weightIdx is determined according to the foregoing method, a weight of a sample (x, y) in the template is determined according to weightIdx.

In the disclosure, the manner for determining the weight of the sample in the template according to the first parameter of the sample in the template in Step 42 includes, but is not limited to, the following manners.

Manner 1: a second parameter of the sample in the template is determined according to the first parameter of the sample in the template, and the weight of the sample in the template is determined according to the second parameter of the sample in the template.

The second parameter is also used for determining a weight. In some embodiments, the second parameter is also referred to as a weight index for a first component, and the first component may be a luma component, a chroma component, or the like.

For example, the weight of the sample in the template is determined according to the following formula:

$$weightIdx = partFlip \;?\; 32 + weightIdx{:}32 - weightIdx$$

$$wTemplateValue[x][y] = Clip3\left(0,\, 8,\, (weightIdxL + 4) >> 3\right)$$

wTemplateValue[x][y] is the weight of the sample (x, y) in the template. weightIdxL is the second parameter of the sample (x, y) in the template, and is also referred to as a weight index for the first component (for example, a luma component). wTemplateValue[x][y] is the weight of the sample (x, y) in the template. partFlip is an intermediate variable, and is determined according to the angle index angleIdx, for example, partFlip=(angleIdx>=13 && angleIdx<=27)?0:1 as described above, that is, partFlip=1 or 0. If partFlip=0, weightIdxL=32−weightIdx; and if partFlip=1, weightIdxL=32+weightIdx. It should be noted that, 32 herein is merely an example, and the disclosure is not limited thereto.

Manner 2: the weight of the sample in the template is determined according to the first parameter of the sample in the template, a first threshold, and a second threshold.

In order to reduce complexity of calculating the template weight, in manner 2, the weight of the sample in the template is limited to the first threshold or the second threshold, that is, the weight of the sample in the template is either the first threshold or the second threshold, thereby reducing complexity of calculating the template weight.

The value of each of the first threshold and the second threshold is not limited in the disclosure.

Optionally, the first threshold is 1.

Optionally, the second threshold is 0.

In an example, the weight of the sample in the template may be determined according to the following formula:

$$wTemplateValue[x][y] = \left( partFlip \;?\; weightIdx{:} - weightIdx \right) > 0 \;?\; 1{:}0$$

wTemplateValue[x][y] is the weight of the sample (x, y) in the template. In the foregoing "1:0", 1 is the first threshold and 0 is the second threshold.

In manner I above, the weight of each sample in the template is determined according to the weight derivation mode, and a weight matrix formed by the weight of each sample in the template is used as the template weight.

Manner II: A weight of the current block and the template weight are determined according to the weight derivation mode. That is, in manner II, a merge region consisting of the current block and the template is taken as a whole, and a weight of a sample in the merge region is derived according to the weight derivation mode. Based on this, Step 4 includes the following steps Step 4-1 and Step 4-2.

Step 4-1, a weight of a sample in a merge region consisting of the current block and the template is determined according to the angle index, the distance index, the size of the template, and a size of the current block.

Step 4-2, the template weight is determined according to the size of the template and the weight of the sample in the merge region.

In manner II, the current block and the template are taken as a whole, the weight of the sample in the merge region consisting of the current block and the template is determined according to the angle index, the distance index, the size of the template, and the size of the current block, and then according to the size of the template, a weight corresponding to the template in the merge region is determined as the template weight, for example, as illustrated in FIG. 18, a weight corresponding to an L-shaped template region in the merge region is determined as the template weight.

In manner II, in a weight determination process, the template weight and the weight of a prediction value are determined, i.e. the weight of the prediction value is a weight corresponding to the merge region other than the template weight, so that a subsequent prediction process can be performed according to the weight of the prediction value, and the weight of the prediction value does not need to be determined again, thereby reducing the steps for prediction and improving prediction efficiency.

There is no limitation on the implementation of determining the weight of the sample in the merge region consisting of the current block and the template according to the angle index, the distance index, the size of the template, and the size of current block in the disclosure.

In some embodiments, determining the weight of the sample in the merge region in Step 4-1 includes the following steps Step 4-11 to Step 4-12.

Step 4-11, a first parameter of the sample in the merge region is determined according to the angle index, the distance index, and a size of the merge region.

Step 4-12, the weight of the sample in the merge region is determined according to the first parameter of the sample in the merge region.

In this implementation, the weight of the sample in the merge region is determined according to the angle index, the distance index, and the size of the merge region, and a weight of each sample in the merge region forms a weight matrix.

In a possible implementation, an offset and the first parameter may be determined in the following manner.

Inputs to the process of deriving the weight of the merge region are: as illustrated in FIG. 18, the width nCbW of the current block, the height nCbH of the current block, a width nTmW of a left template, a height nTmH of a top template, a "partition" angle index variable angleId of GPM, a distance index variable distanceIdx of GPM, a component index variable cIdx. Exemplarily, in the disclosure, a luma component is taken as an example, and therefore cIdx=0, which indicates the luma component.

Variables nW, nH, shift1, offset1, displacementX, displacementY, partFlip, and shiftHor are derived as follows:

nW=(cIdx==0)?nCbW:nCbW*SubWidthC nH=(cIdx==0)?nCbH:nCbH*SubHeightC shift1=Max(5, 17—BitDepth), where BitDepth represents a coding bit depth;

offset1=1<<(shift1—1)

displacementX=angleIdx displacementY=(angleIdx+8) % 32 partFlip=(angleIdx>=13 && angleIdx<=27)?0:1 shiftHor=(angleIdx % 16==8 (angleIdx % 16 !=0 && nH>=nW))?0:1

Offsets offsetX and offsetY are derived as follows:
if shiftHor=0:

$$offsetX = (-nW) >> 1$$

$$offsetY = ((-nH) >> 1) +$$
$$(angleIdx < 16 \; ? \; (distanceIdx * nH) >> 3 : -((distanceIdx * nH) >> 3))$$

otherwise (i. e. shiftHor=1):

$$offsetX = ((-nW) >> 1) +$$
$$(angleIdx < 16 \; ? \; (distanceIdx * nW) >> 3 : -((distanceIdx * nW) >> 3))$$
$$offsetY = (-nH) >> 1$$

The weight matrix wValueMatrix[x][y](where x=−nTmW . . . nCbW−1, y=−nTmH . . . nCbH−1) of the sample in the merge region is derived as follows (it should be noted that in this example, the coordinate of a top-left corner of the current block is (0, 0)):

variables xL and yL are derived as follows:

$$xL = (cIdx == 0) \; ? \; x:x * SubWidthC$$

$$yL = (cIdx == 0) \; ? \; y:y * SubHeightC$$

disLut is determined according to Table 3;
the first parameter weightIdx is derived as follows:

$$weightIdx = (((xL + offsetX) << 1) + 1) * disLut[displacementX] +$$
$$(((yL + offsetY) << 1) + 1) * disLut[displacementY]$$

After the first parameter weightIdx is determined according to the foregoing method, a weight of a sample (x, y) in the merge region is determined according to weightIdx.

In the disclosure, the manner for determining the weight of the sample in the merge region according to the first parameter of the sample in the merge region in Step 4-12 includes, but is not limited to, the following manners.

Manner 1: A second parameter of the sample in the merge region is determined according to the first parameter of the sample in the merge region, and the weight of the sample in the merge region is determined according to the second parameter of the sample in the merge region.

For example, the weight of the sample in the merge region is determined according to the following formula:

$$weightIdx = (((xL + offsetX) << 1) + 1) * disLut[displacementX] +$$
$$(((yL + offsetY) << 1) + 1) * disLut[displacementY]$$
$$weightIdxL = partFlip \; ? \; 32 + weightIdx:32 - weightIdx$$
$$wValueMatrix[x][y] = \text{Clip3}(0, 8, (weightIdxL + 4) >> 3)$$

wValueMatrix[x][y] is the weight of the sample (x, y) in the merge region. weightIdxL is the second parameter of the sample (x, y) in the merge region. wTemplateValue[x][y] is the weight of the sample (x, y) in the merge region.

Manner 2: The weight of the sample in the merge region is determined according to the first parameter of the sample in the merge region, a first threshold, and a second threshold.

Exemplarily, the weight of the sample in the merge region is the first threshold or the second threshold.

In order to reduce complexity of calculating the weight of the merge region, in manner 2, the weight of the sample in the merge region is limited to the first threshold or the second threshold, that is, the weight of the sample in the merge region is either the first threshold or the second threshold, thereby reducing complexity of calculating the weight of the merge region.

The value of each of the first threshold and the second threshold is not limited in the disclosure.

Optionally, the first threshold is 1.

Optionally, the second threshold is 0.

In an example, the weight of the sample in the merge region may be determined according to the following formula:

$$wTemplateValue[x][y] = (partFlip \; ? \; weightIdx: - weightIdx) > 0 \; ? \; 1:0$$

wValueMatrix[x][y] is the weight of the sample (x, y) in the merge region. In the foregoing "1:0", 1 is the first threshold and 0 is the second threshold.

In manner II above, the weight of each sample in the merge region consisting of the current block and the template is determined according to the weight derivation mode, and then a weight corresponding to the template in the merge region is determined as the template weight according to the size of the template. In addition, in manner II, a weight of a prediction value is also determined, and it is unnecessary to perform subsequent steps of determining the weight of the prediction value, thereby reducing the steps for prediction and improving prediction efficiency.

According to the foregoing method, after the template weight corresponding to the weight derivation mode included in the second combination is determined, the template is predicted using K prediction modes in the second combination to obtain K prediction values, and the K prediction values are weighted according to the template weight to obtain the prediction value of the template.

The prediction value of the template may be understood as a matrix composed of prediction values of samples in the template.

In some embodiments, the foregoing prediction values are also called prediction samples.

Subsequently, a cost of the second combination is determined according to the prediction value and the reconstruction value of the template.

The foregoing manners for determining the cost of the second combination include, but are not limited to, the following.

Manner I, the cost of the second combination is determined by using a matrix.

Specifically, a loss is determined according to the prediction value and the reconstruction value of the template, and the loss is recorded as a first loss. As the prediction value and the reconstruction value of the template are matrices, the obtained first loss is also a matrix. For example, an absolute value of a difference between the prediction value and the reconstruction value of the template is determined as the first loss, and the first loss is determined as the cost of the second combination.

Manner II, the cost of the second combination is determined by means of point-by-point calculation.

Specifically, with respect to the $i^{th}$ sample in the template, during determination of a prediction value of each prediction mode in the K prediction modes in the second combination at the $i^{th}$ sample, a template weight corresponding to the it sample in the template weight is determined, and a prediction value of the $i^{th}$ sample is obtained according to the template weight of the $i^{th}$ sample and K prediction values of the it sample. The cost of the second combination at the $i^{th}$ sample is obtained according to the prediction value and the reconstruction value of the $i^{th}$ sample. According to this method, a prediction distortion cost of the second combination at each sample in the template may be determined. Finally, a cumulative sum of the prediction distortion costs of the second combination at each sample in the template is determined as the cost of the second combination.

According to the above method, a cost of each of the R second combinations may be determined.

Then, a candidate combination list is generated according to the cost of each of the R second combinations.

For example, R second combinations are sorted in an ascending order according to the costs of the second combinations, and the sorted R second combinations are determined as a candidate combination list.

For another example, N second combinations with the lowest costs are selected from the R second combinations according to the costs of the second combinations, and a candidate combination list is generated.

Optionally, N is 8 or 16 or 32, etc.

According to the above method, a candidate combination list is determined, and the candidate combinations in the candidate combination list are sorted in an ascending order of the costs. Exemplarily, the candidate combination list is as shown in Table 6 above.

In this way, at the encoding end, the first combination is determined in the candidate combination list shown in Table 6, for example, a candidate combination with a smallest cost in the candidate combination list is determined as the first combination. That is, the weight derivation mode included in the candidate combination is determined as the first weight derivation mode, and the K prediction modes included in the candidate combination are determined as K first prediction modes. Next, at the encoding end, the following S 202 is performed.

S202, the current block is predicted according to the first weight derivation mode and the K first prediction modes, and a prediction value of the current block is obtained.

For example, weights of the prediction values are determined according to the first weight derivation mode, K prediction values are determined according to the K first prediction modes, and the prediction value of the current block is determined according to the K prediction values and the weights of the prediction values.

In one example, weights of the prediction value derived by the first weight derivation mode is a weight matrix.

The implementation process of the foregoing S202 is basically the same as that of the foregoing S103, and will not be repeated here with reference to the description of the foregoing S103.

S203, a bitstream is obtained according to a prediction value of a current block, the bitstream includes a first index, and the first index indicates a first combination.

Specifically, after the prediction value of the current block is determined according to the above steps, a residual value of the current block is obtained according to the current block and the prediction value of the current block, the residual value of the current block is transformed to obtain a transformation coefficient, the transformation coefficient is quantized to obtain a quantization coefficient, and the quantization coefficient is encoded to obtain the bitstream.

In embodiments of the disclosure, in order to maintain the consistency between the encoding and decoding ends, the encoding end indicates the first combination to the decoding end through the first index, that is, at the encoding end, the first index is written in the bitstream. In this way, at the decoding end, the first index is obtained by decoding the bitstream, and then the first combination corresponding to the current block is determined according to the first index, so that the first weight derivation mode and the K first prediction modes included in the first combination are used to predict the current block and a prediction value of the current block is obtained.

In embodiments of the disclosure, the specific form of the syntax element of the first index is not limited.

In one possible implementation, if the current block is predicted using the GPM technology, gpm_cand_idx is used to represent the first index.

As the foregoing first index indicates a first combination, in some embodiments, the first index may also be called a first combination index or an index of the first combination.

In one example, the syntax after adding the first index into the bitstream is shown in Table 5.

In some embodiments, in order to further reduce the encoding cost, at the encoding end, a variable length encoding manner is used to encode the first index into the bitstream.

In some embodiments, if the number of candidate combinations included in the candidate combination list is less than a fourth preset threshold, at the encoding end, the first index is encoded into the bitstream by a fixed-length encoding manner. That is, in embodiments of the disclosure, if the number of candidate combinations included in the candidate combination list is relatively small, all candidate combinations are uniformly encoded using a preset bit length. In embodiments of the disclosure, the value of the fourth preset threshold is not limited.

In some embodiments, a high level syntax may be used to control the switch of the technical solution of a combined encoding provided in embodiments of the disclosure. For example, at least one flag may be used to indicate whether the current block is allowed to use the technical solution of the combined encoding provided in embodiments of the disclosure, i.e., whether the first combination is allowed to be used for encoding.

In one possible implementation, at least one set flag may be a flag of a variable level, which indicates whether a corresponding level is allowed to use the technical solution of a combined encoding provided in embodiments of the disclosure.

Optionally, the at least one flag includes at least one of a sequence level flag, a picture-level flag, a slice-level flag, a unit-level flag and a block-level flag.

For example, the at least one flag includes a sequence level flag, and the sequence level flag indicates whether the current sequence is allowed to use the technical solution of a combined encoding provided in embodiments of the disclosure.

Exemplarily, the syntax element sps_cgpm_enabled_flag is added to the sequence parameter set. cgpm may be considered as the abbreviation of combined geometric partitioning mode. If the value of sps_cgpm_enabled_flag is 1, it indicates that the current sequence is allowed to use the technical solution of the disclosure; and if the value of sps_cgpm_enabled_flag is 0, it indicates that the current sequence is not allowed to use the technical solution of the disclosure.

If the technical solution provided in embodiments of the disclosure is used in inter mode, as sps_gpm_enbled_flag has already existed in the inter mode, the solution may also be controlled by sps_gpm_enbled_flag. As the solution may also be used in intra mode, sps_cgpm_enabled_flag or sps_gpm_enabled_flag may also be used in intra mode together with inter code. Of course, different flags may be used for intra mode and inter mode for better flexibility, such as setting an sps_sgpm_enabled_flag. sgpm may be considered as the abbreviation of spatial geometric partitioning mode. sps_sgpm_enabled_flag controls whether the solution is allowed to be used in intra mode, while sps_cgpm_enabled_flag or sps_gpm_enabled_flag controls whether the solution is allowed to be used in inter mode.

For another example, the at least one flag includes a picture-level flag, and the picture-level flag indicates whether the current picture is allowed to use the technical solution of the disclosure.

Optionally, if at least one flag includes a picture-level flag, the picture-level flag may be located in a picture header.

For another example, the at least one flag includes a slice-level flag, and the slice-level flag indicates whether the current slice is allowed to use the technical solution of the disclosure.

Optionally, if at least one flag includes a slice-level flag, the slice-level flag may be located in a slice header.

For another example, the at least one flag includes a unit-level flag, and the unit-level flag indicates whether the current CTU is allowed to use the technical solution of the disclosure.

For another example, the at least one flag includes a coding block (CU)-level flag, and the CU-level flag indicates whether the current block is allowed to use the technical solution of the disclosure.

Taking intra mode as an example, it is assumed that the CU-level flag is cu_sgpm_flag. If the value of cu_sgpm_flag is 1, it indicates that the current block is allowed to use the technical solution of the disclosure; and if the value of cu_sgpm_flag is 0, it indicates that the current block is not allowed to use the technical solution of the disclosure. At present, GPM in VVC is used in an inter merge mode, and it is obtained by derivation. Of course, it may also be directly represented by a CU-level flag in the future, and no limit is made here.

In this way, at the encoding end, first, the at least one flag is determined, and the encoding end determines whether the current block is allowed to use the technical solution of the disclosure according to the at least one flag. If the encoding end determines that the current block is not allowed to use the technical solution of the disclosure according to the at least one flag, the method in embodiments of the disclosure is skipped. If the encoding end determines that the current block is allowed to use the technical solution of the disclosure according to the at least one flag, the method in embodiments of the disclosure is performed, that is, the first combination is determined.

In the video encoding method provided in embodiments of the disclosure, at the encoding end, a first combination is determined, which includes a first weight derivation mode and K first prediction modes, predict a current block according to the first weight derivation mode and the K first prediction modes to obtain a prediction value of the current block, and obtain a bitstream according to the prediction value of the current block, where the bitstream includes a first index, and the first index indicates the first combination. In the disclosure, the weight derivation mode and the K prediction modes are taken as a combination, so that the weight derivation mode and the K prediction modes used by the current block are indicated in the form of a combination in the bitstream, so that the syntax becomes simpler, codewords are saved, determinations of various situations are not needed, and the encoding efficiency is further improved.

It should be understood that, FIG. 15 to FIG. 19 are merely examples of the disclosure, and should not be construed as limitations on the disclosure.

Preferable implementations of the disclosure have been described in detail above with reference to the accompanying drawings. However, the disclosure is not limited to the details described in the foregoing implementations. Within the scope of the technical concept of the disclosure, various simple modifications can be made to the technical solutions of the disclosure, and these simple modifications all fall within the protection scope of the disclosure. For example, various technical features described in the foregoing implementations may be combined in any suitable manner without contradiction, and in order to avoid unnecessary redundancy, various possible combinations are not further described in the disclosure. For another example, various implementations of the disclosure may also be combined in any manner, and as long as the combinations do not depart from the idea of the disclosure, they should also be considered as contents disclosed in the disclosure.

It should also be understood that, in various method embodiments of the disclosure, the value of a sequence number of each of the foregoing processes does not mean an execution order, and an execution order of each process should be determined according to a function and an internal logic of the process, which shall not constitute any limitation on an implementation process of embodiments of the disclosure. In addition, the term "and/or" herein only describes an association between associated objects, which means that there can be three relationships. Specifically, A and/or B can mean A alone, both A and B exist, and B alone. Besides, the character "/" herein generally indicates that the associated objects are in an "or" relationship.

The method embodiments of the disclosure are described in detail above with reference to FIG. 15 to FIG. 19, and the apparatus embodiments of the disclosure are described in detail below with reference to FIG. 20 to FIG. 22.

FIG. 20 is a schematic block diagram of a video decoding apparatus provided in an embodiment of the disclosure. The video decoding apparatus 10 is applied to the foregoing video decoder. As illustrated in FIG. 20, a video decoding apparatus 10 includes the following.

A decoding unit 11 configured to decode a bitstream to obtain a first index, where the first index indicates a first combination consisting of one weight derivation mode and K prediction modes, and K is a positive integer greater than 1.

A determining unit 12 configured to determine a first weight derivation mode and K first prediction modes included in the first combination according to the first index.

A predicting unit 13 configured to predict a current block according to the first weight derivation mode and the K first prediction modes to obtain a prediction value of the current block.

In some embodiments, the determining unit 12 is specifically configured to determine a candidate combination list, where the candidate combination list includes multiple candidate combinations, and any candidate combination in the multiple candidate combinations includes one weight derivation mode and K prediction modes; and determine a weight derivation mode and K prediction modes included in a candidate combination corresponding to the first index in the candidate combination list as the first weight derivation mode and the K first prediction modes.

In some embodiments, the determining unit 12 is specifically configured to generate the candidate combination list.

In some embodiments, the determining unit 12 is specifically configured to generate the candidate combination list based on a template of the current block.

In some embodiments, the determining unit 12 is specifically configured to: determine R second combinations, where any second combination in the R second combinations includes one weight derivation mode and K prediction modes, where weight derivation modes and K prediction modes included in any two combinations of the R second combinations are not completely the same, and R is a positive integer greater than 1; for any second combination in the R second combinations, use a weight derivation mode and K prediction modes in the second combination to predict the template and obtain a template prediction value corresponding to the second combination; and generate the candidate combination list according to a template prediction value corresponding to each second combination in the R second combinations.

In some embodiments, the determining unit 12 is specifically configured to determine a cost corresponding to the second combination according to a template prediction value corresponding to the second combination and a reconstruction value of the template; and generate the candidate combination list according to a cost corresponding to each second combination in the R second combinations.

In some embodiments, the determining unit 12 is specifically configured to sort the R second combinations according to a cost corresponding to each second combination in the R second combinations; and determine the R second combinations after sorting as the candidate combination list.

In some embodiments, the determining unit 12 is specifically configured to sort the R second combinations in an ascending order of the cost.

In some embodiments, the determining unit 12 is specifically configured to select N second combinations from the R second combinations according to the cost corresponding to the second combination; and determine a list composed of the N second combinations as the candidate combination list.

Optionally, the N second combinations are first N second combinations with smallest costs in the R second combinations.

In some embodiments, the determining unit 12 is specifically configured to determine P weight derivation modes and Q prediction modes, where P is a positive integer and Q is a positive integer greater than or equal to K; and form the R second combinations according to the P weight derivation modes and the Q prediction modes, where any second combination in the R second combinations includes one weight derivation mode in the P weight derivation modes and K prediction modes in the Q prediction modes.

In some embodiments, the determining unit 12 is specifically configured to determine at least one of a candidate prediction mode list of the current block, alternative prediction mode lists respectively corresponding to the K prediction modes, and a prediction mode corresponding to a weight derivation mode, where the candidate prediction mode list includes multiple candidate prediction modes, and an alternative prediction mode list corresponding to any prediction mode in the K prediction modes includes at least one alternative prediction mode; and determine the Q prediction modes according to at least one of the candidate prediction mode list, the alternative prediction mode lists respectively corresponding to the K prediction modes, and the prediction mode corresponding to a weight derivation mode.

In some embodiments, the determining unit 12 is specifically configured to, for any prediction mode in the K prediction modes, determine at least one of a candidate prediction mode list corresponding to the prediction mode and a prediction mode corresponding to a weight derivation mode; and determine an alternative prediction mode list corresponding to the prediction mode according to at least one of the candidate prediction mode list and the prediction mode corresponding to a weight derivation mode.

In some embodiments, the determining unit 12 is specifically configured to determine the candidate prediction mode list according to a prediction mode used by at least one block adjacent to the current block.

In some embodiments, the determining unit 12 is further configured to add a preset mode into the candidate prediction mode list, if the preset mode is not included in the candidate prediction mode list.

Optionally, the preset mode includes at least one of direct current (DC) mode, a planar mode, and a vertical mode.

Optionally, the candidate prediction mode list includes at least one of a candidate intra prediction mode list and a candidate inter prediction mode list, the candidate intra prediction mode list includes at least one candidate intra prediction mode, and the candidate inter prediction mode list includes at least one candidate inter prediction mode.

In some embodiments, the determining unit 12 is specifically configured to, for the $p^{th}$ weight derivation mode in the P weight derivation modes, determine a prediction mode corresponding to the $p^{th}$ weight derivation mode, where p is a positive integer; and determine the prediction mode corresponding to the weight derivation mode according to a prediction mode corresponding to at least one weight derivation mode in the P weight derivation modes.

In some embodiments, if at least one of prediction modes corresponding to the $p^{th}$ weight derivation mode is an intra prediction mode, the determining unit 12 is specifically configured to determine an angle index according to the $p^{th}$ weight derivation mode; and determine an intra prediction mode corresponding to the angle index as the at least one of prediction modes corresponding to the $p^{th}$ weight derivation mode.

In some embodiments, if at least one of prediction modes corresponding to the $p^{th}$ weight derivation mode is an intra prediction mode, the determining unit 12 is specifically configured to determine intra prediction modes corresponding to the weight derivation mode; and determine at least one of intra prediction modes corresponding to the weight derivation mode as the at least one of prediction modes corresponding to the weight derivation mode.

In some embodiments, the intra prediction modes corresponding to the $p^{th}$ weight derivation mode include at least one of an intra prediction mode in which a prediction angle is parallel to a boundary line corresponding to the weight derivation mode, an intra prediction mode in which a prediction angle is perpendicular to a boundary line corresponding to the weight derivation mode, and a planar mode.

In some embodiments, Q is less than or equal to a first preset threshold.

In some embodiments, the value of Q is related to a size and/or a shape of the current block.

In some embodiments, if the size of the current block is greater than a first value, Q is greater than or equal to a second preset threshold.

In some embodiments, if the size of the current block is less than or equal to a first value, Q is less than a third preset threshold value.

In some embodiments, the determining unit 12 is specifically configured to select the P weight derivation modes from M preset weight derivation modes, where M is a positive integer greater than or equal to P.

In some embodiments, the determining unit 12 is specifically configured to exclude weight derivation modes corresponding to a preset partition angle and/or a preset offset from the M weight derivation modes to obtain the P weight derivation modes.

In some embodiments, the determining unit 12 is specifically configured to determine a selecting condition corresponding to the current block; and select the P weight derivation modes from the M weight derivation modes according to the selecting condition.

In some embodiments, the selecting condition corresponding to the current block includes a selecting condition corresponding to the size of the current block and/or a selecting condition corresponding to the shape of the current block.

In some embodiments, the selecting condition includes an array, the array includes M elements, the M elements are in one-to-one correspondence with the M weight derivation modes, and an element corresponding to the weight derivation mode indicates whether the weight derivation mode is available.

In some embodiments, the determining unit 12 is specifically configured to select S weight derivation modes from the P weight derivation modes, where S is a positive integer less than or equal to P; select T prediction modes from the Q prediction modes, where T is a positive integer less than or equal to Q; and form the R second combinations according to the S weight derivation modes and the T prediction modes.

In some embodiments, the determining unit 12 is specifically configured to, for an it weight derivation mode in the P weight derivation modes, determine weights of K second prediction modes for the template according to the $i^{th}$ weight derivation mode, where the K second prediction modes are any K prediction modes in the Q prediction modes, and i is a positive integer from 1 to P; and exclude the $i^{th}$ weight derivation mode from the P weight derivation modes to obtain the S weight derivation modes, if a weight of any prediction mode in the K prediction modes for the template is less than a first preset value.

In some embodiments, the determining unit 12 is specifically configured to for an $i^{th}$ weight derivation mode in the P weight derivation modes, determine a cost of using the $i^{th}$ weight derivation mode to predict the template, where i is a positive integer from 1 to P; and select the S weight derivation modes from the P weight derivation modes according to a cost corresponding to the $i^{th}$ weight derivation mode.

In some embodiments, the determining unit 12 is specifically configured to select a weight derivation mode similar to the $i^{th}$ weight derivation mode from the P weight derivation modes, if the cost corresponding to the $i^{th}$ weight derivation mode is less than a second preset value; and determine the S weight derivation modes according to the $i^{th}$ weight derivation mode and the weight derivation mode similar to the $i^{th}$ weight derivation mode.

In some embodiments, the determining unit 12 is specifically configured to exclude the $i^{th}$ weight derivation mode and the weight derivation mode similar to the $i^{th}$ weight derivation mode from the P weight derivation modes to obtain at least one weight derivation mode after exclusion, if the cost corresponding to the $i^{th}$ weight derivation mode is greater than a third preset value; and determine the S weight derivation modes according to the at least one weight derivation mode after exclusion.

In some embodiments, the determining unit 12 is specifically configured to, for an $i^{th}$ prediction mode in the Q prediction modes, determine a cost of using the $i^{th}$ prediction mode to predict the template, where i is a positive integer from 1 to Q; and select the T prediction modes from the Q prediction modes according to a cost corresponding to the $i^{th}$ prediction mode.

In some embodiments, the determining unit 12 is specifically configured to select a prediction mode similar to the $i^{th}$ prediction mode from the Q prediction modes, if the cost corresponding to the $i^{th}$ prediction mode is less than a fourth preset value; and determine the T prediction modes according to the $i^{th}$ prediction mode and the prediction mode similar to the $i^{th}$ prediction mode.

In some embodiments, the determining unit 12 is specifically configured to exclude the $i^{th}$ prediction mode and the prediction mode similar to the $i^{th}$ prediction mode from the Q prediction modes to obtain at least one prediction mode after exclusion, if the cost corresponding to the $i^{th}$ prediction mode is greater than a fifth preset value; and determine the T prediction modes according to the at least one prediction mode after exclusion.

In some embodiments, the determining unit 12 is specifically configured to, for an $i^{th}$ weight derivation mode in the P weight derivation modes, determine a cost of using the $i^{th}$ weight derivation mode and the $j^{th}$ prediction mode in the Q prediction modes to predict the template; exclude the $j^{th}$ prediction mode and a prediction mode similar to the $j^{th}$ prediction mode from the Q prediction modes to obtain at least one prediction mode after exclusion, if a cost corresponding to a combination of the $i^{th}$ weight derivation mode and the $j^{th}$ prediction mode is greater than a sixth preset value; and form the R second combinations according to the $i^{th}$ weight derivation mode and the at least one prediction mode after exclusion.

In some embodiments, the predicting unit 13 is specifically configured to determine a weight of the prediction value according to the first weight derivation mode; determine the K prediction values according to the K first prediction modes; and weight the K prediction values according to weights of the K prediction values to obtain the prediction value of the current block.

Optionally, the weight of the prediction value is a weight matrix.

In some embodiments, the first index is encoded into bitstream in a variable length encoding manner.

In some embodiments, if a number of candidate combinations included in the candidate combination list is less than a fourth preset threshold, the first index is encoded into the bitstream in a fixed length encoding manner.

In some embodiments, the decoding unit 11 is further configured to decode the bitstream to obtain at least one flag, where the at least one flag indicates that a first combination is to be used for decoding; and decode the bitstream to obtain the first index, if the at least one flag indicates that the first combination is to be used for decoding.

In some embodiments, the at least one flag includes at least one of a sequence level flag, a picture-level flag, a slice-level flag, a unit-level flag, and a block-level flag.

It should be understood that apparatus embodiments and method embodiments may correspond to each other, and method embodiments may be referred to for similar descriptions. In order to avoid repetition, they will not be repeated here. Specifically, the apparatus 10 shown in FIG. 20 may execute a decoding method at a decoding end in embodiments of the disclosure, and the foregoing and other operations and/or functions of each unit in the apparatus 10 are respectively to achieve the corresponding processes in various manners of the decoding method at the decoding end, and they are not repeated here for brevity.

FIG. 21 is a schematic block diagram of a video encoding apparatus provided in an embodiment of the disclosure. The video encoding apparatus is applied to the foregoing encoder.

As shown in FIG. 21, a video encoding apparatus 20 includes the following.

A determining unit 21 configured to determine a first combination, where the first combination includes a first weight derivation mode and K first prediction modes.

A predicting unit 22 configured to predict a current block according to the first weight derivation mode and the K first prediction modes to obtain a prediction value of the current block.

An encoding unit 23 configure to obtain a bitstream according to the prediction value of the current block, where the bitstream includes a first index, and the first index indicates the first combination.

In some embodiments, the determining unit 21 is specifically configured to determine a candidate combination list, where the candidate combination list includes multiple candidate combinations, and any candidate combination in the multiple candidate combinations includes one weight derivation mode and K prediction modes; and determine the first combination from the candidate combination list.

In some embodiments, the determining unit 21 is specifically configured to generate the candidate combination list.

In some embodiments, the determining unit 21 is specifically configured to generate the candidate combination list based on a template of the current block.

In some embodiments, the determining unit 21 is specifically configured to determine R second combinations, where any second combination in the R second combinations includes one weight derivation mode and K prediction modes, where weight derivation modes and K prediction modes included in any two combinations of the R second combinations are not completely the same, and R is a positive integer greater than 1; for any second combination in the R second combinations, use a weight derivation mode and K prediction modes in the second combination to predict the template and obtain a template prediction value corresponding to the second combination; and generate the candidate combination list according to a template prediction value corresponding to each second combination in the R second combinations.

In some embodiments, the determining unit 21 is specifically configured to determine a cost corresponding to the second combination according to a template prediction value corresponding to the second combination and a reconstruction value of the template; and generate the candidate combination list according to a cost corresponding to each second combination in the R second combinations.

In some embodiments, the determining unit 21 is specifically configured to sort the R second combinations according to a cost corresponding to each second combination in the R second combinations; and determine the R second combinations after sorting as the candidate combination list.

In some embodiments, the determining unit 21 is specifically configured to sort the R second combinations in an ascending order of to the cost.

In some embodiments, the determining unit 21 is specifically configured to select N second combinations from the R second combinations according to the cost corresponding to the second combination; and determine a list composed of the N second combinations as the candidate combination list.

Optionally, the N second combinations are first N second combinations with smallest costs in the R second combinations.

In some embodiments, the determining unit 21 is specifically configured to determine P weight derivation modes and Q prediction modes, where P is a positive integer and Q is a positive integer greater than or equal to K; and form the R second combinations according to the P weight derivation modes and the Q prediction modes, where any second combination in the R second combinations includes one weight derivation mode in the P weight derivation modes and K prediction modes in the Q prediction modes, P is a positive integer, and Q is a positive integer greater than or equal to K.

In some embodiments, the determining unit 21 is specifically configured to determine at least one of a candidate prediction mode list of the current block, alternative prediction mode lists respectively corresponding to the K prediction modes, and a prediction mode corresponding to a weight derivation mode, where the candidate prediction mode list includes multiple candidate prediction modes, and an alternative prediction mode list corresponding to any prediction mode in the K prediction modes includes at least one alternative prediction mode; and determine the Q prediction modes according to at least one of the candidate prediction mode list, the alternative prediction mode lists respectively corresponding to the K prediction modes, and the prediction mode corresponding to a weight derivation mode.

In some embodiments, the determining unit 21 is specifically configured to, for any prediction mode in the K prediction modes, determine at least one of a candidate prediction mode list corresponding to the prediction mode and a prediction mode corresponding to a weight derivation mode; and determine an alternative prediction mode list corresponding to the prediction mode according to at least one of the candidate prediction mode list and the prediction mode corresponding to a weight derivation mode.

In some embodiments, the determining unit 21 is specifically configured to determine the candidate prediction mode list according to a prediction mode used by at least one block adjacent to the current block.

In some embodiments, the determining unit 21 is further configured to add a preset mode into the candidate prediction mode list, if the preset mode is not included in the candidate prediction mode list.

Optionally, the preset mode includes at least one of direct current (DC) mode, a planar mode, and a vertical mode.

Optionally, the candidate prediction mode list includes at least one of a candidate intra prediction mode list and a candidate inter prediction mode list, the candidate intra prediction mode list includes at least one candidate intra prediction mode, and the candidate inter prediction mode list includes at least one candidate inter prediction mode.

In some embodiments, the determining unit 21 is specifically configured to, for a $p^{th}$ weight derivation mode in the P weight derivation modes, determine a prediction mode corresponding to the $p^{th}$ weight derivation mode, where p is a positive integer; and determine the prediction mode corresponding to the weight derivation mode according to a prediction mode corresponding to at least one weight derivation mode in the P weight derivation modes.

In some embodiments, if at least one of prediction modes corresponding to the $p^{th}$ weight derivation mode is an intra prediction mode, the determining unit 21 is specifically configured to determine an angle index according to the $p^{th}$ weight derivation mode; and determine an intra prediction mode corresponding to the angle index as the at least one of prediction modes corresponding to the $p^{th}$ weight derivation mode.

In some embodiments, if at least one of prediction modes corresponding to the $p^{th}$ weight derivation mode is an intra prediction mode, the determining unit 21 is specifically configured to determine intra prediction modes corresponding to the $p^{th}$ weight derivation mode; and determine at least one of intra prediction modes corresponding to the $p^{th}$ weight derivation mode as the at least one of prediction modes corresponding to the $p^{th}$ weight derivation mode.

Optionally, the intra prediction modes corresponding to the $p^{th}$ weight derivation mode include at least one of an intra prediction mode in which a prediction angle is parallel to a boundary line corresponding to the weight derivation mode, an intra prediction mode in which a prediction angle is perpendicular to a boundary line corresponding to the weight derivation mode, and a planar mode.

In some embodiments, Q is less than or equal to a first preset threshold.

In some embodiments, the value of Q is related to a size and/or a shape of the current block.

In some embodiments, if the size of the current block is greater than a first value, Q is greater than or equal to a second preset threshold.

In some embodiments, if the size of the current block is less than or equal to a first value, Q is less than a third preset threshold value.

In some embodiments, the determining unit 21 is specifically configured to select the P weight derivation modes from M preset weight derivation modes, where M is a positive integer greater than or equal to P.

In some embodiments, the determining unit 21 is specifically configured to exclude weight derivation modes corresponding to a preset partition angle and/or a preset offset from the M weight derivation modes to obtain the P weight derivation modes.

In some embodiments, the determining unit 21 is specifically configured to determine a selecting condition corresponding to the current block; and select the P weight derivation modes from the M weight derivation modes according to the selecting condition.

In some embodiments, the selecting condition corresponding to the current block includes a selecting condition corresponding to the size of the current block and/or a selecting condition corresponding to the shape of the current block.

In some embodiments, the selecting condition includes an array, the array includes M elements, the M elements are in one-to-one correspondence with the M weight derivation modes, and an element corresponding to the weight derivation mode indicates whether the weight derivation mode is available.

In some embodiments, the determining unit 21 is specifically configured to select S weight derivation modes from the P weight derivation modes, where S is a positive integer less than or equal to P; select T prediction modes from the Q prediction modes, where T is a positive integer less than or equal to Q; and form the R second combinations according to the S weight derivation modes and the T prediction modes.

In some embodiments, the determining unit 21 is specifically configured to, for an it weight derivation mode in the P weight derivation modes, determine weights of K second prediction modes for the template according to the $i^{th}$ weight derivation mode, where the K second prediction modes are any K prediction modes in the Q prediction modes, and the i is a positive integer from 1 to P; and exclude the $i^{th}$ weight derivation mode from the P weight derivation modes, so as to obtain the S weight derivation modes, if a weight of any prediction mode in the K prediction modes for the template is less than a first preset value.

In some embodiments, the determining unit 21 is specifically configured to, for an $i^{th}$ weight derivation mode in the P weight derivation modes, determine a cost of using the $i^{th}$ weight derivation mode to predict the template, where i is a positive integer from 1 to P; and select the S weight derivation modes from the P weight derivation modes according to a cost corresponding to the $i^{th}$ weight derivation mode.

In some embodiments, the determining unit 21 is specifically configured to select a weight derivation mode similar to the $i^{th}$ weight derivation mode from the P weight derivation modes, if the cost corresponding to the $i^{th}$ weight derivation mode is less than a second preset value; and determine the S weight derivation modes according to the $i^{th}$ weight derivation mode and the weight derivation mode similar to the $i^{th}$ weight derivation mode.

In some embodiments, the determining unit 21 is specifically configured to exclude the $i^{th}$ weight derivation mode and the weight derivation mode similar to the $i^{th}$ weight derivation mode from the P weight derivation modes to obtain at least one weight derivation mode after exclusion, if the cost corresponding to the $i^{th}$ weight derivation mode is greater than a third preset value; and determine the S weight derivation modes according to the at least one weight derivation mode after exclusion.

In some embodiments, the determining unit 21 is specifically configured to, for an $i^{th}$ prediction mode in the Q prediction modes, determine a cost of using the $i^{th}$ prediction mode to predict the template, where i is a positive integer from 1 to Q; and select the T prediction modes from the Q prediction modes according to a cost corresponding to the $i^{th}$ prediction mode.

In some embodiments, the determining unit 21 is specifically configured to select a prediction mode similar to the $i^{th}$ prediction mode from the Q prediction modes, if the cost corresponding to the $i^{th}$ prediction mode is less than a fourth preset value; and determine the T prediction modes according to the $i^{th}$ prediction mode and the prediction mode similar to the $i^{th}$ prediction mode.

In some embodiments, the determining unit 21 is specifically configured to exclude the $i^{th}$ prediction mode and the prediction mode similar to the $i^{th}$ prediction mode from the Q prediction modes, so as to obtain at least one prediction mode after exclusion, if the cost corresponding to the $i^{th}$ prediction mode is greater than a fifth preset value; and determine the T prediction modes according to the at least one prediction mode after exclusion.

In some embodiments, the determining unit 21 is specifically configured to, for an $i^{th}$ weight derivation mode in the P weight derivation modes, determine a cost of using the $i^{th}$ weight derivation mode and the $j^{th}$ prediction mode in the Q prediction modes to predict the template; exclude the $j^{th}$ prediction mode and a prediction mode similar to the $j^{th}$ prediction mode from the Q prediction modes to obtain at least one prediction mode after exclusion, if a cost corresponding to a combination of the $i^{th}$ weight derivation mode and the $j^{th}$ prediction mode is greater than a sixth preset value; and form the R second combinations according to the $i^{th}$ weight derivation mode and the at least one prediction mode after exclusion.

In some embodiments, the predicting unit 22 is specifically configured to determine a weight of the prediction value according to the first weight derivation mode; determine the K prediction values according to the K first prediction modes; and weight the K prediction values according to weights of the prediction values to obtain the prediction value of the current block.

Optionally, the weight of the prediction value is a weight matrix.

In some embodiments, the encoding unit 23 is further configured to encode the first index into the bitstream in a variable length encoding manner.

In some embodiments, the encoding unit 23 is further configured to encode the first index into the bitstream in a fixed length encoding manner, if a number of candidate combinations included in the candidate combination list is less than a fourth preset threshold.

In some embodiments, the determining unit 21 is further configured to determine at least one flag, where the at least one flag indicates whether to use a first combination for encoding; and determine the first combination, if the at least one flag indicates that the first combination is to be used for encoding.

Optionally, the at least one flag includes at least one of a sequence level flag, a picture-level flag, a slice-level flag, a unit-level flag and a block-level flag.

It should be understood that, the apparatus embodiments and the method embodiments may correspond to each other, and for similar elaborations, reference can be made to the method embodiments, which will not be described again herein to avoid redundancy. Specifically, the apparatus 20 illustrated in FIG. 21 may correspond to a corresponding entity for performing the encoding method at the encoding end according to the embodiment of the disclosure, and the foregoing and other operations and/or functions of various units in the apparatus 20 are respectively intended to implement corresponding processes of various methods such as the encoding method at the encoding end, which will not be repeated herein for brevity.

The apparatus and system of embodiments of the disclosure are described above from the perspective of functional units with reference to the accompanying drawings. It should be understood that, the functional unit may be implemented in the form of hardware, or may be implemented by an instruction in the form of software, or may be implemented by a combination of hardware and software unit. Specifically, each step of the method embodiments of the disclosure may be completed by an integrated logic circuit of hardware in a processor and/or an instruction in the form of software. The steps of the method disclosed in embodiments of the disclosure may be directly implemented by a hardware decoding processor, or may be performed by hardware and software units in the decoding processor. Optionally, the software unit may be located in a storage medium such as a random access memory (RAM), a flash memory, a read only memory (ROM), a programmable ROM (PROM), or an electrically erasable programmable memory, registers, and the like. The storage medium is located in a memory. The processor reads the information in the memory, and completes the steps of the foregoing method embodiments with the hardware of the processor.

Figures 22, 23:
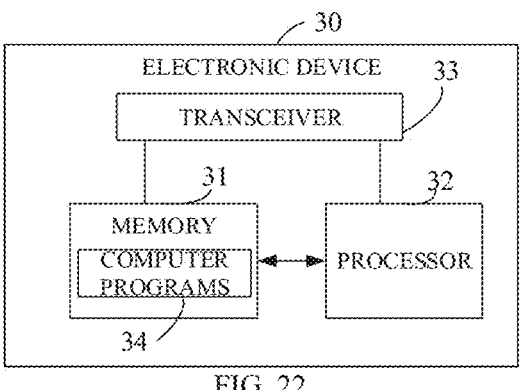
FIG. 22 is a schematic block diagram of an electronic device provided in embodiments of the disclosure.
FIG. 23 is a schematic block diagram of a video coding system provided in embodiments of the disclosure.

FIG. 22 is a schematic block diagram of an electronic device provided in embodiments of the disclosure.

As illustrated in FIG. 22, the electronic device 30 may be a video encoder or a video decoder according to embodiments of the disclosure. The electronic device 30 may include a memory 31 and a processor 32. The memory 31 is configured to store computer programs 34 and transmit the computer programs 34 to the processor 32. In other words, the processor 32 may call the computer programs 34 from the memory 31 to implement the method in embodiments of the disclosure.

For example, the processor 32 may be configured to perform the steps in the method 200 described above according to instructions in the computer programs 34.

In some embodiments of the disclosure, the processor 32 may include, but is not limited to: a general-purpose processor, a digital signal processor (DSP), an application specific integrated circuit (ASIC), a field programmable gate array (FPGA), or other programmable logic devices, discrete gates or transistor logic devices, discrete hardware components, etc.

In some embodiments of the disclosure, the memory 31 includes, but is not limited to: a volatile memory and/or a non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM).

In some embodiments of the disclosure, the computer program 34 may be divided into one or more units, and the one or more units are stored in the memory 31 and executed by the processor 32 to complete the method provided in the disclosure. The one or more units may be a series of computer program instruction segments capable of performing particular functions, where the instruction segments are used for describing the execution of the computer program 34 in the electronic device 30.

As illustrated in FIG. 22, the electronic device 30 may further include a transceiver 33. The transceiver 33 may be connected to the processor 32 or the memory 31.

The processor 32 can control the transceiver 33 to communicate with other devices, and specifically, can send information or data to other devices, or receive information or data sent by other devices. The transceiver 33 may further include an antenna, where one or more antennas may be provided.

It should be understood that, various components in the electronic device 30 are connected via a bus system. In addition to a data bus, the bus system further includes a power bus, a control bus, and a status signal bus.

FIG. 23 is a schematic block diagram of a video coding system provided in embodiments of the disclosure.

As illustrated in FIG. 23, the video coding system 40 may include a video encoder 41 and a video decoder 42. The video encoder 41 is configured to perform the video encoding method in embodiments of the disclosure, and the video decoder 42 is configured to perform the video decoding method in embodiments of the disclosure.

The disclosure further provides a computer storage medium. The computer storage medium is configured to store computer programs. The computer programs, when executed by a computer, are operable with the computer to perform the method in the foregoing method embodiments. Alternatively, embodiments of the disclosure further provide a computer program product. The computer program product includes instructions which, when executed by a computer, are operable with the computer to perform the method in the foregoing method embodiments.

The disclosure further provides a bitstream. The bitstream is generated according to the encoding method When implemented by software, all or some the above embodiments can be implemented in the form of a computer program product. The computer program product includes one or more computer instructions. When the computer instructions are applied and executed on a computer, all or some the operations or functions of the embodiments of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which integrates one or more usable media. The usable medium can be a magnetic medium (such as a soft disk, a hard disk, or a magnetic tape), an optical medium (such as a digital video disc (DVD)), or a semiconductor medium (such as a solid state disk (SSD)), etc.

Those of ordinary skill in the art will appreciate that units and algorithmic operations of various examples described in connection with embodiments of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, apparatuses, and methods disclosed in embodiments of the disclosure may also be implemented in various other manners. For example, the above apparatus embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure. For example, various functional units described in various embodiments of the disclosure may be integrated into one processing unit or may be present as a number of physically separated units, and two or more units may be integrated into one.

The foregoing elaborations are merely implementations of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

I claim:

1. A video decoding method, comprising:

decoding a bitstream to obtain a first index, wherein the first index indicates a first combination consisting of one weight derivation mode and K prediction modes, and K is a positive integer greater than 1;

determining a candidate combination list, wherein the candidate combination list comprises multiple candidate combinations, and any candidate combination in the multiple candidate combinations comprises one weight derivation mode and K prediction modes;

determining a weight derivation mode and K prediction modes comprised in a candidate combination corresponding to the first index in the candidate combination list as a first weight derivation mode and K first prediction modes; and predicting a current block according to the first weight derivation mode and the K first prediction modes to obtain a prediction value of the current block;

wherein determining the candidate combination list comprises:

determining R second combinations, wherein any second combination in the R second combinations comprises one weight derivation mode and K prediction modes, wherein weight derivation modes and K prediction modes comprised in any two combinations of the R second combinations are not completely the same, and R is a positive integer greater than 1;

for any second combination in the R second combinations, using a weight derivation mode and K prediction modes in the second combination to predict a template and obtain a template prediction value corresponding to the second combination;

determining a cost corresponding to the second combination according to a template prediction value corresponding to the second combination and a reconstruction value of the template; and generating the candidate combination list according to a cost corresponding to each second combination in the R second combinations;

wherein determining the R second combinations comprises:

determining P weight derivation modes and Q prediction modes, wherein P is a positive integer and Q is a positive integer greater than or equal to K; and forming the R second combinations according to the P weight derivation modes and the Q prediction modes, wherein any second combination in the R second combinations comprises one weight derivation mode in the P weight derivation modes and K prediction modes in the Q prediction modes.

2. The method according to claim 1, wherein generating the candidate combination list according to the cost corresponding to each second combination in the R second combinations comprises:

selecting N second combinations from the R second combinations according to the cost corresponding to the second combination; and determining a list composed of the N second combinations as the candidate combination list, wherein the N second combinations are first N second combinations with smallest costs in the R second combinations.

3. The method of claim 1, wherein determining the Q prediction modes comprises:

determining at least one of a candidate prediction mode list of the current block, alternative prediction mode lists respectively corresponding to the K prediction modes, and a prediction mode corresponding to a weight derivation mode, wherein the candidate prediction mode list comprises multiple candidate prediction modes, and an alternative prediction mode list corresponding to any prediction mode in the K prediction modes comprises at least one alternative prediction mode; and determining the Q prediction modes according to at least one of the candidate prediction mode list, the alternative prediction mode lists respectively corresponding to the K prediction modes, and the prediction mode corresponding to a weight derivation mode;

wherein determining the alternative prediction mode lists respectively corresponding to the K prediction modes comprises:

for any prediction mode in the K prediction modes, determining at least one of a candidate prediction mode list corresponding to the prediction mode and a prediction mode corresponding to a weight derivation mode; and determining an alternative prediction mode list corresponding to the prediction mode according to at least one of the candidate prediction mode list and the prediction mode corresponding to a weight derivation mode;

wherein the determining the candidate prediction mode list comprises:

determining the candidate prediction mode list according to a prediction mode used by at least one block adjacent to the current block.

4. The method of claim 3, further comprising:

adding a preset mode into the candidate prediction mode list, in response to the preset mode being not comprised in the candidate prediction mode list, wherein the preset mode comprises at least one of direct current (DC) mode, a planar mode, and a vertical mode.

5. The method of claim 3, wherein determining the prediction mode corresponding to the weight derivation mode comprises:

for a $p^{th}$ weight derivation mode in the P weight derivation modes, determining a prediction mode corresponding to the $p^{th}$ weight derivation mode, wherein p is a positive integer; and determining the prediction mode corresponding to the weight derivation mode according to a prediction mode corresponding to at least one weight derivation mode in the P weight derivation modes, wherein in response to at least one of prediction modes corresponding to the $p^{th}$ weight derivation mode being an intra prediction mode, the determining a prediction mode corresponding to the $p^{th}$ weight derivation mode comprises:

determining an angle index according to the $p^{th}$ weight derivation mode; and determining an intra prediction mode corresponding to the angle index as the at least one of prediction modes corresponding to the $p^{th}$ weight derivation mode.

6. The method of claim 5, wherein the intra prediction mode corresponding to the $p^{th}$ weight derivation mode comprise at least one of an intra prediction mode in which a prediction angle is parallel to a boundary line corresponding to the weight derivation mode, an intra prediction mode in which a prediction angle is perpendicular to a boundary line corresponding to the weight derivation mode, and a planar mode.

7. The method of claim 1, wherein determining the P weight derivation modes comprises:

determining a selecting condition corresponding to the current block; and selecting the P weight derivation modes from M weight derivation modes according to the selecting condition, wherein M is a positive integer greater than or equal to P, wherein the selecting condition corresponding to the current block comprises a selecting condition corresponding to a size of the current block and/or a selecting condition corresponding to a shape of the current block, wherein the selecting condition comprises an array, the array comprises M elements, the M elements are in one-to-one correspondence with the M weight derivation modes, and an element corresponding to the weight derivation mode indicates whether the weight derivation mode is available.

8. The method of claim 1, wherein predicting the current block according to the first weight derivation mode and the K first prediction modes to obtain the prediction value of the current block comprises:

determining a weight of the prediction value according to the first weight derivation mode;

determining the K prediction values according to the K first prediction modes; and weighting the K prediction values according to weights of the K prediction values to obtain the prediction value of the current block.

9. The method of claim 1, wherein in response to a number of candidate combinations comprised in the candidate combination list being less than a fourth preset threshold, the first index is encoded into the bitstream in a fixed length encoding manner.

10. The method of claim 1, further comprising:

decoding the bitstream to obtain at least one flag, wherein the at least one flag indicates that a first combination is to be used for decoding; and wherein the decoding a bitstream to obtain a first index comprises decoding the bitstream to obtain the first index, in response to the at least one flag indicating that the first combination is to be used for decoding;

wherein the at least one flag comprises at least one of a sequence level flag, a picture-level flag, a slice-level flag, a unit-level flag, and a block-level flag.

11. A video encoding method, comprising:

determining a candidate combination list, wherein the candidate combination list comprises multiple candidate combinations, and any candidate combination in the multiple candidate combinations comprises one weight derivation mode and K prediction modes; and determining a first combination from the candidate combination list, wherein the first combination comprises a first weight derivation mode and K first prediction modes;

predicting a current block according to the first weight derivation mode and the K first prediction modes to obtain a prediction value of the current block; and obtaining a bitstream according to the prediction value of the current block, wherein the bitstream comprises a first index, and the first index indicates the first combination;

wherein determining the candidate combination list comprises:

determining R second combinations, wherein any second combination in the R second combinations comprises one weight derivation mode and K prediction modes, wherein weight derivation modes and K prediction modes comprised in any two combinations of the R second combinations are not completely the same, and R is a positive integer greater than 1;

for any second combination in the R second combinations, using a weight derivation mode and K prediction modes in the second combination to predict a template and obtain a template prediction value corresponding to the second combination;

determining a cost corresponding to the second combination according to a template prediction value corresponding to the second combination and a reconstruction value of the template; and generating the candidate combination list according to a cost corresponding to each second combination in the R second combinations;

wherein determining the R second combinations comprises:

determining P weight derivation modes and Q prediction modes, wherein P is a positive integer and Q is a positive integer greater than or equal to K; and forming the R second combinations according to the P weight derivation modes and the Q prediction modes, wherein any second combination in the R second combinations comprises one weight derivation mode in the P weight derivation modes and K prediction modes in the Q prediction modes.

12. The method according to claim 11, wherein generating the candidate combination list according to the cost corresponding to each second combination in the R second combinations comprises:

selecting N second combinations from the R second combinations according to the cost corresponding to the second combination; and determining a list composed of the N second combinations as the candidate combination list, wherein the N second combinations are first N second combinations with smallest costs in the R second combinations.

13. The method of claim 11, wherein determining the Q prediction modes comprises:

determining at least one of a candidate prediction mode list of the current block, alternative prediction mode lists respectively corresponding to the K prediction modes, and a prediction mode corresponding to a weight derivation mode, wherein the candidate prediction mode list comprises multiple candidate prediction modes, and an alternative prediction mode list corresponding to any prediction mode in the K prediction modes comprises at least one alternative prediction mode; and determining the Q prediction modes according to at least one of the candidate prediction mode list, the alternative prediction mode lists respectively corresponding to the K prediction modes, and the prediction mode corresponding to a weight derivation mode, wherein determining the alternative prediction mode lists respectively corresponding to the K prediction modes comprises:

for any prediction mode in the K prediction modes, determining at least one of a candidate prediction mode list corresponding to the prediction mode and a prediction mode corresponding to a weight derivation mode; and determining an alternative prediction mode list corresponding to the prediction mode according to at least one of the candidate prediction mode list and the prediction mode corresponding to a weight derivation mode, wherein the determining the candidate prediction mode list comprises:

determining the candidate prediction mode list according to a prediction mode used by at least one block adjacent to the current block.

14. The method of claim 11, further comprising:

adding a preset mode into the candidate prediction mode list, in response to the preset mode being not comprised in the candidate prediction mode list, wherein the preset mode comprises at least one of direct current (DC) mode, a planar mode, and a vertical mode.

15. A video decoding apparatus, comprising:

a memory configured to store computer programs; and a processor configured to execute the computer programs stored in the memory to:

decode a bitstream to obtain a first index, wherein the first index indicates a first combination consisting of one weight derivation mode and K prediction modes, and K is a positive integer greater than 1;

determine a first weight derivation mode and K first prediction modes comprised in the first combination according to the first index; and predict a current block according to the first weight derivation mode and the K first prediction modes to obtain a prediction value of the current block;

wherein the processor configured to determine the candidate combination list is configured to:

determine R second combinations, wherein any second combination in the R second combinations comprises one weight derivation mode and K prediction modes, wherein weight derivation modes and K prediction modes comprised in any two combinations of the R second combinations are not completely the same, and R is a positive integer greater than 1;

for any second combination in the R second combinations, using a weight derivation mode and K prediction modes in the second combination to predict a template and obtain a template prediction value corresponding to the second combination;

determine a cost corresponding to the second combination according to a template prediction value corresponding to the second combination and a reconstruction value of the template; and generate the candidate combination list according to a cost corresponding to each second combination in the R second combinations;

wherein the processor configured to determine the R second combinations is configured to:

determine P weight derivation modes and Q prediction modes, wherein P is a positive integer and Q is a positive integer greater than or equal to K; and form the R second combinations according to the P weight derivation modes and the Q prediction modes, wherein any second combination in the R second combinations comprises one weight derivation mode in the P weight derivation modes and K prediction modes in the Q prediction modes.

16. A video encoding apparatus, comprising:

a memory configured to store computer programs; and a processor configured to execute the computer programs stored in the memory to:

determine a first combination, wherein the first combination comprises a first weight derivation mode and K first prediction modes;

perform prediction a current block according to the first weight derivation mode and the K first prediction modes to obtain a prediction value of the current block; and obtain a bitstream according to the prediction value of the current block, wherein the bitstream comprises a first index, and the first index indicates the first combination;

wherein the processor configured to determine the candidate combination list is configured to:

determine R second combinations, wherein any second combination in the R second combinations comprises one weight derivation mode and K prediction modes, wherein weight derivation modes and K prediction modes comprised in any two combinations of the R second combinations are not completely the same, and R is a positive integer greater than 1;

for any second combination in the R second combinations, using a weight derivation mode and K prediction modes in the second combination to predict a template and obtain a template prediction value corresponding to the second combination;

determine a cost corresponding to the second combination according to a template prediction value corresponding to the second combination and a reconstruction value of the template; and generate the candidate combination list according to a cost corresponding to each second combination in the R second combinations;

wherein the processor configured to determine the R second combinations is configured to:

determine P weight derivation modes and Q prediction modes, wherein P is a positive integer and Q is a positive integer greater than or equal to K; and form the R second combinations according to the P weight derivation modes and the Q prediction modes, wherein any second combination in the R second combinations comprises one weight derivation mode in the P weight derivation modes and K prediction modes in the Q prediction modes.

* * * * *